(12) United States Patent
Sugiyama et al.

(10) Patent No.: US 10,876,595 B2
(45) Date of Patent: Dec. 29, 2020

(54) SPEED REDUCER-ATTACHED MOTOR AND SPEED REDUCER-ATTACHED MOTOR ASSEMBLY METHOD

(71) Applicant: Mitsuba Corporation, Gunma (JP)

(72) Inventors: Tomoyasu Sugiyama, Kiryu (JP); Yoshichika Kawashima, Kiryu (JP); Yosuke Harigai, Kiryu (JP); Masaki Hayata, Kiryu (JP)

(73) Assignee: Mitsuba Corporation, Gunma (JP)

( * ) Notice: Subject to any disclaimer, the term of this patent is extended or adjusted under 35 U.S.C. 154(b) by 28 days.

(21) Appl. No.: 16/301,934

(22) PCT Filed: Jun. 15, 2017

(86) PCT No.: PCT/JP2017/022130
§ 371 (c)(1),
(2) Date: Nov. 15, 2018

(87) PCT Pub. No.: WO2017/217495
PCT Pub. Date: Dec. 21, 2017

(65) Prior Publication Data
US 2019/0186596 A1    Jun. 20, 2019

(30) Foreign Application Priority Data

Jun. 17, 2016  (JP) ................................. 2016-120592
Jun. 17, 2016  (JP) ................................. 2016-120593
Sep. 6, 2016   (JP) ................................. 2016-173776

(51) Int. Cl.
*F16H 1/16*     (2006.01)
*F16H 57/021*   (2012.01)
(Continued)

(52) U.S. Cl.
CPC ............. *F16H 1/16* (2013.01); *F16H 57/021* (2013.01); *F16H 57/039* (2013.01); *H02K 5/04* (2013.01);
(Continued)

(58) Field of Classification Search
CPC .................... F16H 1/16; F16H 57/021; F16H 2057/02034; F16H 2057/0213;
(Continued)

(56) References Cited

U.S. PATENT DOCUMENTS

| | | | |
|---|---|---|---|
| 4,369,387 A * | 1/1983 | Haar | B60S 1/08 |
| | | | 310/75 R |
| 5,203,113 A * | 4/1993 | Yagi | E05F 15/63 |
| | | | 49/324 |
| 2005/0115350 A1* | 6/2005 | Ohashi | B60N 2/067 |
| | | | 74/425 |

FOREIGN PATENT DOCUMENTS

| | | |
|---|---|---|
| CN | 101273511 A | 9/2008 |
| CN | 102124636 A | 7/2011 |

(Continued)

OTHER PUBLICATIONS

PCT Office, International Search Report issued in PCT/JP2017/022130 dated Aug. 29, 2017, 4 pages.
(Continued)

*Primary Examiner* — Thomas C Diaz
(74) *Attorney, Agent, or Firm* — Wood Herron & Evans LLP

(57) ABSTRACT

A speed reducer-attached motor includes a rotation shaft on which a worm gear is provided and which is supported rotatably around a central axis via a plurality of bearings, a motor part that is driven to be rotated around the rotation shaft as a central axis, a speed reducer part that includes at least one or more gears which include a worm wheel that is engaged with the worm gear, and a casing on which a shaft
(Continued)

accommodation groove that accommodates the rotation shaft, a bearing accommodation recess part that accommodates the bearing, and an accommodation recess part that accommodates the speed reducer part are formed, wherein the shaft accommodation groove, the bearing accommodation recess part, and the accommodation recess part open at a top surface portion side of the casing.

6 Claims, 38 Drawing Sheets

(51) Int. Cl.

| | | |
|---|---|---|
| *F16H 57/039* | (2012.01) | |
| *H02K 7/116* | (2006.01) | |
| *H02K 15/14* | (2006.01) | |
| *H02K 5/14* | (2006.01) | |
| *H02K 5/10* | (2006.01) | |
| *H02K 7/08* | (2006.01) | |
| *H02K 5/04* | (2006.01) | |
| *H02K 5/22* | (2006.01) | |
| *F16H 57/02* | (2012.01) | |

(52) U.S. Cl.
CPC ............... *H02K 5/10* (2013.01); *H02K 5/148* (2013.01); *H02K 7/083* (2013.01); *H02K 7/116* (2013.01); *H02K 7/1166* (2013.01); *H02K 15/14* (2013.01); *F16H 2057/0213* (2013.01); *F16H 2057/02034* (2013.01); *H02K 5/225* (2013.01)

(58) Field of Classification Search
CPC .......... F16H 57/039; H02K 5/04; H02K 5/10; H02K 7/083; B60S 1/166; B60S 1/26
See application file for complete search history.

(56) References Cited

FOREIGN PATENT DOCUMENTS

| | | | |
|---|---|---|---|
| CN | 103683649 | A | 3/2014 |
| CN | 103918167 | A | 7/2014 |
| JP | 58156365 | U | 10/1983 |
| JP | 05079248 | A | 3/1993 |
| JP | 09131034 | A | 5/1997 |
| JP | 09201003 | A | 7/1997 |
| JP | 2002354739 | A | 12/2002 |
| JP | 2003047204 | A | 2/2003 |
| JP | 2013193517 | A | 9/2013 |
| JP | 2014171365 | A | 9/2014 |
| JP | 2014217240 | A | 11/2014 |
| JP | 2014217267 | A | 11/2014 |

OTHER PUBLICATIONS

Chinese Patent Office, Office Action issued in CN 201780033238.6 dated Jan. 10, 2020, 21 pages.

* cited by examiner

SPEED REDUCER-ATTACHED MOTOR AND SPEED REDUCER-ATTACHED MOTOR ASSEMBLY METHOD

TECHNICAL FIELD

The present invention relates to a speed reducer-attached motor and a speed reducer-attached motor assembly method.

Priority is claimed on Japanese Patent Application No. 2016-120592 filed on Jun. 17, 2016, Japanese Patent Application No. 2016-120593 filed on Jun. 17, 2016, and Japanese Patent Application No. 2016-173776 filed on Sep. 6, 2016, the contents of which are incorporated herein by reference.

BACKGROUND

As a speed reducer-attached motor that is provided on a vehicle, for example, one such motor is known which is used for an automotive power window apparatus. In this type of speed reducer-attached motor, a worm speed reducer and a motor part are connected to each other. The worm speed reducer includes a worm gear that is provided on a worm shaft which is driven to be rotated around a central axis by the motor part, a worm wheel that is engaged with the worm gear, and an output gear that is connected to the worm wheel and that outputs a rotation force externally. By means of the output gear, opening and closing operations of a window glass and the like are performed.

In the related art, in such a speed reducer-attached motor, a configuration is known in which central axes of the worm wheel and the output gear are arranged to be orthogonal mutually with respect to the worm shaft (for example, refer to Patent Document 1 and Patent Document 2).

Further, as a speed reducer-attached motor, for example, one such motor is known that includes a motor part and a transmission mechanism to which power of the motor part is transmitted and which outputs the power to a driven body. In many cases, the transmission mechanism is constituted of a plurality of gears, a drive shaft that pivotably supports the gears, and the like.

Further, as this type of speed reducer-attached motor, one such motor is known in which a motor part and a transmission mechanism are stored in a casing of which one surface is opened in order to facilitate an assembly work. In such a motor, after the motor part and the transmission mechanism are stored from the one surface side of the casing, the opening of the one surface is closed by a cover. In this way, it is possible to perform the assembly of components into the casing all from the one surface side, and therefore, it is possible to easily perform the assembly work of the speed reducer-attached motor (for example, refer to Patent Document 3).

RELATED ART DOCUMENTS

Patent Documents

[Patent Document 1] Japanese Unexamined Patent Application, First Publication No. 2014-171365

[Patent Document 2] Japanese Unexamined Patent Application, First Publication No. 2014-217240

[Patent Document 3] Japanese Unexamined Patent Application, First Publication No. 2002-354739

SUMMARY OF INVENTION

Problems to be Solved by the Invention

All of the worm shaft, the worm wheel, and a drive gear are accommodated in the casing (housing) of the speed reducer-attached motor.

Here, the worm wheel and the drive gear are assembled to an accommodation recess part that is formed on the casing from an opening side of the accommodation recess part along the direction of the central axes of the worm wheel and the drive gear.

On the other hand, the worm shaft is inserted in a shaft insertion hole that is formed on the casing from a direction along the central axis of the worm shaft. An opening part that communicates with the accommodation recess part is formed on the shaft insertion hole, and the worm gear that is formed on the worm shaft is exposed to the inside of the accommodation recess part from this opening part and is engaged with the worm wheel.

In this way, the assembly direction of the worm shaft with respect to the casing is different from the assembly direction of the worm wheel and the drive gear. Therefore, when assembling the speed reducer-attached motor, it is necessary to change the direction of the casing in accordance with a member to be assembled, and time and effort are required.

Further, in order to improve an operation efficiency of the speed reducer-attached motor, it is desirable to assemble the worm shaft with respect to the casing via a bearing. However, when the worm shaft into which the bearing is pressed is inserted in an insertion hole of the casing, the bearing protrudes outward in a radial direction from the worm shaft, and therefore, the assembly is difficult.

Further, in the speed reducer-attached motor as described above, a gear tooth that is formed on an outer circumferential part of the worm wheel is engaged with the worm gear that is provided on the worm shaft. Thereby, when seen from the direction along the central axes of the worm wheel and the output gear, the central axes of the worm wheel and the output gear are arranged to be offset in a lateral direction with respect to the center of the worm shaft.

Further, a bolt that fixes the speed reducer-attached motor to a vehicle body of a vehicle is inserted. Therefore, a bolt insertion hole is formed at a plurality of positions on an outer circumferential part of the casing of the speed reducer-attached motor. In the speed reducer-attached motor, the weight of the motor part that drives the worm shaft to be rotated is large in addition to the worm wheel that is assembled in the casing and a plurality of gears such as the output gear. Therefore, in consideration of the weight balance of these components, the position of the bolt insertion hole is set.

Accordingly, the speed reducer-attached motor has an asymmetric configuration. Therefore, for example, in the case of the speed reducer-attached motor for an automotive power window apparatus, it is necessary to prepare two types of speed reducer-attached motors that are symmetric in the right-to-left direction around the central axis of the output gear for a driver seat side and a passenger seat side. Then, two types of casings of the speed reducer-attached motors are also required, it is necessary to manufacture two types of molds by which the casings are molded, and the mold cost is high.

Further, in the speed reducer-attached motor described above, when a load that is applied on the transmission mechanism is increased, a force (force that is applied in the radial direction of the drive shaft and the motor shaft) in the radial direction that is applied on the transmission mechanism and the motor part increases. Therefore, the motor part and the transmission mechanism are floated from the casing, and there is a possibility that the speed reducer-attached motor may cause an operation failure.

Therefore, the present invention provides a speed reducer-attached motor and a speed reducer-attached motor assembly method capable of improving an assembly property of a member such as a worm shaft and a worm wheel.

Further, the present invention provides a speed reducer-attached motor capable of reducing a mold cost.

Further, a speed reducer-attached motor capable of preventing an operation failure while facilitating an assembly work is provided.

Means for Solving the Problem

The present invention employs the following means in order to solve the problem described above.

That is, according to a first aspect of the present invention, a speed reducer-attached motor includes a rotation shaft on which a worm gear is provided and which is supported rotatably around a central axis via a plurality of bearings, a motor part that is driven to be rotated around the rotation shaft as a central axis, a speed reducer part that includes at least one or more gears which include a worm wheel that is engaged with the worm gear, and a casing on which a shaft accommodation recess part that accommodates the rotation shaft, a bearing accommodation recess part that accommodates the bearing, and a speed reducer accommodation recess part that accommodates the speed reducer part are formed, wherein the shaft accommodation recess part, the bearing accommodation recess part, and the speed reducer accommodation recess part open at one surface side of the casing.

In this way, all of the shaft accommodation recess part, the bearing accommodation recess part, and the speed reducer accommodation recess part open at one surface side of the casing. Therefore, it becomes possible to assemble the rotation shaft, the bearing, and the gears which constitute the speed reducer part from the same direction of the one surface side with respect to the casing. Accordingly, when assembling the speed reducer-attached motor, it is possible to avoid changing of the direction of the casing in accordance with a component to be assembled, and it is possible to improve an assembly property.

Further, it is possible to assemble the rotation shaft to the casing via the bearing, and therefore, it is possible to improve the operation efficiency of the speed reducer-attached motor.

Further, according to a second aspect of the present invention, in the speed reducer-attached motor according to the first aspect of the present invention, a commutator that constitutes the motor part may be provided on the rotation shaft, and a motor accommodation part that accommodates the commutator of the motor part may be formed on the casing so as to open on the one surface side.

In this way, the motor accommodation part that accommodates the commutator opens at the one surface side of the casing similarly to the shaft accommodation recess part, the bearing accommodation recess part, and the speed reducer accommodation recess part. Therefore, it becomes possible to assemble the commutator that is provided on the rotation shaft to the casing together with the rotation shaft.

Further, according to a third aspect of the present invention, the speed reducer-attached motor according to the second aspect of the present invention may further include a brush holder that holds a brush which is in slidable contact with an outer circumferential surface of the commutator, and the brush holder may be fixed to the motor accommodation part.

In this way, the motor accommodation part opens at the one surface side of the casing similarly to the shaft accommodation recess part, the bearing accommodation recess part, and the speed reducer accommodation recess part. Therefore, it becomes possible to assemble the brush holder also to the casing from the same direction as that of the rotation shaft, the bearing, and the speed reducer part.

Further, according to a fourth aspect of the present invention, in the speed reducer-attached motor according to the third aspect of the present invention, a cover that covers the shaft accommodation recess part, the bearing accommodation recess part, the speed reducer accommodation recess part, and the motor accommodation part may be provided on the one surface side of the casing, and the brush holder may be provided integrally on the cover.

In this way, the brush holder is provided integrally on the cover. Therefore, when the cover is attached to the casing, it is possible to assemble the brush holder to the motor accommodation part at the same time.

Further, according to a fifth aspect of the present invention, in the speed reducer-attached motor according to any one of the first aspect to the fourth aspect of the present invention, the bearing accommodation recess part may include an elastically deformable rib that protrudes toward the bearing side at a position which faces an outside in a radial direction of the bearing and which is orthogonal to the one surface side.

According to such a configuration, when the bearing that supports the rotation shaft is pressed into the bearing accommodation recess part, it is possible to restrict the bearing in the radial direction by the rib.

Further, according to a sixth aspect of the present invention, in the speed reducer-attached motor according to any one of the first aspect to the fifth aspect of the present invention, at least two bearings may be provided to be spaced in a central axis direction of the rotation shaft, and the bearing accommodation recess part that accommodates one of the bearings may include a positioning surface which is formed on one side in the rotation shaft direction and against which one surface of the bearing is butted and a press part which is formed on the other side in the rotation shaft direction and which presses the bearing to the positioning surface side.

According to such a configuration, the one of the bearings that is provided on the rotation shaft is sandwiched between and held by the positioning surface and the press part of the bearing accommodation recess part, and the position in the central axis direction of the rotation shaft is defined by the positioning surface. Thereby, it is possible to assemble the rotation shaft to the casing with good accuracy.

Further, according to a seventh aspect of the present invention, in the speed reducer-attached motor according to any one of the first aspect to the sixth aspect of the present invention, a width size in the shaft accommodation recess part may be smaller than a width size in a direction that is orthogonal to the rotation shaft in the bearing accommodation recess part.

According to such a configuration, even when a lubricant agent such as a grease that is filled in the bearing flows out from the bearing, the width size of the shaft accommodation recess part is smaller than the bearing accommodation recess part. Therefore, it is possible to prevent the lubricant agent from being spattered by the rotation of the rotation shaft and prevent a lubrication shortage from occurring.

Further, an eighth aspect of the present invention is an assembly method of the speed reducer-attached motor according to any one of the first aspect to the seventh aspect of the present invention, wherein the gears that constitute the rotation shaft, the bearing, and the speed reducer part are assembled from the one surface side with respect to the shaft accommodation recess part, the bearing accommodation recess part, and the speed reducer accommodation recess part that open at the one surface side of the casing.

According to such a method, in assembling the speed reducer-attached motor, it is possible to avoid the necessity of changing the direction of the casing in accordance with a component to be assembled, and it is possible to improve the assembly property.

Further, according to a ninth aspect of the present invention, in the speed reducer-attached motor according to the first aspect of the present invention, the speed reducer part includes an output gear to which a rotation of the worm wheel is transmitted and which externally outputs a rotation force, a rotation center of the output gear is arranged at a position which is crossed with the rotation shaft and which is orthogonal to the rotation shaft, and a plurality of fixation parts that are formed on the casing and that are used for fixing the casing to a fixation target are arranged symmetrically with respect to the rotation center of the output gear.

In this way, the rotation shaft of the speed reducer-attached motor and the output gear are concentrically arranged, and further, a plurality of fixation parts for fixing the casing are provided symmetrically around the output gear. Therefore, even when the speed reducer-attached motor is inverted around the output gear, no problems arise. Further, the motor part that drives and rotates the rotation shaft is provided concentrically with the rotation shaft, and therefore, the weight balance of the speed reducer-attached motor around the rotation shaft is also preferable. Thereby, for example, it becomes possible for the driver seat side and the passenger seat side of the vehicle to share such a speed reducer-attached motor. Accordingly, it is not necessary to manufacture a plurality of types of casings in accordance with the arrangement direction of the speed reducer-attached motor, and it is possible to reduce the mold cost.

Further, according to a tenth aspect of the present invention, the speed reducer-attached motor according to the ninth aspect of the present invention may further include a shaft support part that rotatably supports the output gear, wherein the shaft support part may include a base unit that is provided so as to straddle the rotation shaft and a shaft that extends in a direction which is orthogonal to the rotation shaft from the base unit and that rotatably supports the output gear.

According to such a configuration, by providing the shaft on the base unit that is provided so as to straddle the rotation shaft, it is possible to arrange the rotation center of the output gear at a position which is crossed with the rotation shaft and which is orthogonal to the rotation shaft.

Further, according to an eleventh aspect of the present invention, in the speed reducer-attached motor according to the tenth aspect of the present invention, the shaft support part may be a separate body from the casing and may be fixed to the casing.

In this way, the shaft support part having the base unit that is provided so as to straddle the rotation shaft is a separate body from the casing. Therefore, in a case where the rotation shaft is assembled to the casing before the shaft support part is assembled to the casing, the shaft support part is not an obstacle when the rotation shaft is assembled. Accordingly, it is possible to improve the assembly property.

Further, according to a twelfth aspect of the present invention, in the speed reducer-attached motor according to the tenth aspect of the present invention, the shaft support part may be formed integrally with the casing.

Further, according to a thirteenth aspect of the present invention, in the speed reducer-attached motor according to any one of the tenth aspect to the twelfth aspect of the present invention, the shaft may be provided so as to extend to one surface side of the casing with respect to the base unit.

In this way, the shaft accommodation recess part and a worm wheel accommodation part open at one surface side of the casing, and the shaft also extends to the one surface side of the casing. Therefore, it becomes possible to assemble the rotation shaft, the worm wheel, and the output gear from the same direction of the one surface side with respect to the casing. Accordingly, when assembling the speed reducer-attached motor, it is possible to avoid changing of the direction of the casing in accordance with a component to be assembled, and it is possible to improve the assembly property.

Further, according to a fourteenth aspect of the present invention, in the speed reducer-attached motor according to any one of the tenth aspect to the twelfth aspect of the present invention, the shaft may be provided so as to extend to the other surface side of the casing with respect to the base unit.

According to such a configuration, it becomes possible to assemble the rotation shaft and the worm wheel from the same direction of the one surface side with respect to the casing. Further, the output gear that is supported by the shaft is assembled from the other surface side of the casing. Accordingly, the shaft is not an obstacle in assembling the rotation shaft and the worm wheel to the casing while arranging the rotation center of the output gear at a position which is crossed with the rotation shaft and which is orthogonal to the rotation shaft. Accordingly, it also becomes possible to integrate the shaft to the casing.

Further, according to a fifteenth aspect of the present invention, the gear has a drive shaft that is rotated in response to a rotation force of the motor part and that is engaged with the worm wheel, and the speed reducer-attached motor includes a cover that is provided on the casing so as to close the one surface and a bearing stopper that is provided between the cover and an outer circumferential surface of the bearing and that prevents separation of the bearing from the bearing accommodation recess part.

According to such a configuration, it is possible to prevent the bearing that is accommodated in the casing of which one surface is opened from floating from a case by the bearing stopper. Therefore, it is possible to prevent an operation failure of a drive mechanism while facilitating an assembly work of the drive mechanism.

According to a sixteenth aspect of the present invention, in the speed reducer-attached motor according to fifteenth aspect of the present invention, the bearing stopper is molded integrally with the cover.

According to such a configuration, it is possible to reduce the number of components. Therefore, it is possible to reduce the product cost of the drive mechanism, and it is possible to further facilitate the assembly work of the drive mechanism.

According to a seventeenth aspect of the present invention, in the speed reducer-attached motor according to the fifteenth aspect or the sixteenth aspect of the present invention, an elastic member is provided on at least a surface that is in contact with the bearing of the bearing stopper, and the bearing stopper presses the outer circumferential surface of the bearing via the elastic member.

According to such a configuration, it is possible to reduce the vibration of the drive shaft that is transmitted to the bearing stopper via the bearing. Therefore, it is possible to reduce the noise when the speed reducer-attached motor is driven.

Further, by interposing the elastic member, it is possible to allow the bearing and the bearing stopper to be in close contact with each other. Therefore, it is possible to transmit heat that is generated at the bearing and the like to the bearing stopper and the cover via the elastic member. Accordingly, it is possible to enhance the cooling efficiency of the speed reducer-attached motor.

According to an eighteenth aspect of the present invention, in the speed reducer-attached motor according to the seventeenth aspect of the present invention, an output shaft that is rotated integrally with the worm wheel and that transmits power to a driven body is provided on the worm wheel, an opening part in which the output shaft is inserted is formed on the cover, a seal member that seals a space between the opening part and the output shaft is provided on the cover, and the seal member and the elastic member are integrally molded.

In this way, it is possible to preferably use the bearing stopper for the speed reducer-attached motor that includes a worm speed reducer part that is constituted of the worm shaft and the worm wheel.

Further, since the seal member and the elastic member are integrally molded, it is possible to reduce the number of components, and it is possible to simplify the manufacturing process of the seal member and the elastic member.

According to a nineteenth aspect of the present invention, in the speed reducer-attached motor according to any one of the fifteenth aspect to the eighteenth aspect of the present invention, the motor part includes an armature that is integrated with the drive shaft, a brush for supplying an external electric source to the armature, and a brush holder that supports the brush, wherein the casing has a holder accommodation part which accommodates the brush holder and of which a surface that is identical to the one surface is opened, and the cover has a holder cover that closes an opening of the holder accommodation part.

According to such a configuration, it is possible to further facilitate an assembly work property of the speed reducer-attached motor. Further, since the cover has the holder cover, it is not necessary to separately provide a holder cover, and it is possible to reduce the number of components.

According to a twentieth aspect of the present invention, in the speed reducer-attached motor according to any one of the fifteenth aspect to the nineteenth aspect of the present invention, a latch protrusion is provided on any one of the casing and the cover, a latch claw that is capable of being latched to the latch protrusion is provided on the other of the casing and the cover, and any of the latch protrusion and the latch claw is arranged close to the bearing accommodation recess part.

In this way, by reliably fixing the case and the cover in the vicinity of the bearing accommodation part, it is possible to reliably press the floating of the bearing by the cover via the bearing stopper.

According to a twenty-first aspect of the present invention, in the speed reducer-attached motor according to the twentieth aspect of the present invention, any of the latch protrusion and the latch claw is arranged on both sides of the bearing so as to interpose the drive shaft.

According to such a configuration, it is possible to further reliably prevent floating of the bearing by the cover via the bearing stopper.

Advantage of the Invention

According to the speed reducer-attached motor described above, it becomes possible to improve an assembly property of a member such as the worm shaft and the worm wheel.

Further, according to the speed reducer-attached motor described above, even when the speed reducer-attached motor is inverted around the rotation shaft, no problems arise. Therefore, it is not necessary to manufacture a plurality of types of casings in accordance with the arrangement direction of the speed reducer-attached motor, and it becomes possible to reduce the mold cost.

Further, according to the speed reducer-attached motor described above, it is possible to prevent the bearing that is accommodated in a case of which one surface is opened from floating from the case by the bearing stopper. Therefore, it is possible to prevent an operation failure of the speed reducer-attached motor while facilitating an assembly work of the speed reducer-attached motor.

DESCRIPTION OF THE EMBODIMENTS

Next, speed reducer-attached motors according to embodiments of the present invention will be described with reference to the drawings.

First Embodiment (Speed Reducer-Attached Motor)

Figure 1:
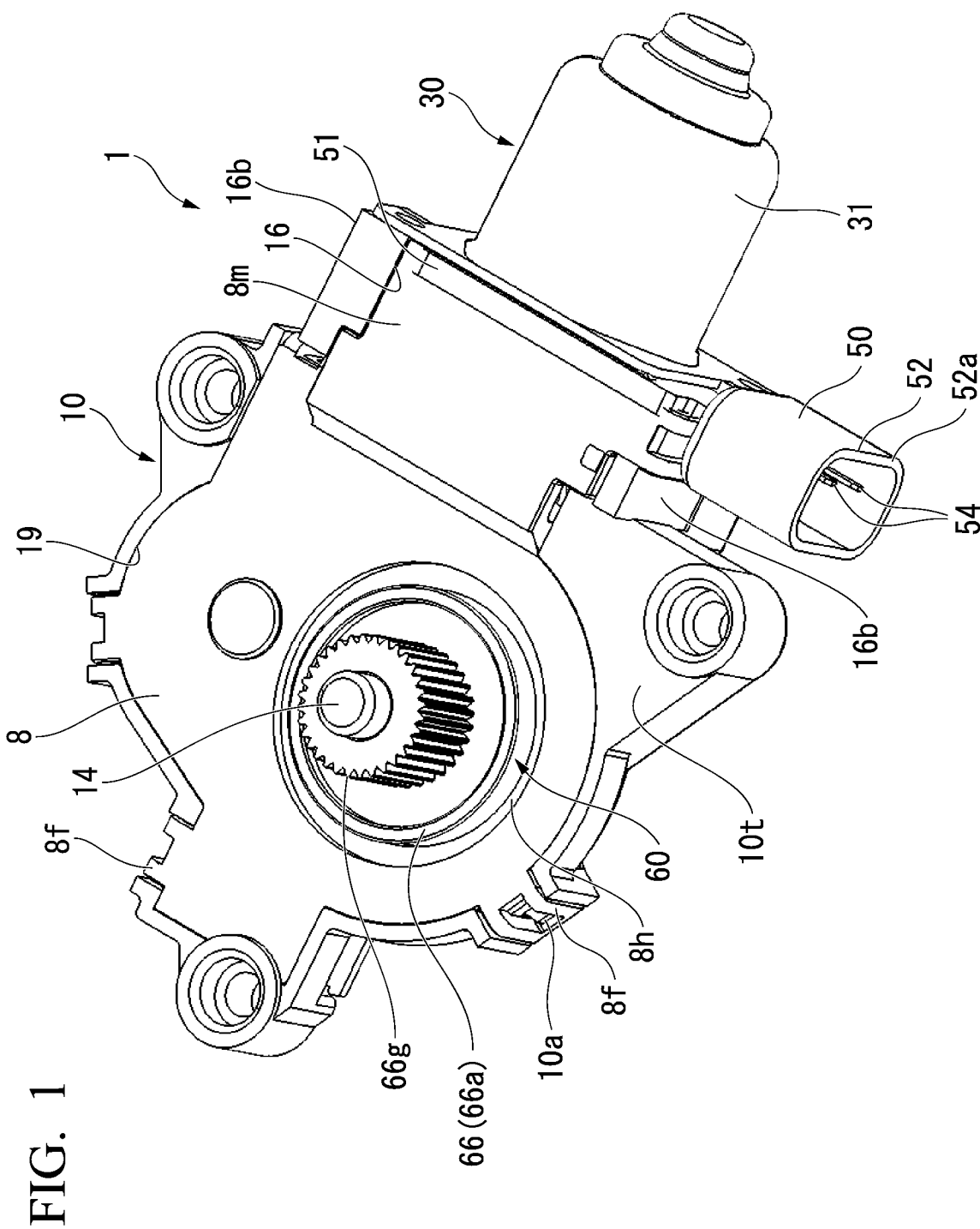
FIG. 1 is a perspective view showing an appearance of a speed reducer-attached motor according to a first embodiment of the present invention.
Figure 2:
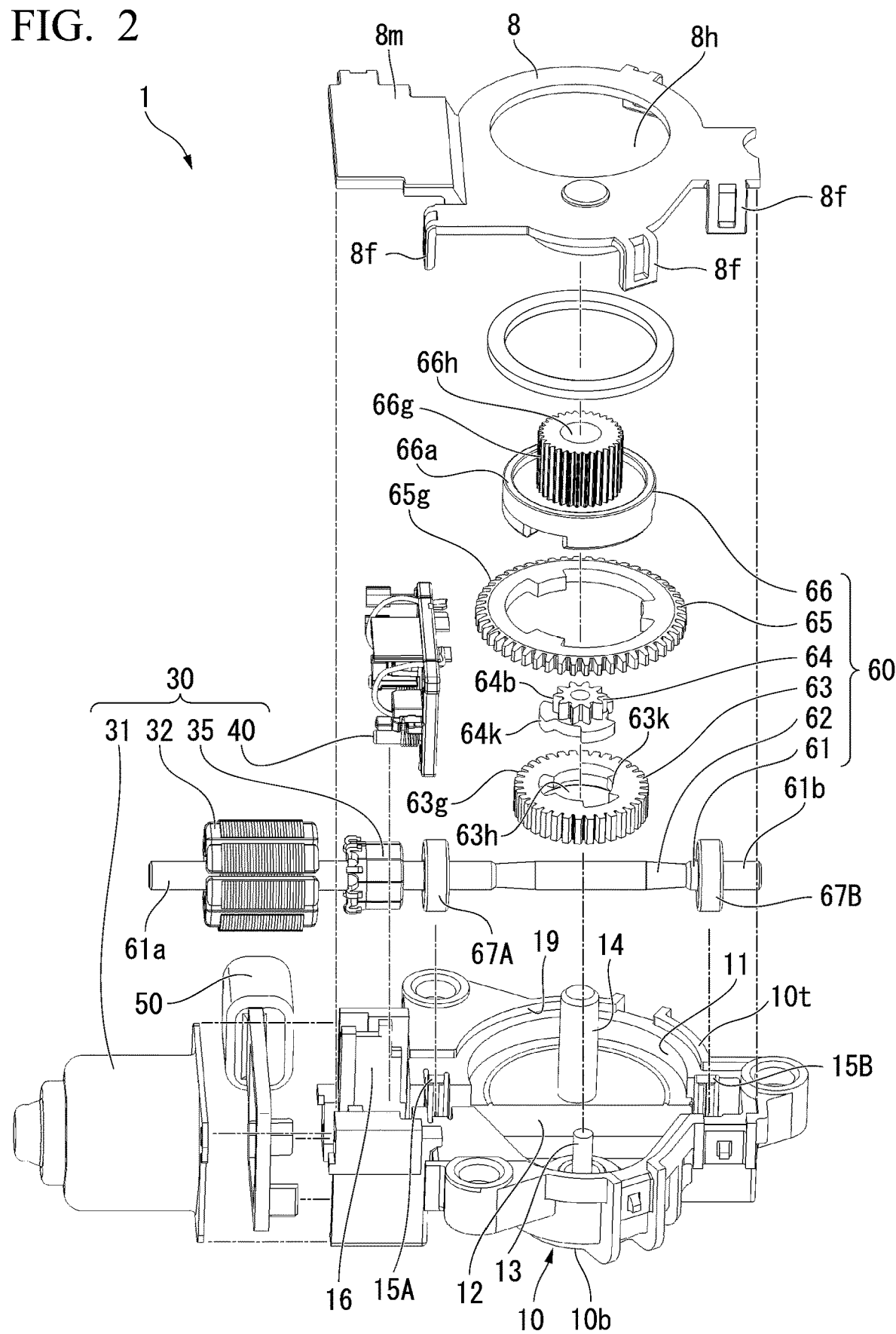
FIG. 2 is a perspective expansion view showing a component configuration of the speed reducer-attached motor according to the first embodiment of the present invention.
Figure 3:
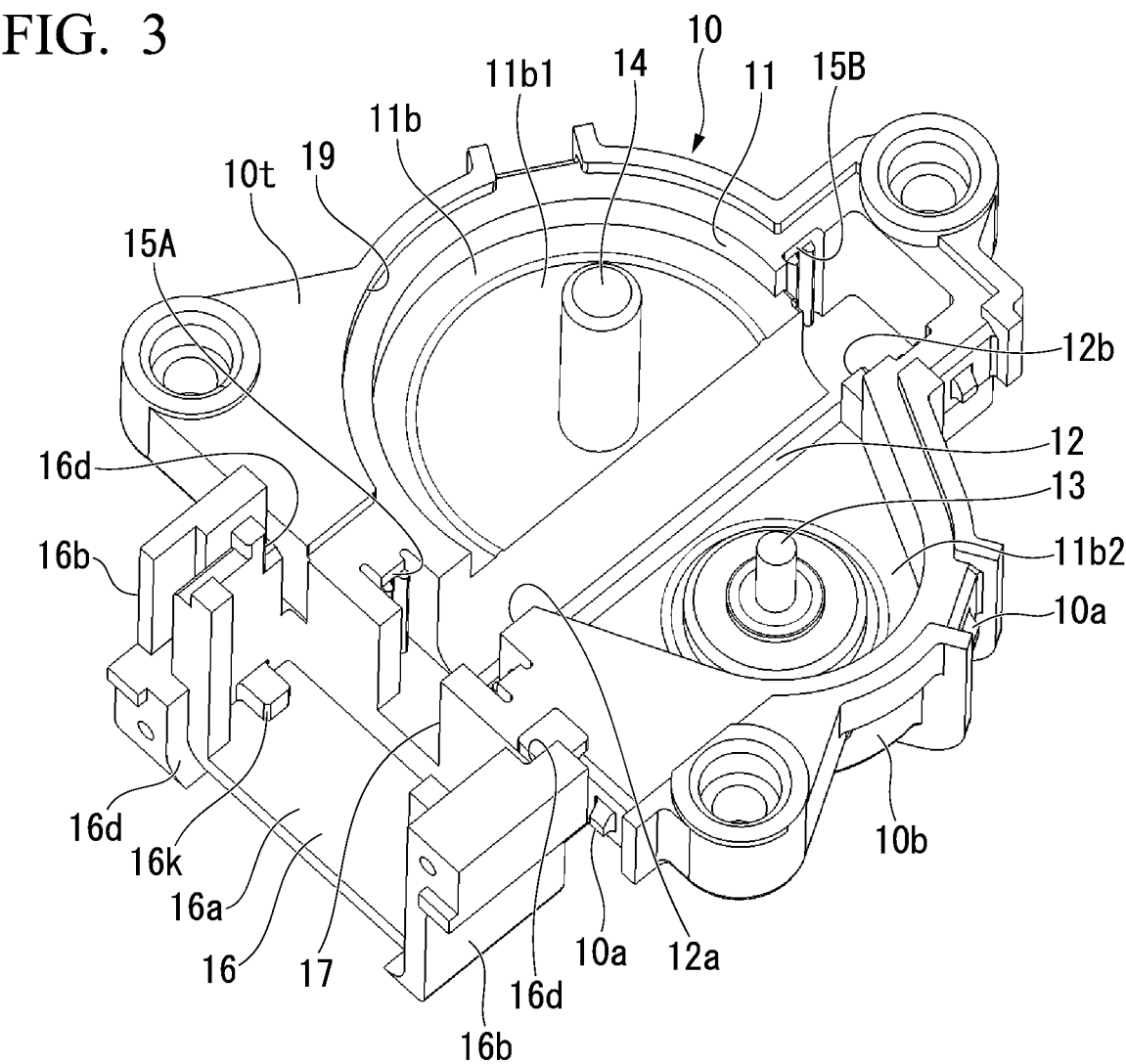
FIG. 3 is a perspective view showing a casing that constitutes the speed reducer-attached motor according to the first embodiment of the present invention.
Figure 4:
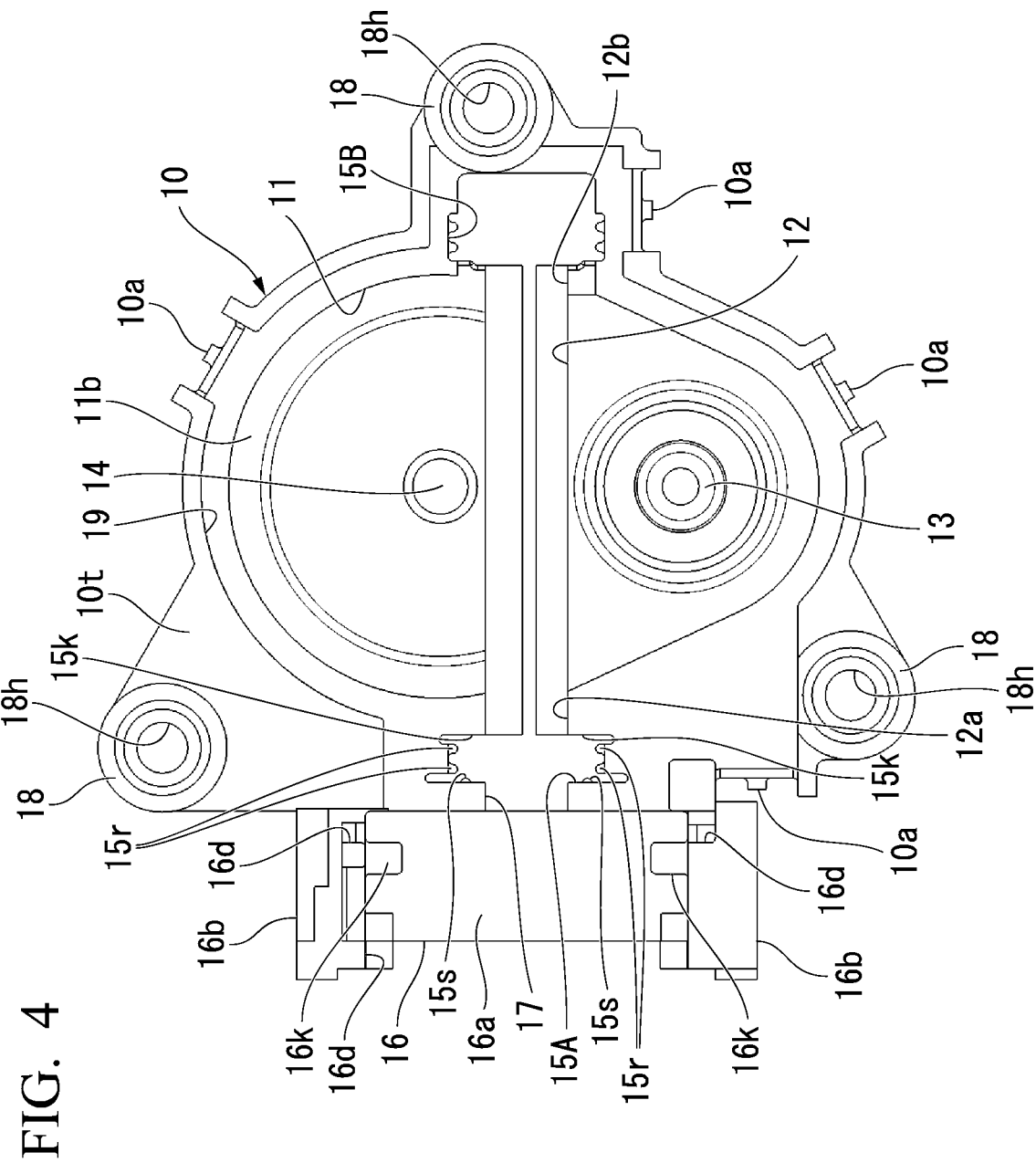
FIG. 4 is a plan view of the casing according to the first embodiment of the present invention.

FIG. 1 is a perspective view showing an appearance of a speed reducer-attached motor 1. FIG. 2 is a perspective expansion view showing a component configuration of the speed reducer-attached motor 1. FIG. 3 is a perspective view showing a casing 10 that constitutes the speed reducer-attached motor 1. FIG. 4 is a plan view of the casing 10.

As shown in FIG. 1 and FIG. 2, the speed reducer-attached motor 1 is a motor that is used, for example, for a power window apparatus of a vehicle and the like. The speed reducer-attached motor 1 includes the casing 10, a motor part 30 that is provided on one end side of the casing 10, and a speed reducer part 60 that is connected to the motor part 30 and that is accommodated inside the casing 10.

(Casing)

As shown in FIG. 2, FIG. 3, and FIG. 4, an accommodation recess part 11 that accommodates the speed reducer part 60 is formed on one surface side of the casing 10. The accommodation recess part 11 is recessed from a top surface portion (one surface) 10t of the casing 10 toward a back surface portion 10b that is opposed to the top surface portion 10t. A bottom surface 11b of the accommodation recess part 11 includes a shaft accommodation groove (shaft accommodation recess part) 12 that accommodates a rotation shaft 61 described later, a first shaft 13 that supports a worm wheel 63 (refer to FIG. 2) and the like, and a second shaft 14 that supports a drive gear 66 (refer to FIG. 2) and the like.

Here, as shown in FIG. 3 and FIG. 4, the shaft accommodation groove 12 is formed so as to extend in one direction along the bottom surface 11b of the accommodation recess part 11. The shaft accommodation groove 12 is formed such that each of one end part 12a and the other end part 12b of the shaft accommodation groove 12 extends to the outside of the accommodation recess part 11. Bearing accommodation recess parts (bearing accommodation recess parts) 15A, 15B are formed on the shaft accommodation groove 12 at a further outside position of the accommodation recess part 11.

The first shaft 13 and the second shaft 14 are provided so as to be orthogonal to the bottom surface 11b and to extend toward an opening direction (top surface portion 10t side) of the accommodation recess part 11. The first shaft 13 and the second shaft 14 are provided on one side and the other side so as to interpose the shaft accommodation groove 12.

A motor accommodation part 16 that accommodates a portion of the motor part 30 is formed on an outer circumferential part of the casing 10. The motor accommodation part 16 forms a substantially U shape in a cross-section having a bottom plate portion 16a that is formed on the same side as the bottom surface 11b of the accommodation recess part 11 and side wall portions 16b, 16b that stand toward the opening direction (top surface portion 10t side of the casing 10) of the accommodation recess part 11 from both sides of the bottom plate portion 16a.

Further, in the casing 10, an insertion recess part 17 which is recessed toward the back surface portion 10b side from the top surface portion 10t of the casing 10 and through which the rotation shaft 61 is inserted to the inside and the outside of the casing 10 is formed between the accommodation recess part 11 and the motor accommodation part 16. This insertion recess part 17 is formed so as to continue to the one end part 12a of the shaft accommodation groove 12.

A plurality of protrusion parts 18 that protrude toward the outer circumferential side are formed on an outer circumferential part of the casing 10. A bolt insertion hole 18h through which a bolt (not shown) that fixes the casing 10 to a vehicle body is inserted is formed on each of the protrusion parts 18.

Here, each of the protrusion parts 18 is formed at each of a total of three positions, that is, a position close to the other end part 12b of the shaft accommodation groove 12, and the one side and the other side that interpose the shaft accommodation groove 12 on the one end part 12a side of the shaft accommodation groove 12.

Further, a step part 19 that is recessed to the back surface portion 10b side from the top surface portion 10t is formed on the top surface portion 10t of the casing 10 at a circumferential edge portion of the accommodation recess part 11.

As shown in FIG. 1, a cover 8 having a substantially plate shape is fitted to this step part 19. A plurality of hook parts 8f that extend in one side of the cover 8 are formed on an outer circumferential part of the cover 8. Each of the hook parts 8f is engaged with an engagement protrusion 10a that is formed at each of a plurality of positions of the outer circumferential surface of the casing 10, and thereby, the cover 8 is fixed to the casing 10.

(Motor Part)

Figure 5:
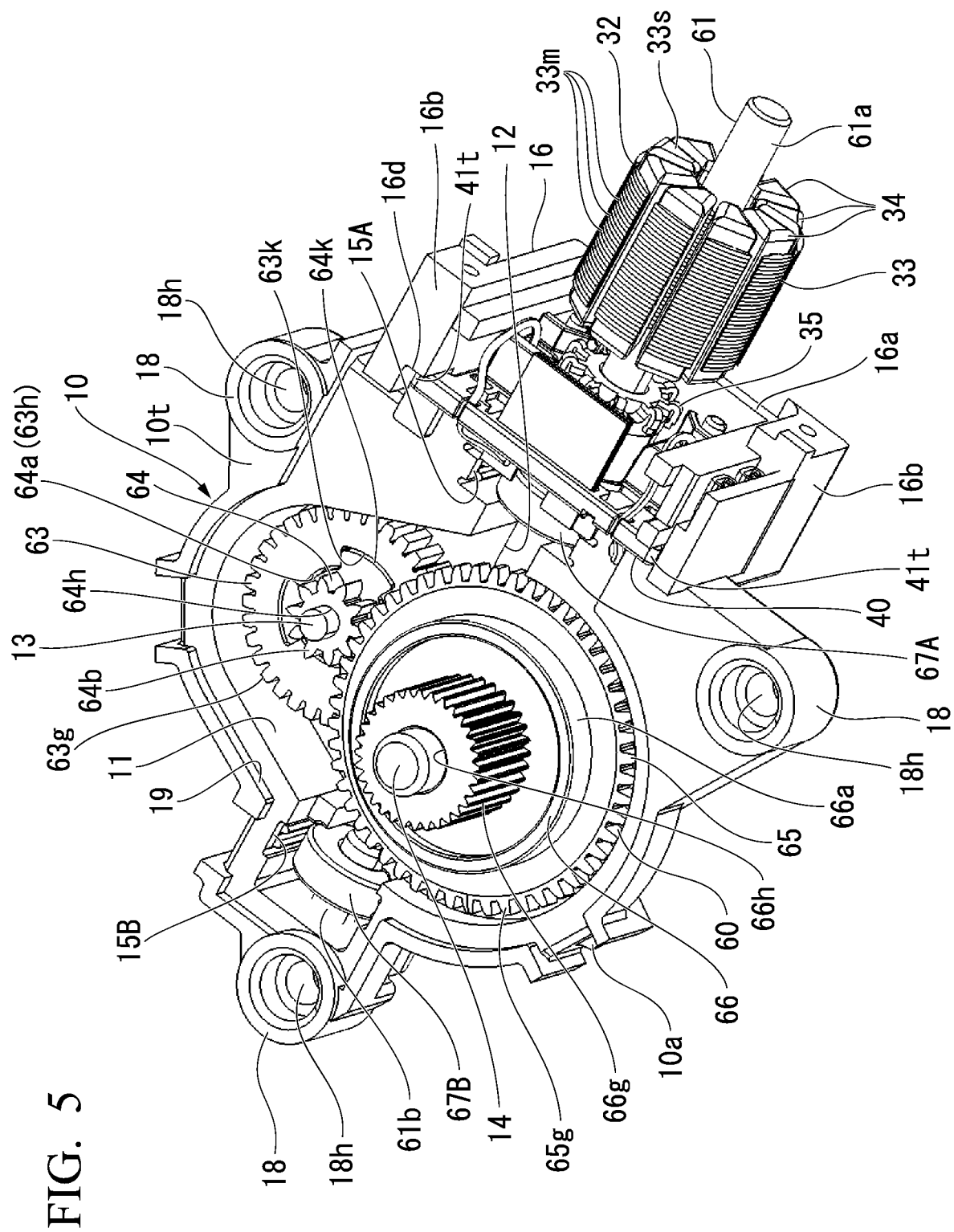
FIG. 5 is a perspective view showing a state in which a cover of the speed reducer-attached motor is removed according to the first embodiment of the present invention.
Figure 6:
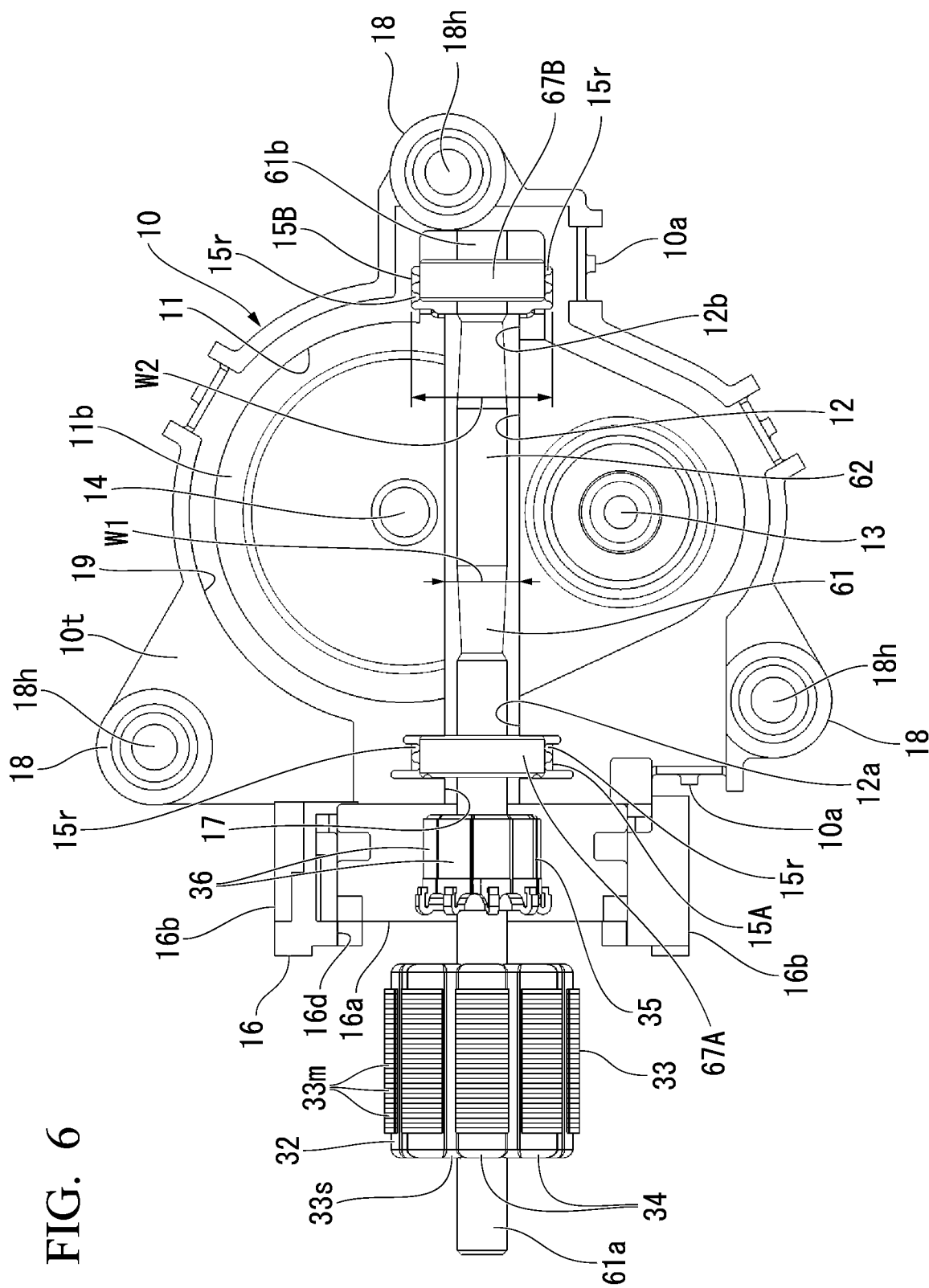
FIG. 6 is a plan view showing a state in which a rotation shaft on which an armature, a commutator, and a bearing are provided is assembled to the casing according to the first embodiment of the present invention.

FIG. 5 is a perspective view showing a state in which the cover of the speed reducer-attached motor 1 is removed. FIG. 6 is a plan view showing a state in which the rotation shaft 61 on which an armature 32, a commutator 35, and bearings 67A, 67B are provided is assembled to the casing 10.

As shown in FIG. 2, FIG. 5, and FIG. 6, for example, a brush-attached DC motor or the like is used for the motor part 30. The motor part 30 includes a yoke 31, the armature 32, the commutator 35, a brush holder 40 that holds a pair of brushes 43, 43, and a connector member 50 (refer to FIG. 1).

As shown in FIG. 1, the yoke 31 is fixed to an end portion of the motor accommodation part 16 that is provided on the outer circumferential surface of the casing 10 by a screw (not shown) or the like. The yoke 31 has a substantially cylindrical shape having a bottom, and a permanent magnet (not shown) is fitted to an inner circumferential surface of the yoke 31.

As shown in FIG. 5 and FIG. 6, the armature 32 has an armature core 33 and an armature coil 34.

The armature core 33 is externally fitted and fixed to one end 61a of the rotation shaft 61. The armature core 33 is formed by axially laminating a plurality of metal plates 33m having a substantially ring shape, and a plurality of slots 33s around which a winding is wound is formed.

The enamel-covered winding that is inserted through the slots is wound around, and thereby, a plurality of armature coils 34 are formed on the outer circumference of the armature core 33.

The commutator 35 defines a substantially cylinder shape and is externally fitted and fixed to the rotation shaft 61. The commutator 35 is arranged at a position that is separated by a predetermined length from the armature 32 that is provided on the one end 61a of the rotation shaft 61 to the other end 61b side of the rotation shaft 61. As shown in FIG. 6, a plurality of segments 35s that are formed of an electrically conductive material are attached in a circumferential direction on the outer circumferential surface of the commutator 35.

Figure 7:
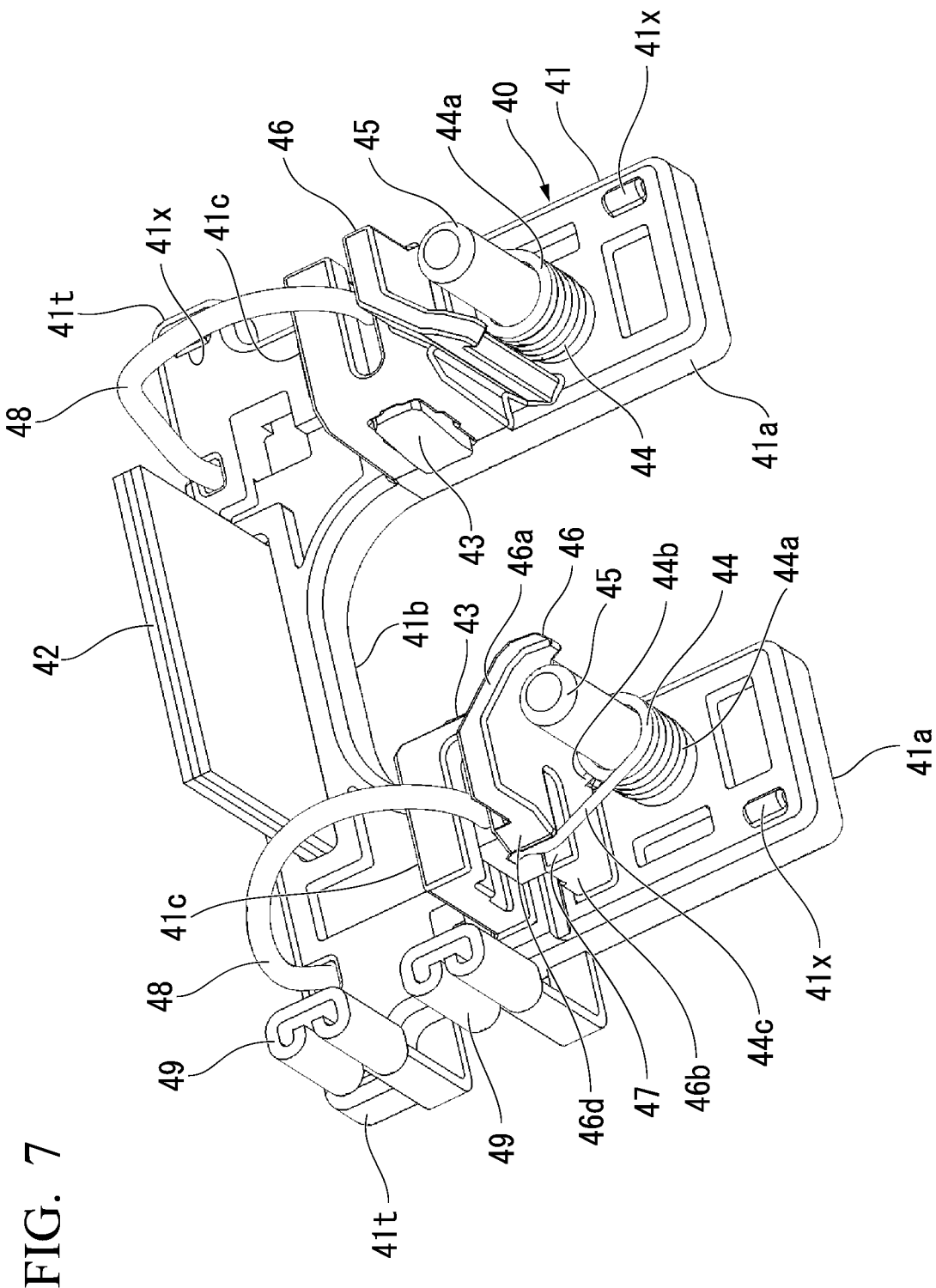
FIG. 7 is a perspective view showing a brush holder that constitutes a motor part according to the first embodiment of the present invention.
Figure 8:
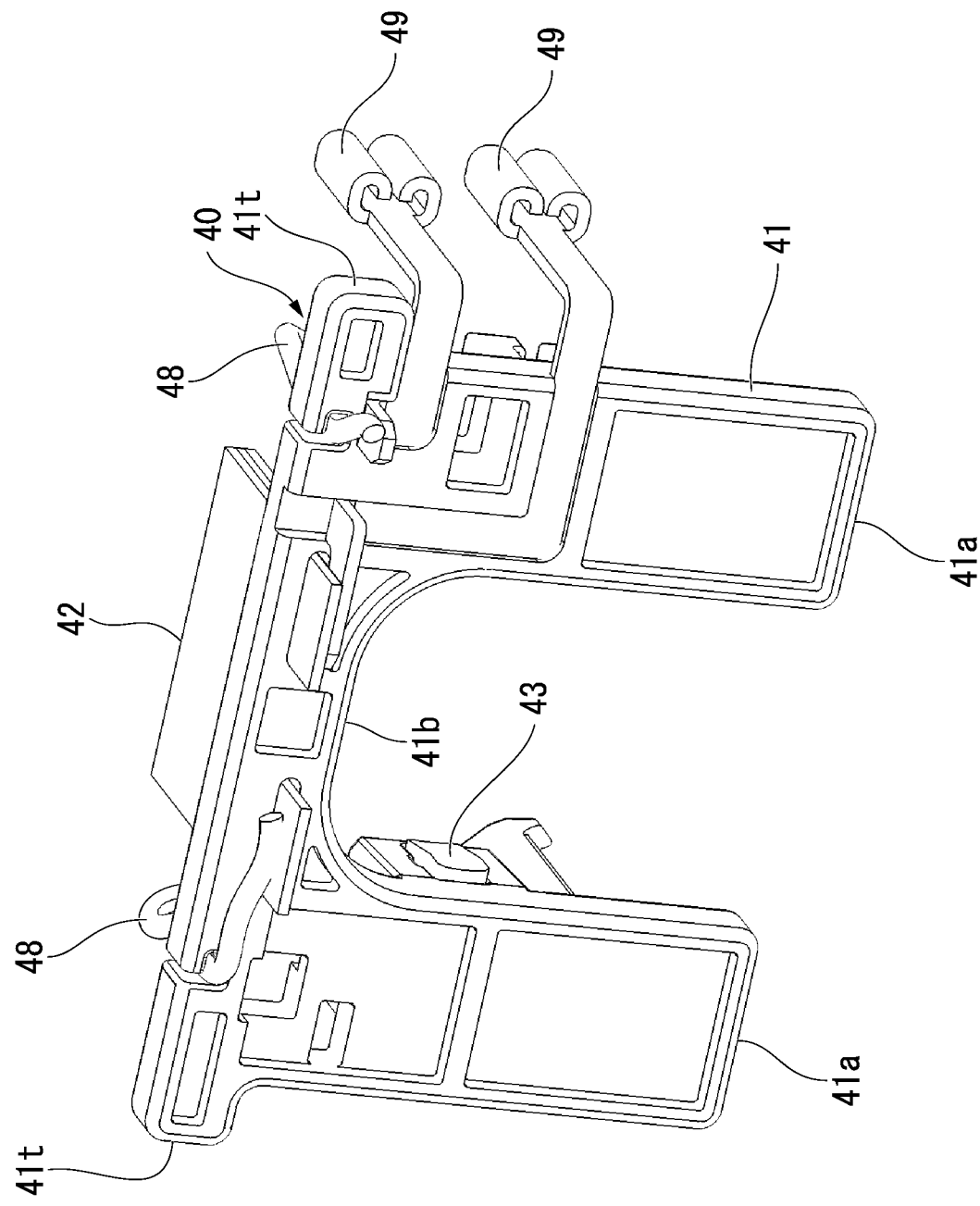
FIG. 8 is a perspective view of the brush holder when seen from a direction that is different from the direction of FIG. 7 according to the first embodiment of the present invention.
Figure 9:
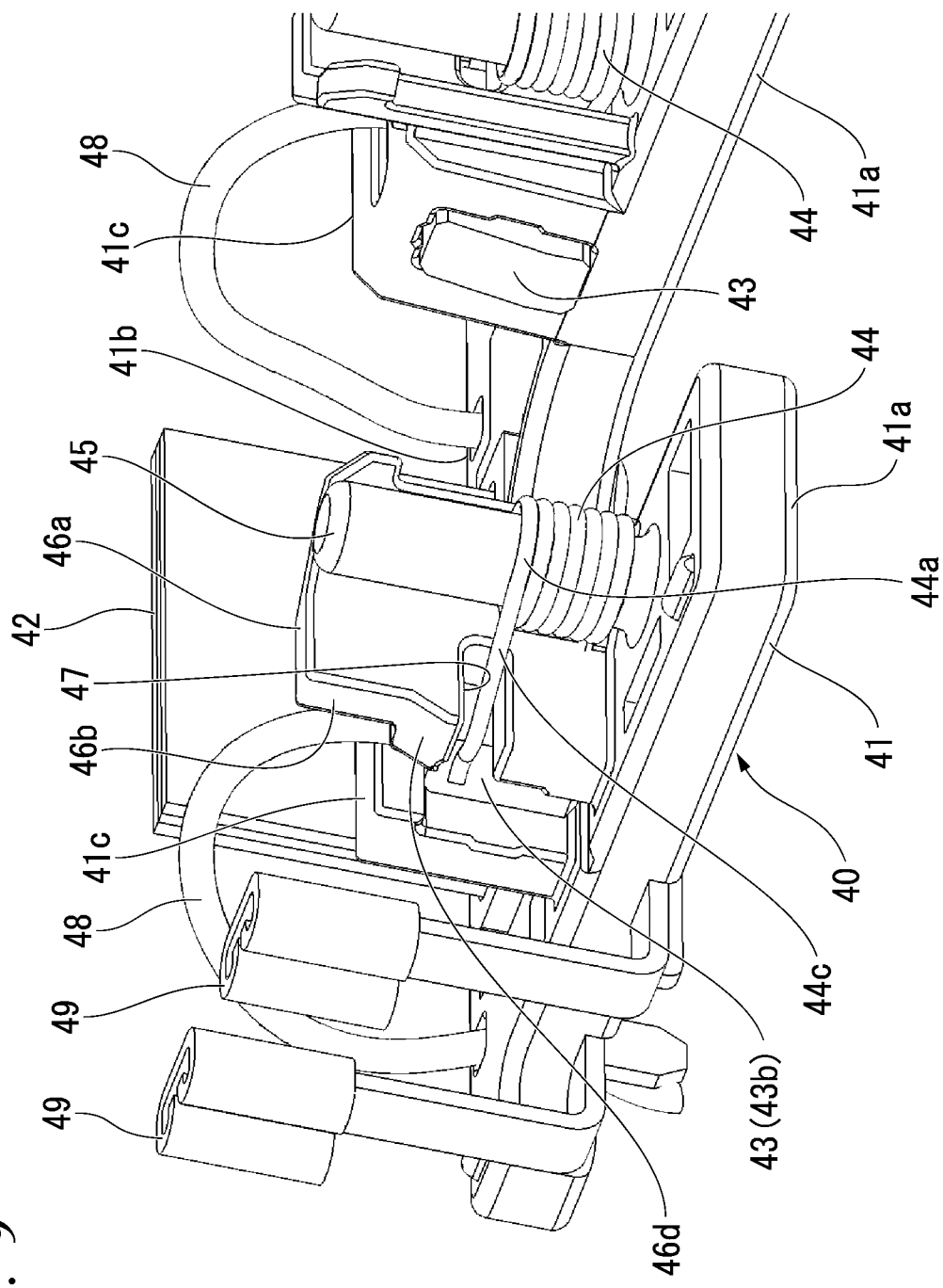
FIG. 9 is an enlarged perspective view showing a part of the brush holder according to the first embodiment of the present invention.

FIG. 7 is a perspective view showing the brush holder 40 that constitutes the motor part 30. FIG. 8 is a perspective view of the brush holder 40 when seen from a direction that is different from the direction of FIG. 7. FIG. 9 is an enlarged perspective view showing a part of the brush holder 40.

As shown in FIG. 7 and FIG. 8, the brush holder 40 includes a support plate 41 having a substantially plate shape, a thermistor 42, and the pair of brushes 43, 43 in slidable contact with the segment 35s of the commutator 35.

The support plate 41 is constituted of arm parts 41a, 41a that extend in parallel with each other and a connection part 41b that connects one end sides of the arm parts 41a, 41a together. The support plate 41 defines a gate shape.

The thermistor 42 is fixed to the connection part 41b of the support plate 41.

The brushes 43, 43 are held to be slidably movable along a direction in which the arm parts 41a, 41a face each other by brush-holding parts 41c, 41c that are formed on the arm parts 41a, 41a and that have a substantially angular tube shape.

As shown in FIG. 7 and FIG. 9, each brush 43 is biased toward the commutator 35 side by a spring 44.

The spring 44 has a coil part 44a around which a steel wire is wound in a spiral shape and extension parts 44b, 44c that are formed such that both end parts of the steel wire which forms the coil part 44a extend in a tangential direction from the coil part 44a. The spring 44 is provided such that the coil part 44a is inserted through a support post 45 that is provided so as to extend orthogonally to the surface of each arm part 41a.

Further, a wall portion 46 that stands in parallel with a central axis direction of the support post 45 is formed on the arm part 41a at a position that is separated outward in the radial direction of the support post 45. A bent section 46a that is bent in a substantially V shape in plan view is formed on the wall portion 46. One extension part 44b of the spring 44 is butted against the bent section 46a. Further, a recess 47 in which the other extension part 44c of the spring 44 is inserted is formed on a side end section 46b of the wall portion 46. A slant surface 46d that protrudes more laterally as approaching closer to the recess 47 from a side that is separated from the arm part 41a is formed on the side end section 46b.

The extension part 44c of the spring 44 is inserted in the inside of the recess 47 and biases a rear end part 43b of the brush 43 that is held by the brush-holding part 41c to a protruding direction inward from the brush-holding part 41c.

Thereby, the brush 43 is in slidable contact with the segment 35s that is formed on the outer circumferential surface of the commutator 35.

Connection terminals 49, 49 that are connected to the brushes 43, 43 via wirings 48, 48 are provided on the support plate 41. Here, one connection terminal 49 is connected to the thermistor 42, and the thermistor 42 and one brush 43 are connected together via the wiring 48.

Figure 10:
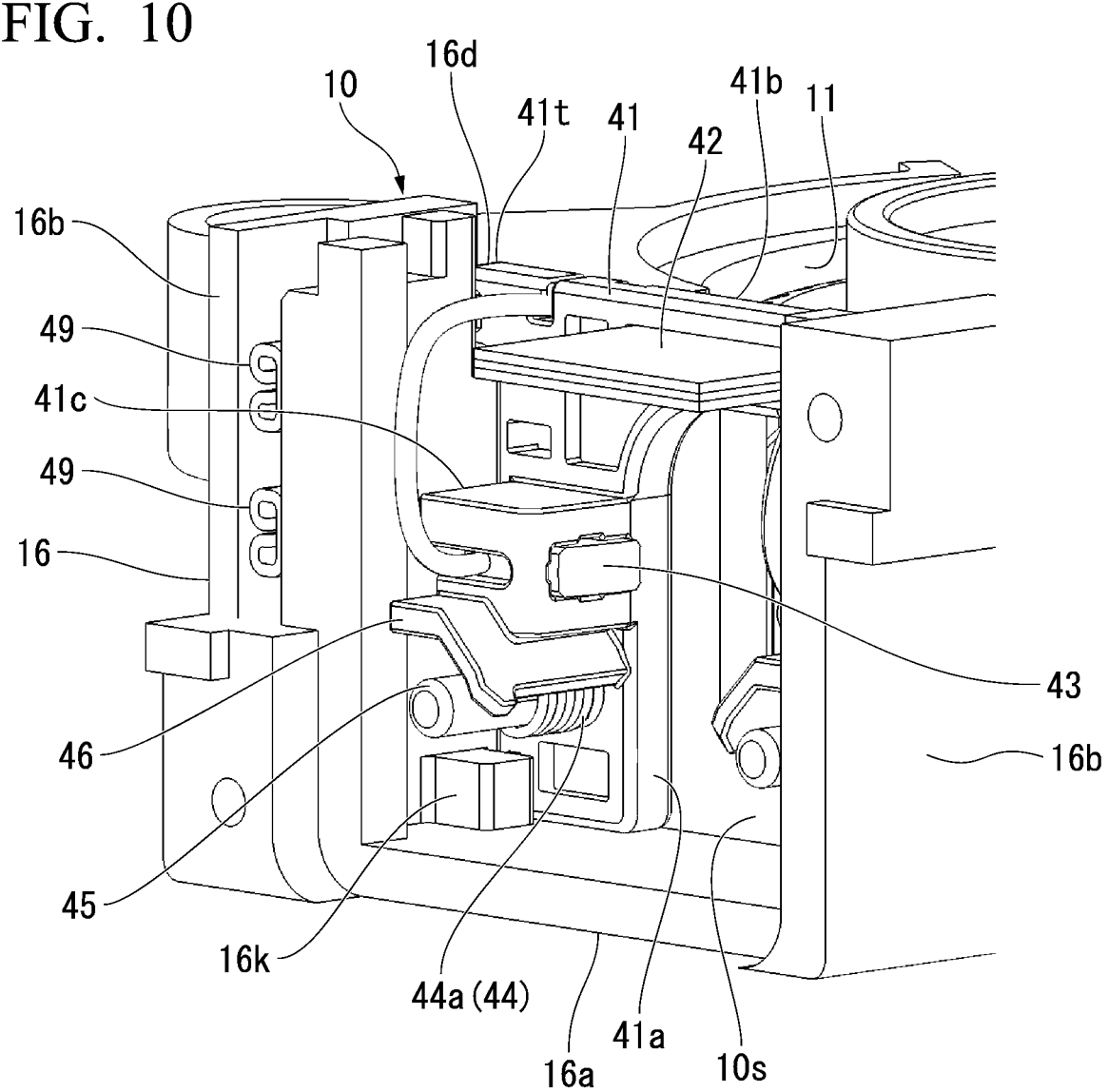
FIG. 10 is a perspective view showing a state in which the brush holder is assembled to a motor accommodation part of the casing according to the first embodiment of the present invention.

FIG. 10 is a perspective view showing a state in which the brush holder 40 is assembled to the motor accommodation part 16 of the casing 10.

As shown in FIG. 10, the brush holder 40 is provided inside the motor accommodation part 16 that is provided on the outer circumferential surface of the casing 10.

As shown in FIG. 7 and FIG. 9, protrusion portions 41t, 41t that protrude outward in the width direction are formed at both end portions in the width direction of the connection part 41b on the support plate 41 of the brush holder 40. Further, as shown in FIG. 10, the brush holder 40 engages each protrusion portion 41t with a step portion 16d that is formed on the top surface portion 10t side of the casing 10 in the side wall portion 16b of the motor accommodation part 16 in a state where the support plate 41 is directed along an outer side surface 10s of the casing 10 inside the motor accommodation part 16.

Further, as shown in FIG. 3 and FIG. 4, latch blocks 16k, 16k that have a substantially cuboid shape and that protrude toward the top surface portion 10t side of the casing 10 are formed at a position along the side wall portions 16b, 16b on the bottom plate portion 16a of the motor accommodation part 16.

As shown in FIG. 10, a front end of each arm part 41a of the brush holder 40 is inserted in a space between the latch block 16k and the outer side surface 10s of the casing 10.

In this state, the connection terminals 49, 49 are provided so as to extend in a direction that is parallel to the central axis of the shaft accommodation groove 12 (refer to FIG. 3).

Here, as shown in FIG. 7, a protrusion 41x is formed on the support plate 41 of the brush holder 40 at a position that is butted against each of the side wall portions 16b, 16b, the step portions 16d, 16d, the latch blocks 16k, 16k, and the like of the motor accommodation part 16. The support plate 41 is pressed into and held by the motor accommodation part 16 by the protrusions 41x.

Figure 11:
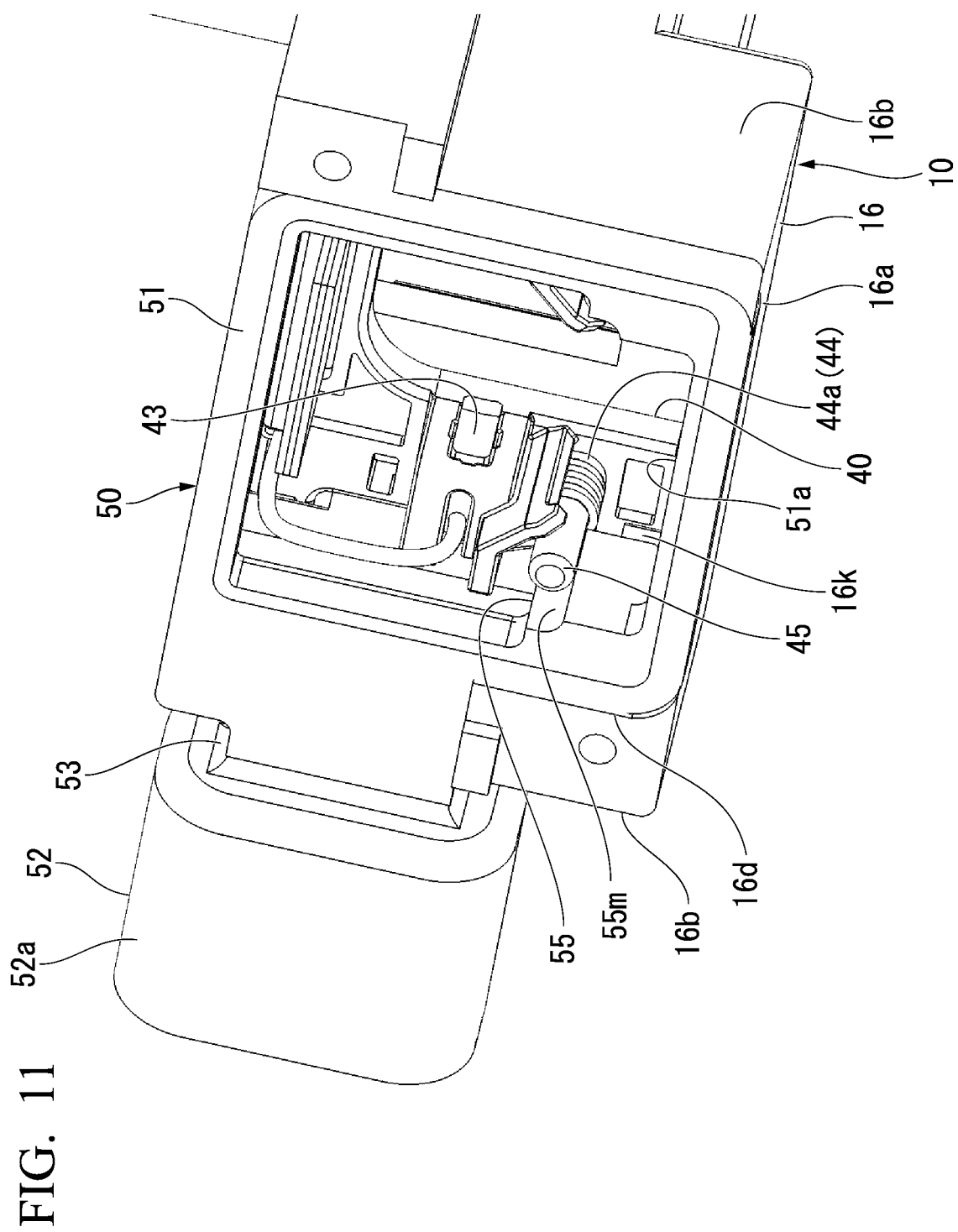
FIG. 11 is a perspective view showing a connector member that is mounted on the casing according to the first embodiment of the present invention.
Figure 12:
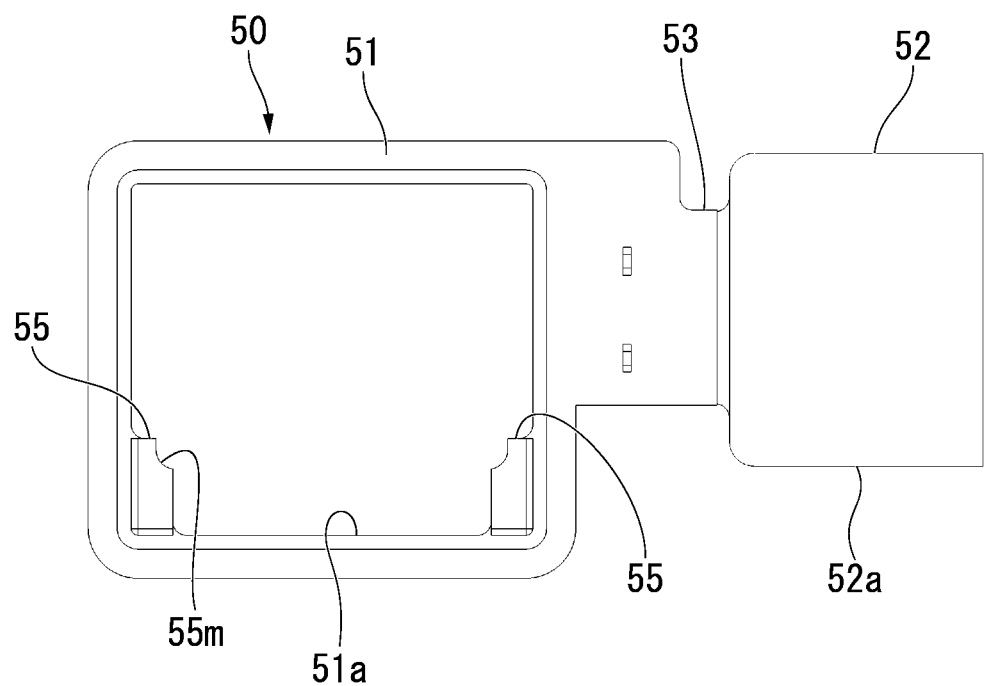
FIG. 12 is a view showing a configuration of the connector member according to the first embodiment of the present invention.
Figure 13:
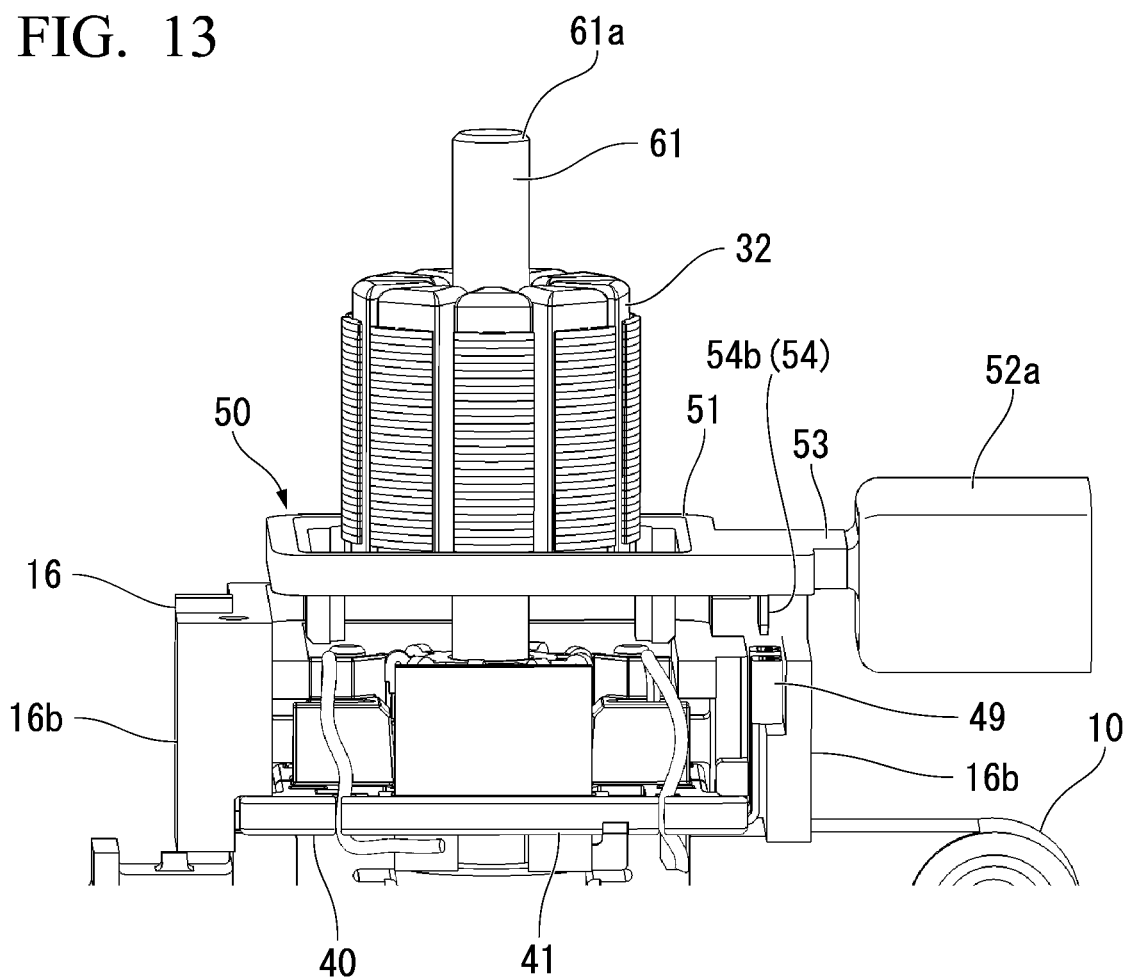
FIG. 13 is a perspective view showing a state in which the connector member is connected to the brush holder according to the first embodiment of the present invention.

FIG. 11 is a perspective view showing the connector member 50 that mounted on the casing 10. FIG. 12 is a view showing a configuration of the connector member 50. FIG. 13 is a perspective view showing a state in which the connector member 50 is connected to the brush holder 40.

As shown in FIG. 11 and FIG. 12, the connector member 50 includes a frame part 51 and a connector reception part 52 integrally.

The frame part 51 has a substantially rectangle shape having an opening portion 51a at an inner position and is fitted to the step portion 16d that is formed on an end portion of the motor accommodation part 16. An extension portion 53 that extends toward the one side wall portion 16b side is integrally formed on the frame part 51. The connector reception part 52 is provided on a front end of the extension portion 53.

An opening portion 51a of the frame part 51 of the connector member 50 is covered by being provided with the yoke 31 (refer to FIG. 1).

The connector reception part 52 has a hood 52a which has a substantially tube shape having a bottom and in which a connector (not shown) that is provided on a front end of a harness which is connected to the vehicle body side is inserted.

As shown in FIG. 1, one end part of a terminal member 54 that is electrically connected to a harness-side terminal (not shown) which is provided on the connector is held inside the hood 52a.

The connector member 50 is provided on an end portion of the motor accommodation part 16 and is arranged close to the brush holder 40. As shown in FIG. 13, the other end part 54b of the terminal member 54 is guided to the back surface side of the frame part 51. Further, the other end part 54b of the terminal member 54 extends in a direction that is orthogonal to a plane at which the frame part 51 is positioned. The other end part 54b of the terminal member 54 is connected to the connection terminal 49 of the brush holder 40 that is held inside the motor accommodation part 16.

The connector (not shown) of the harness that is connected to an external electric source (not shown) is connected to such a connector reception part 52 of the connector member 50. Thereby, it is possible to supply electric power of the external electric source to the motor part 30.

Further, as shown in FIG. 11 and FIG. 12, the connector member 50 includes protrusions 55, 55 integrally at the inside of the frame part 51. Each protrusion 55 is formed so as to protrude toward the outer side surface 10s side of the casing 10 along the side wall portion 16b of the motor accommodation part 16. A front end of the protrusion 55 is arranged to face the latch block 16k in a state where the connector member 50 is mounted on the motor accommodation part 16.

Further, a recess groove 55m is formed at a part that faces the support post 45 of the brush holder 40 on each protrusion 55. The recess groove 55m is formed so as to face the outer circumferential surface of the support post 45 to be spaced with a spacing that is smaller than a wire diameter of a wire material that forms the coil part 44a of the spring 44.

(Speed Reducer Part)

As shown in FIG. 2 and FIG. 5, the speed reducer part 60 includes the rotation shaft 61, a worm gear 62, a worm wheel (gear) 63, a pinion gear (gear) 64, a spar gear (gear) 65, and a drive gear (gear) 66.

As shown in FIG. 6, a portion of the rotation shaft 61 closer to the other end 61b side than the armature 32 and the commutator 35 of the motor part 30 described above that is provided on the one end 61a side is accommodated in the shaft accommodation groove 12 of the casing 10. Each of the bearings 67A, 67B having a substantially annular shape is externally fitted to the rotation shaft 61 at each of two positions that are spaced in the central axis direction of the rotation shaft 61.

The bearings 67A, 67B are constituted of a so-called rolling bearing and are fitted to the bearing accommodation recess parts 15A, 15B that are formed on the casing 10.

As shown in FIG. 4, each of a pair of two elastically deformable ribs 15r that extend toward a bottom surface 15c of each of the bearing accommodation recess parts 15A, 15B from the top surface portion 10t side of the casing 10 is provided to protrude on each of the bearing accommodation recess parts 15A, 15B at each of both sides in the radial direction that is orthogonal with respect to the central axis of the shaft accommodation groove 12. By the bearings 67A, 67B being butted against the bottom surface 15c of each of the bearing accommodation recess parts 15A, 15A, and by both sides in the radial direction of the bearings 67A, 67B being sandwiched and held by the ribs 15r, 15r, the movement in the radial direction is restricted.

Figure 14:
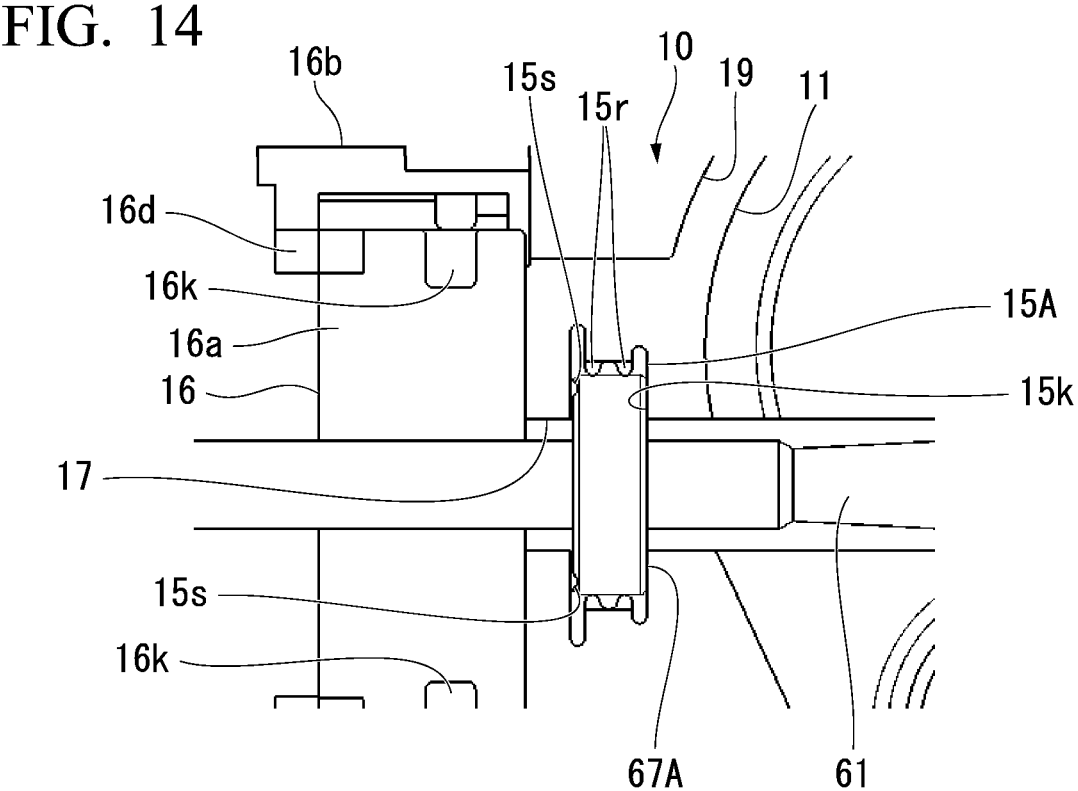
FIG. 14 is a plan view showing a state in which a bearing that is provided on one end side of the rotation shaft is fitted to a bearing accommodation recess part according to the first embodiment of the present invention.

FIG. 14 is a plan view showing a state in which the bearing 67A that is provided on one side of the rotation shaft 61 is fitted to the bearing accommodation recess part 15A.

As shown in FIG. 4 and FIG. 14, a positioning surface 15k that is orthogonal to the central axis direction of the shaft accommodation groove 12 is formed at a side close to the accommodation recess part 11 on the bearing accommodation recess part 15A of the motor accommodation part 16 side. Further, in the bearing accommodation recess part 15A, a positioning rib (press part) 15s is formed on a surface that faces the positioning surface 15k. The positioning rib 15s is formed to protrude toward the positioning surface 15k from the surface that faces the positioning surface 15k. Further, the positioning rib 15s is formed between the bottom surfaces 15c of the bearing accommodation recess parts 15A, 15B and the top surface portion 10t side of the casing 10.

As shown in FIG. 14, the bearing 67A that is provided on one side of the rotation shaft 61 is butted against the positioning surface 15k and is pressed to the positioning surface 15k side by the positioning rib 15s that is provided on the opposite side of the rotation shaft 61. Thereby, positioning of the bearing 67A in the central axis direction of the rotation shaft 61 is performed.

As shown in FIG. 6, the bearing accommodation recess part 15B on a side that is separated from the motor accommodation part 16 has an opening size that is larger than a thickness in the axial direction of the bearing 67B. The bearing 67B and the other end 61b of the rotation shaft 61 are accommodated in the bearing accommodation recess part 15B. Only the movement in the radial direction of the bearing 67B is restricted by the bottom surface 15c and the ribs 15r, 15r at both sides of the radial direction.

The worm gear 62 is formed integrally with the rotation shaft 61 at a middle part of the bearings 67A, 67B. The rotation shaft 61 on which the worm gear 62 is provided is arranged inside the shaft accommodation groove 12.

Here, a width size W1 in a direction that is orthogonal to the rotation shaft 61 in the shaft accommodation groove 12 is set to be smaller than a width size W2 in the bearing accommodation recess parts 15A, 15B.

As shown in FIG. 2 and FIG. 5, the pinion gear 64 includes integrally an engagement plate part 64a having a substantially plate shape and a gear part 64b that has a toothed wheel shape and that is formed so as to protrude in the axial direction from one surface side of the engagement plate part 64a.

An engagement protrusion part 64k that has a substantially fan shape and that protrudes outward in the radial direction is formed on the outer circumferential portion of the engagement plate part 64a, for example, at each of three positions such that the engagement protrusion parts 64k are spaced in the circumferential direction.

A shaft insertion hole 64h in which the first shaft 13 that is formed on the casing 10 is inserted is formed on the pinion gear 64. The first shaft 13 is inserted in the shaft insertion hole 64h, and thereby, the pinion gear 64 is supported rotatably around the first shaft 13.

The worm wheel 63 is formed in a substantially circular plate shape, and a gear tooth 63g that is engaged with the worm gear 62 is formed on the outer circumferential surface.

An insertion hole 63h that penetrates in the central axis direction of the worm wheel 63 is formed on the middle part in the radial direction of the worm wheel 63. Further, an engagement recess part 63k which has a substantially fan shape, with which the engagement protrusion part 64k of the pinion gear 64 is engaged, and which is recessed outward in the radial direction is formed around the insertion hole 63h, for example, at each of three positions such that the engagement recess parts 63k are spaced in the circumferential direction.

The pinion gear 64 is inserted in the insertion hole 63h, and thereby, the worm wheel 63 is supported rotatably around the first shaft 13 integrally with the pinion gear 64.

The worm wheel 63 and the pinion gear 64 are rotated around the first shaft 13 when the rotation shaft 61 is driven to be rotated around the central axis of the rotation shaft 61 by the motor part 30.

The spar gear 65 is formed in a substantially circular plate shape, and a gear tooth 65g that is engaged with the gear part 64b of the pinion gear 64 is formed on the outer circumferential surface of the spar gear 65.

An insertion hole (not shown) that penetrates in the central axis direction of the spar gear 65 is formed on the middle part in the radial direction of the spar gear 65 similarly to the worm wheel 63. An engagement recess part (not shown) having a substantially fan shape is formed around the insertion hole, for example, at each of three positions such that the engagement recess parts are spaced in the circumferential direction.

The drive gear 66 includes integrally a plate part 66a having a substantially circular plate shape and a gear part 66g that has a toothed wheel shape and that is formed on one surface side of the plate part 66a.

In the plate part 66a, an engagement protrusion (not shown) that is engaged with an engagement recess part (not shown) of the spar gear 65 is provided to protrude on the opposite side of the gear part 66g.

Further, a shaft insertion hole 66h in which the second shaft 14 that is formed on the casing 10 is inserted is formed on the drive gear 66. Thereby, the spar gear 65 and the drive gear 66 are provided rotatably around the second shaft 14.

Figure 15:
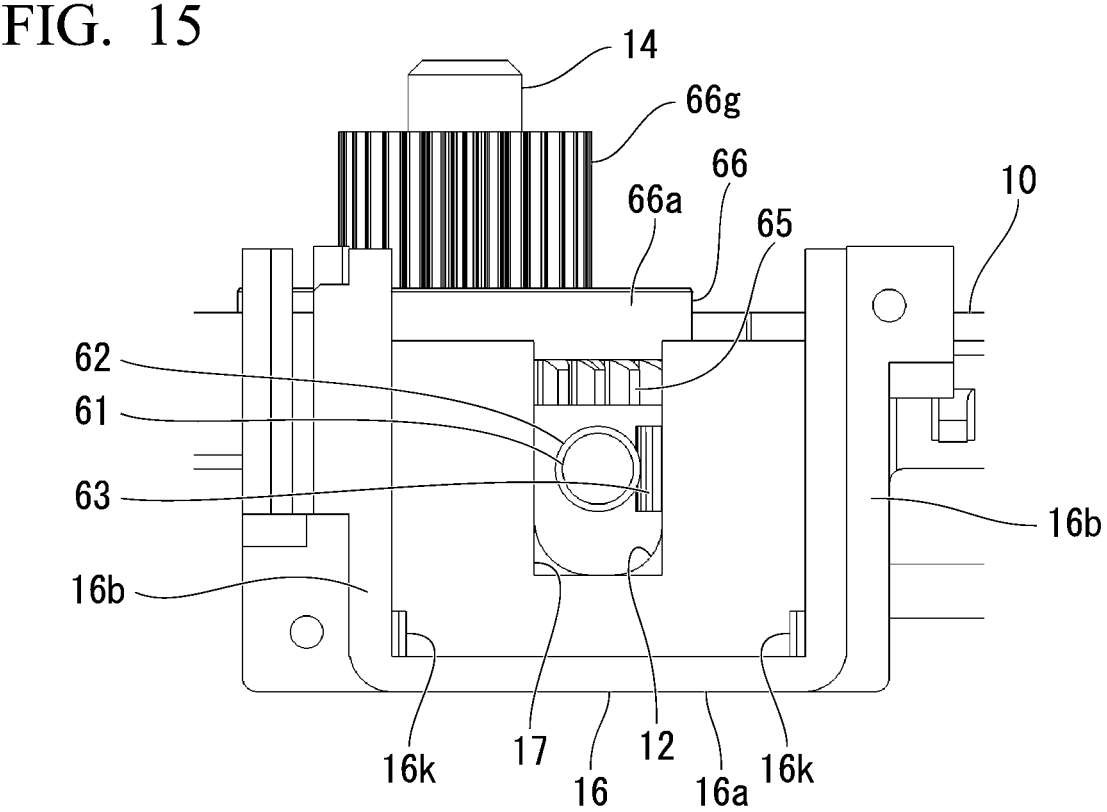
FIG. 15 is a view of the casing when seen from a central axis direction of the rotation shaft and is a view showing a position relationship of the rotation shaft, a worm wheel, and a spar gear according to the first embodiment of the present invention.

Here, as shown in FIG. 3, a bottom surface 11b1 of the second shaft 14 of the accommodation recess part 11 of the casing 10 is formed at a position that is closer to the top surface portion 10t of the casing 10 than a bottom surface 11b2 of the first shaft 13. Thereby, as shown in FIG. 15, the outer circumferential part of the spar gear 65 is arranged above the rotation shaft 61 so as to straddle the rotation shaft 61. Further, the spar gear 65 is arranged at a higher position than the worm wheel 63 that is engaged with the worm gear 62.

Such a speed reducer part 60 is accommodated inside the accommodation recess part 11. As shown in FIG. 1, the speed reducer part 60 is covered by the cover 8 that is mounted on the casing 10 except for part of the drive gear 66. A plate part 66a and the gear part 66g of the drive gear 66 is exposed to the outside of the cover 8 from a circular opening part 8h that is formed on the cover 8. Further, a window regulator that opens and closes a vehicle window and the like are engaged with the gear part 66g.

(Operation of Speed Reducer Motor)

When the motor part 30 of the speed reducer-attached motor 1 is driven, the worm wheel 63 is rotated via the rotation shaft 61 and the worm gear 62. Then, the drive gear 66 is rotated together with the worm wheel 63, and it is possible to output a drive force that operates the vehicle window to be moved upward and downward from the gear part 66g of the drive gear 66.

Here, the speed of the speed reducer part 60 is reduced in two steps by the engagement between the worm gear 62 and the worm wheel 63 and the engagement between the pinion gear 64 and the spar gear 65.

(Assembly Method of Speed Reducer-Attached Motor)

Next, an assembly method of the speed reducer-attached motor 1 having the above configuration is described.

Figure 16:
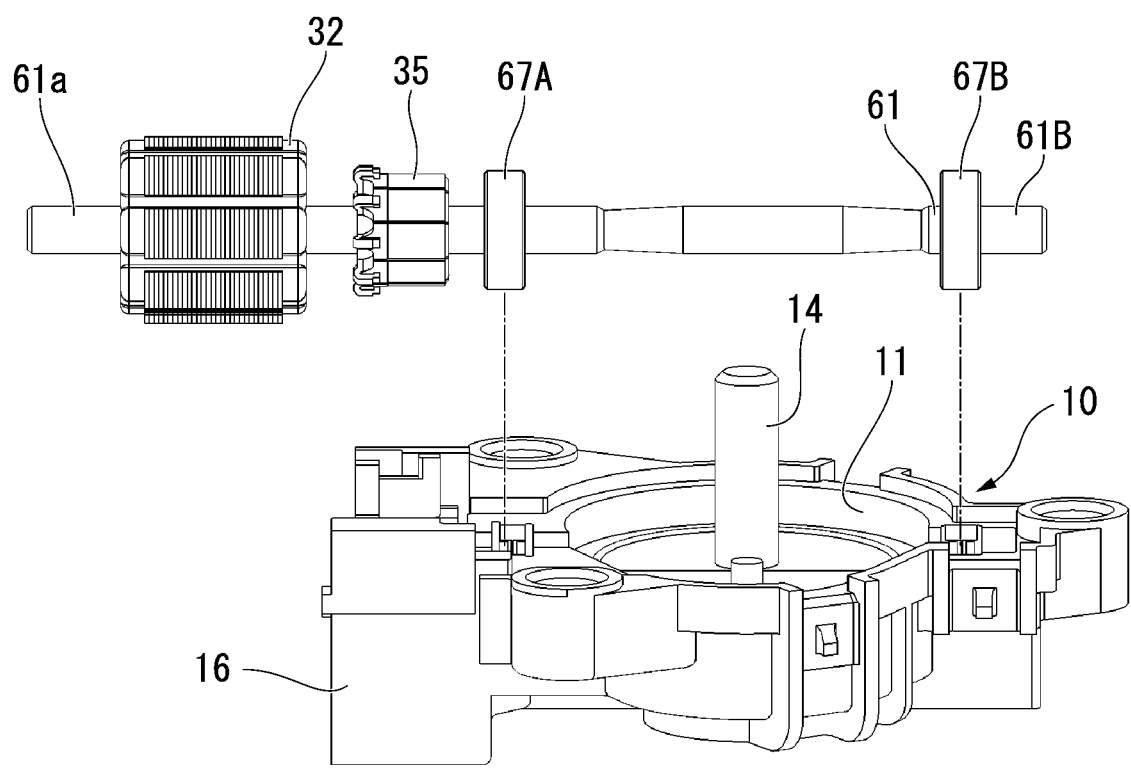
FIG. 16 is a perspective view showing a state before the rotation shaft is assembled to the casing according to the first embodiment of the present invention.
Figure 17:
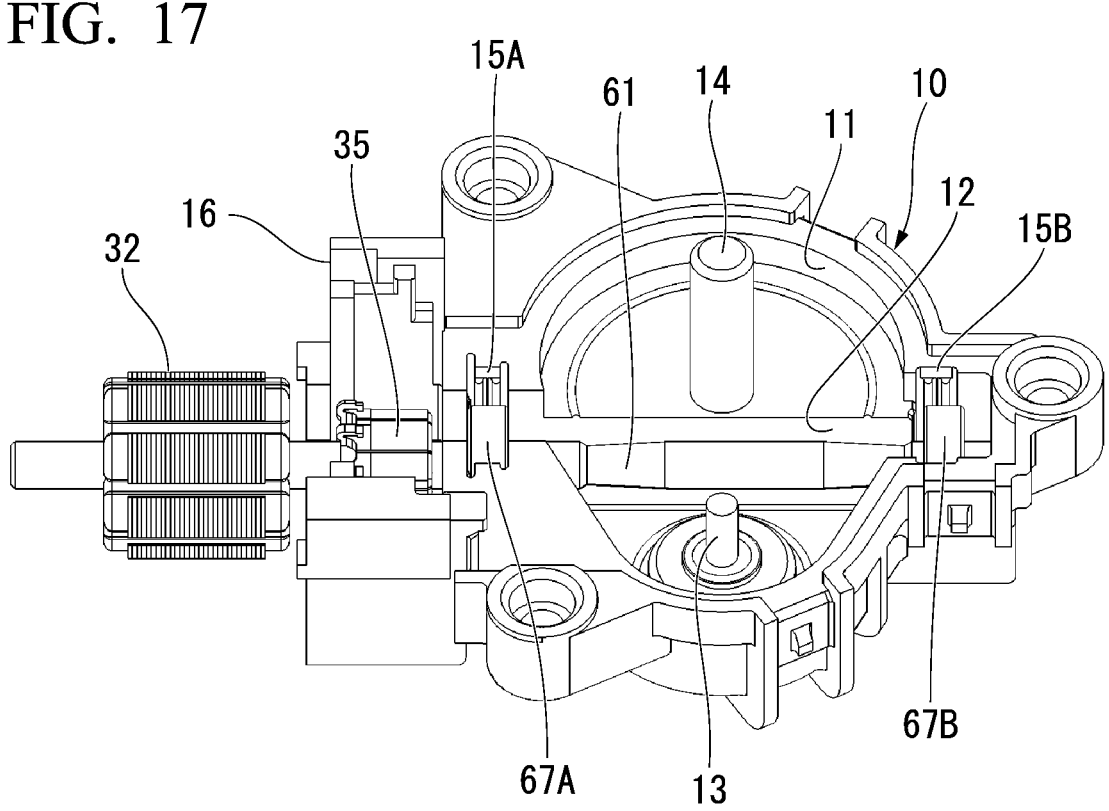
FIG. 17 is a perspective view showing a state in which the rotation shaft is assembled to the casing according to the first embodiment of the present invention.
Figure 18:
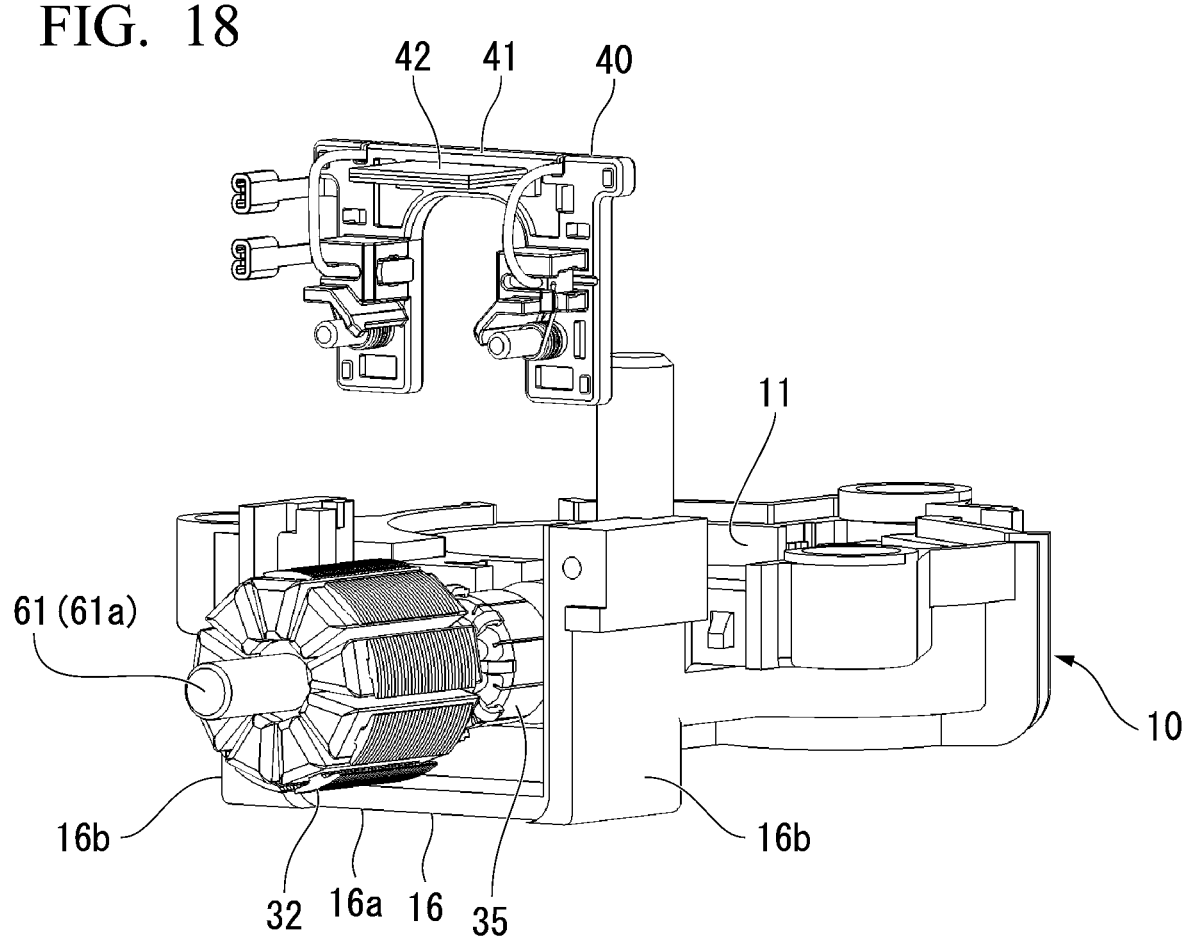
FIG. 18 is a perspective view showing a state before the brush holder is assembled to the casing according to the first embodiment of the present invention.
Figure 19:
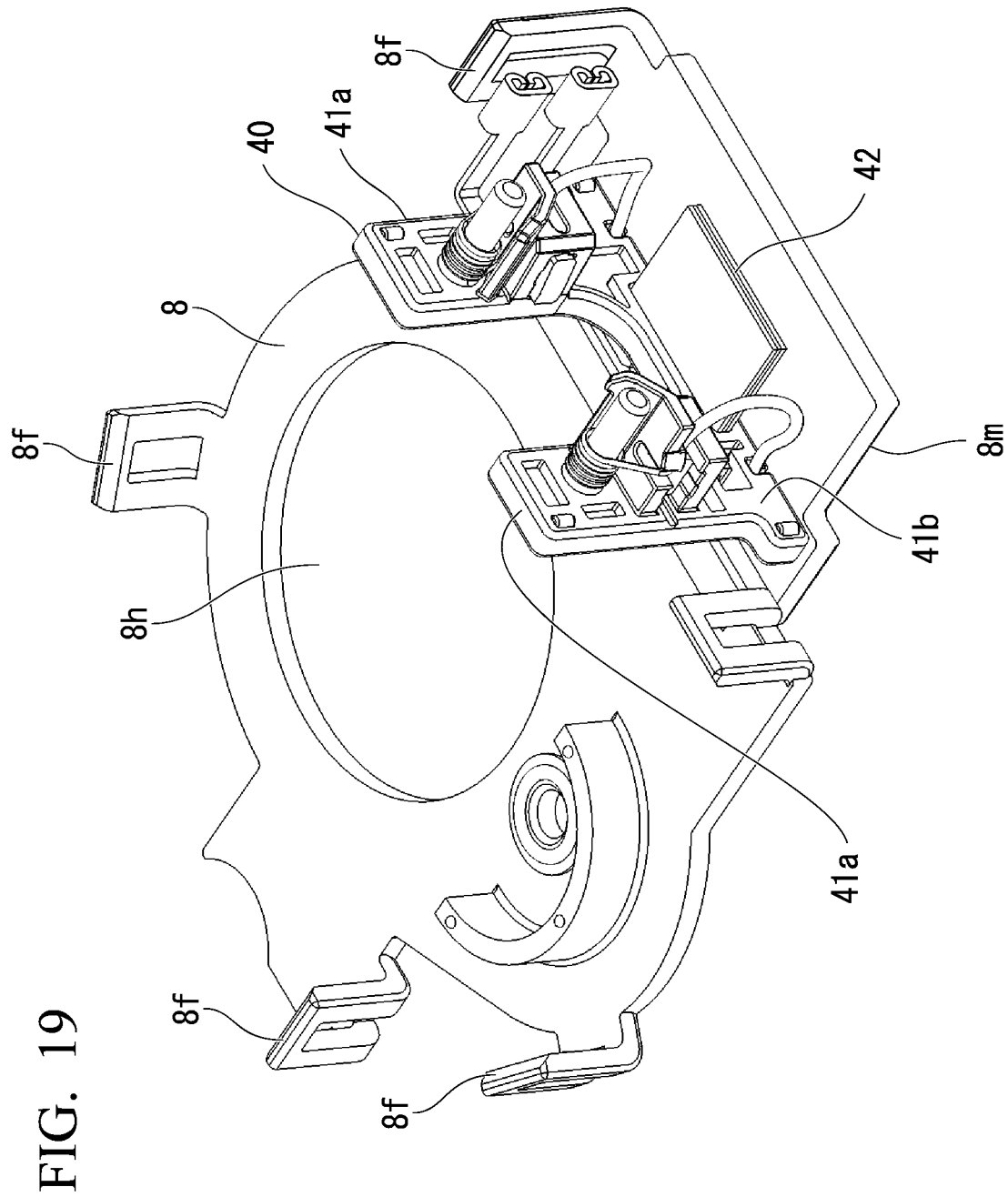
FIG. 19 is a perspective view showing a configuration when the brush holder is provided integrally with the cover according to the first embodiment of the present invention.

FIG. 16 is a perspective view showing a state before the rotation shaft 61 is assembled to the casing 10. FIG. 17 is a perspective view showing a state in which the rotation shaft 61 is assembled to the casing 10. FIG. 18 is a perspective view showing a state before the brush holder 40 is assembled to the casing 10. FIG. 19 is a perspective view showing a configuration when the brush holder 40 is provided integrally with the cover 8.

When assembling the speed reducer-attached motor 1, first, as shown in FIG. 16, the armature 32, the commutator 35, and the bearings 67A, 67B are assembled to the rotation shaft 61.

Next, as shown in FIG. 17, the rotation shaft 61 is assembled with respect to the shaft accommodation groove 12 of the casing 10 along the central axis direction of the first shaft 13 and the second shaft 14 from the opening side of the accommodation recess part 11. At this time, the bearings 67A, 67B are pressed into the bearing accommodation recess parts 15A, 15B that are formed on the casing 10.

As shown in FIG. 6, the ribs 15r, 15r are formed on the bearing accommodation recess parts 15A, 15B, and therefore, the positioning of the radial direction position of the rotation shaft 61 is easily and reliably performed. Further, as shown in FIG. 14, the positioning surface 15k and the positioning rib 15s are formed on the bearing accommodation recess part 15A. Therefore, the positioning of the axial direction position of the rotation shaft 61 is easily and reliably performed with reference to the bearing 67A and the positioning surface 15k.

In this way, as shown in FIG. 17, by assembling the rotation shaft 61, the commutator 35 that is provided on the rotation shaft 61 is accommodated into the motor accommodation part 16.

Next, as shown in FIG. 5, the worm wheel 63, the pinion gear 64, the spar gear 65, and the drive gear 66 are sequentially assembled into the accommodation recess part 11 of the casing 10 from the opening side of the accommodation recess part 11 along the central axis direction of the first shaft 13 and the second shaft 14.

Next, as shown in FIG. 18, the brush holder 40 is assembled from the opening side of the accommodation recess part 11 along the central axis direction of the first shaft 13 and the second shaft 14.

At this time, as shown in FIG. 10, the brush holder 40 is inserted such that the support plate 41 is along the outer side surface 10s of the casing 10 inside the motor accommodation part 16, and the protrusion portions 41t, 41t are engaged with the step portions 16d, 16d that are formed on the side wall portions 16b, 16b of the motor accommodation part 16. Then, a front end of each of the arm parts 41a, 41a is inserted in a space between each of the latch blocks 16k, 16k and the outer side surface 10s of the casing 10.

Then, as shown in FIG. 1, the cover 8 is attached so as to cover the top surface portion 10t of the casing 10. Here, a motor cover part 8m that covers the motor accommodation part 16 is integrally formed on the cover 8, and it is possible to cover the motor accommodation part 16 simultaneously.

Here, as shown in FIG. 19, the brush holder 40 is attached integrally with the cover 8, and it is also possible to assemble the cover 8 and the brush holder 40 simultaneously.

Next, as shown in FIG. 13, the connector member 50 is assembled with respect to the motor accommodation part 16 along the central axis direction of the rotation shaft 61. At this time, each of the terminal member 54 of the connector member 50 and the connection terminal 49 of the brush holder 40 extends in the central axis direction of the rotation shaft 61. Therefore, it is possible to connect the terminal member 54 of the connector member 50 and the connection terminal 49 of the brush holder 40 together simultaneously with the assembly of the connector member 50.

Then, the yoke 31 is mounted on an end portion of the motor accommodation part 16.

Figure 20:
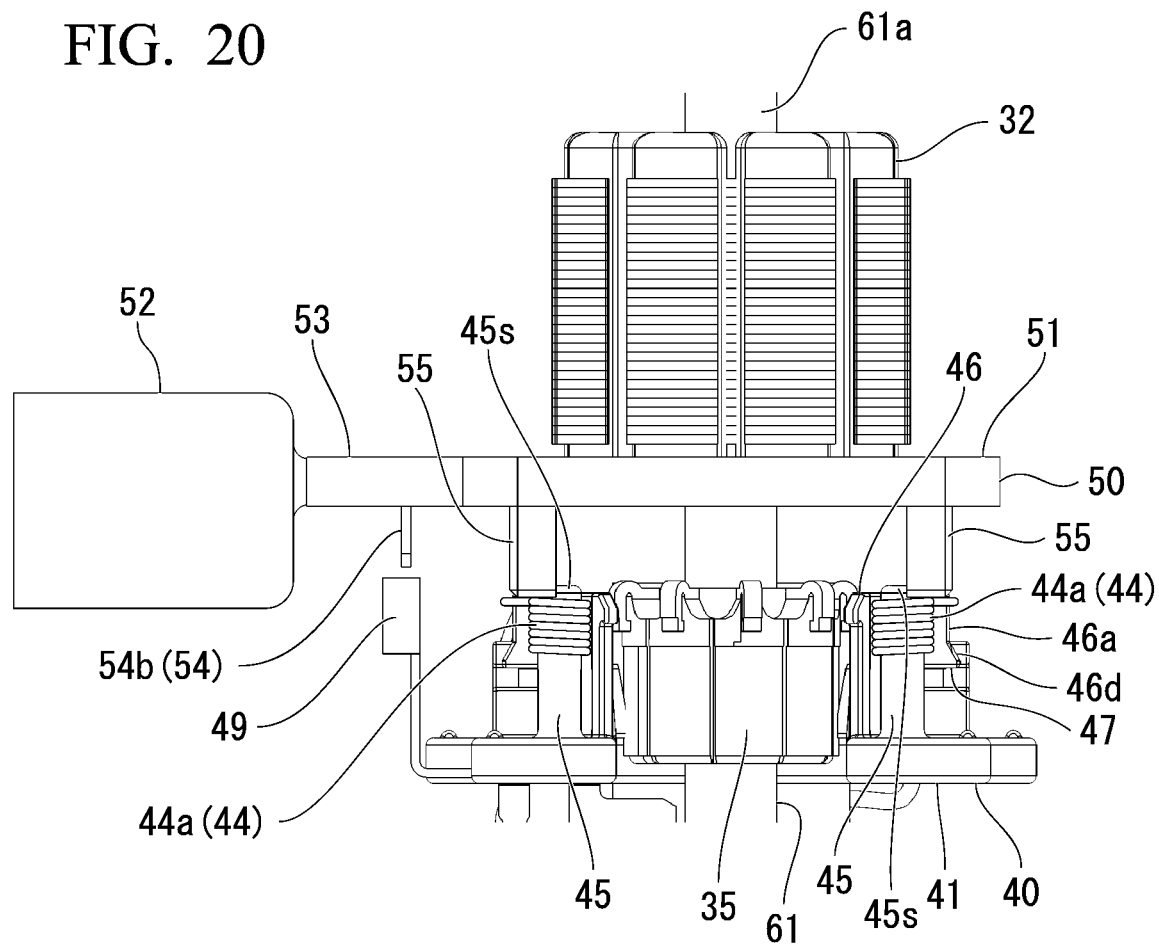
FIG. 20 is a view showing a position of a spring of the brush holder in a state before the connector member is assembled according to the first embodiment of the present invention.
Figure 21:
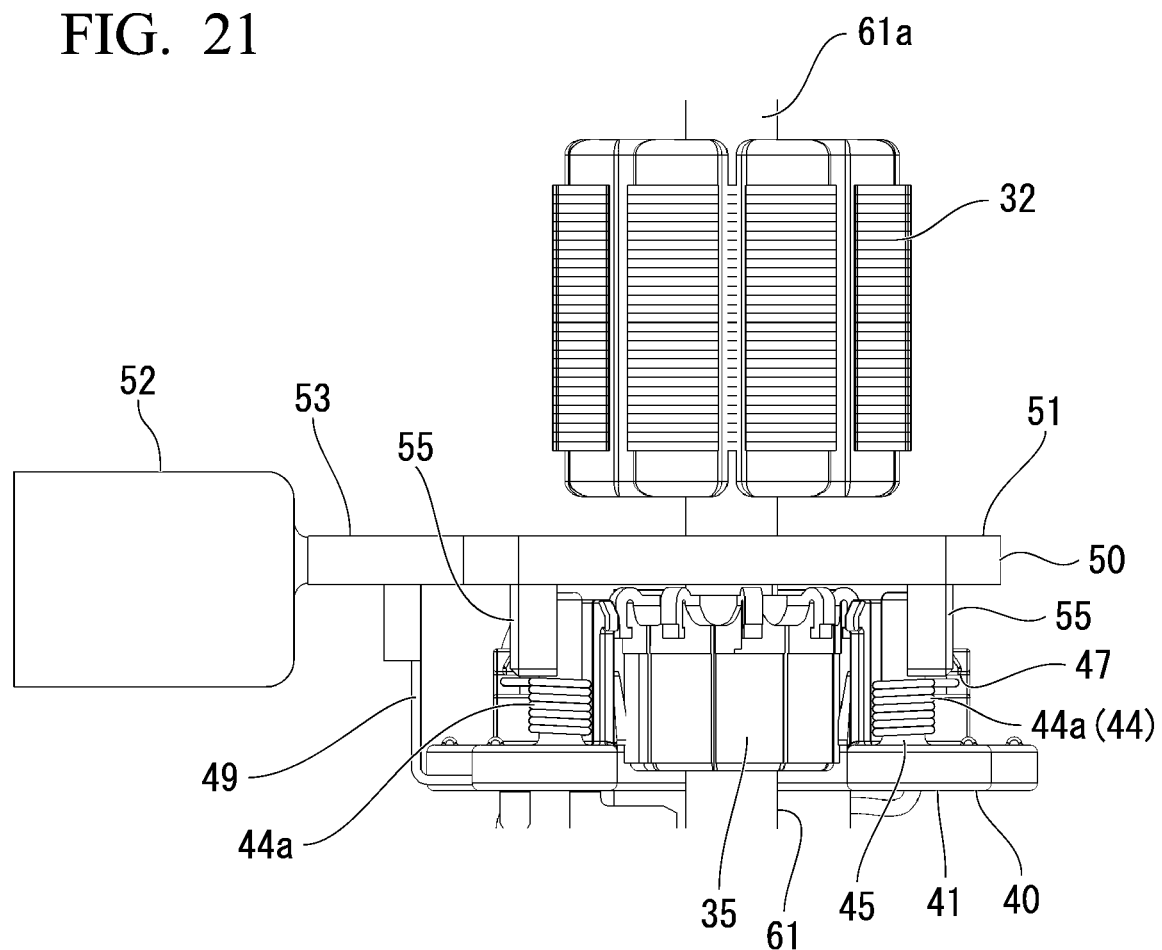
FIG. 21 is a view showing a position of the spring of the brush holder in a state after the connector member is assembled according to the first embodiment of the present invention.

FIG. 20 is a view showing a position of the spring 44 of the brush holder 40 in a state before the connector member 50 is assembled. FIG. 21 is a view showing a position of the spring 44 of the brush holder 40 in a state after the connector member 50 is assembled.

When the connector member 50 described above is assembled, it is possible to simultaneously perform the assembly of the spring 44 of the brush holder 40. For this purpose, as shown in FIG. 20, the coil part 44a of the spring 44 is inserted through each support post 45 prior to the brush holder 40 being assembled to the motor accommodation part 16. At this time, it is sufficient to insert the coil part 44a of the spring 44 only into a front end part 45s of the support post 45. Further, the one extension part 44b of the spring 44 is along the wall portion 46, and the other extension part 44c is along the side end section 46b of the wall portion 46.

In a state where the springs 44, 44 are preliminarily assembled to the support posts 45, 45 in this way, the brush holder 40 is assembled to the motor accommodation part 16. In this state, the brush 43 is not biased toward the commutator 35 side by the spring 44. Therefore, when the brush 43 is retracted outward in the radial direction inside the brush-holding part 41c, in assembling the brush holder 40, it is possible to prevent the brush 43 from interfering with the commutator 35, and it is possible to easily perform the assembly.

Then, as shown in FIG. 21, the connector member 50 is assembled with respect to the motor accommodation part 16 along the central axis direction of the rotation shaft 61. At this time, as shown in FIG. 11 and FIG. 20, the protrusions 55, 55 of the frame part 51 are along the side wall portions 16b, 16b of the motor accommodation part 16, and thereby, it is possible to smoothly assemble the connector member 50.

Further, in assembling the connector member 50, each protrusion 55 comes into contact with the coil part 44a of the spring 44 that is preliminarily assembled to the front end part 45s of the support post 45.

Accordingly, as shown in FIG. 21, when the connector member 50 is pushed along the central axis direction of the rotation shaft 61, the coil part 44a of the spring 44 is pushed into a base end side (support plate 41 side) of the support post 45 by the protrusion 55. Then, the other extension part 44c is moved along the side end section 46b as the coil part 44a is pushed. Then, finally, as shown in FIG. 9, the other extension part 44c is moved beyond the slant surface 46d and is inserted in the inside of the recess 47. Then, the brush 43 is biased to the commutator 35 side on the inner side in the radial direction by the spring 44 and becomes a state of being in contact with the outer circumferential surface of the commutator 35.

In this way, it is possible to easily and reliably perform the setting of the springs 44, 44.

In this way, the speed reducer-attached motor 1 described above includes the rotation shaft 61 on which the worm gear 62 is provided and which is rotatably supported around the central axis via the plurality of bearings 67A, 67B, the motor part 30 that is driven to be rotated around the rotation shaft 61 as the central axis, the speed reducer part 60 that includes the worm wheel 63 which is engaged with the worm gear 62, the pinion gear 64, the spar gear 65, and the drive gear 66, and the casing 10 on which the shaft accommodation groove 12 that accommodates the rotation shaft 61, the bearing accommodation recess parts 15A, 15B that accommodate the bearings 67A, 67B, and the accommodation recess part 11 that accommodates the speed reducer part 60 are formed. The shaft accommodation groove 12, the bearing accommodation recess parts 15A, 15B, and the accommodation recess part 11 open at the top surface portion 10t side of the casing 10.

In this way, all of the shaft accommodation groove 12, the bearing accommodation recess parts 15A, 15B, and the accommodation recess part 11 open at the top surface portion 10t side of the casing 10. Therefore, it becomes possible to assemble the rotation shaft 61, the bearings 67A, 67B, and the worm wheel 63, the pinion gear 64, the spar gear 65, and the drive gear 66 which constitute the speed reducer part 60 from the same direction of the top surface portion 10t side with respect to the casing 10. Accordingly, when assembling the speed reducer-attached motor 1, it is possible to avoid the necessity of changing the direction of the casing 10 in accordance with a component to be assembled, and it is possible to improve the assembly property.

Further, the motor accommodation part 16 that accommodates the commutator 35 opens at the top surface portion 10t side of the casing 10 similarly to the shaft accommodation groove 12, the bearing accommodation recess parts 15A, 15B, and the accommodation recess part 11. Therefore, it becomes possible to assemble the commutator 35 that is provided on the rotation shaft 61 to the casing 10 together with the rotation shaft 61.

Further, the brush holder 40 is fixed to the motor accommodation part 16. Thereby, it becomes possible to assemble the brush holder 40 also to the casing 10 part from the same direction similarly to the rotation shaft 61, the bearings 67A, 67B, and the speed reducer part 60.

Further, the brush holder 40 is provided integrally on the cover 8, and thereby, when the cover 8 is attached, it is possible to assemble the brush holder 40 to the motor accommodation part 16 at the same time.

Further, the bearing accommodation recess parts 15A, 15B include elastically deformable ribs 15r, 15r that protrude toward the bearings 67A, 67B side at a position which faces the outside in the radial direction of the bearings 67A, 67B and which is orthogonal to the top surface portion 10t side.

According to such a configuration, when the bearings 67A, 67B that support the rotation shaft 61 are pressed into the bearing accommodation recess parts 15A, 15B, it is possible to restrict the bearings 67A, 67B in the radial direction by the ribs 15r, 15r.

Further, the one bearing 67A that is provided on the rotation shaft 61 is sandwiched between and held by the positioning rib 15s and the positioning surface 15k of the bearing accommodation recess part 15A, and the position in the central axis direction of the rotation shaft 61 is defined by the positioning surface 15k. Thereby, it is possible to assemble the rotation shaft 61 to the casing 10 with good accuracy.

Further, the width size W1 in the shaft accommodation groove 12 is smaller than the width size W2 in a direction that is orthogonal to the rotation shaft 61 in the bearing accommodation recess parts 15A, 15B.

According to such a configuration, even when a lubricant agent such as a grease that is filled in the bearings 67A, 67B flows out from the bearings 67A, 67B, the width size W1 of the shaft accommodation groove 12 is smaller than the bearing accommodation recess parts 15A, 15B. Therefore, it is possible to prevent the lubricant agent from being spattered by the rotation of the rotation shaft 61 and prevent a lubrication shortage from occurring.

In the first embodiment described above, a speed reducer-attached motor assembly method is described. However, the embodiment is not limited thereto. For example, the assembly order between the assembly of the worm wheel 63, the drive gear 66, and the like and the assembly of the brush holder 40, the connector member 50, and the like may be appropriately changed.

Further, it is possible to appropriately change the configuration of each part of the speed reducer-attached motor. For example, in the brush holder 40, the brush 43 is biased toward the commutator 35 side by the spring 44 but may be biased by a plate spring and the like in place of the spring 44.

Further, the speed reducer part 60 of the speed reducer-attached motor 1 includes the first shaft 13 and the second shaft 14. However, the embodiment is not limited thereto. One shaft or three or more shafts may support the gear that constitutes the speed reducer part.

Further, a case is described in which the speed reducer-attached motor is applied to a drive source of a vehicle window regulator and the like. However, the embodiment is not limited thereto. The speed reducer-attached motor is applicable to a drive source of a wiper motor, a sunroof, an electrically operated seat, and the like, and further, a variety of apparatuses such as an electric component other than a vehicle.

Second Embodiment (Speed Reducer-Attached Motor)

Figure 22:
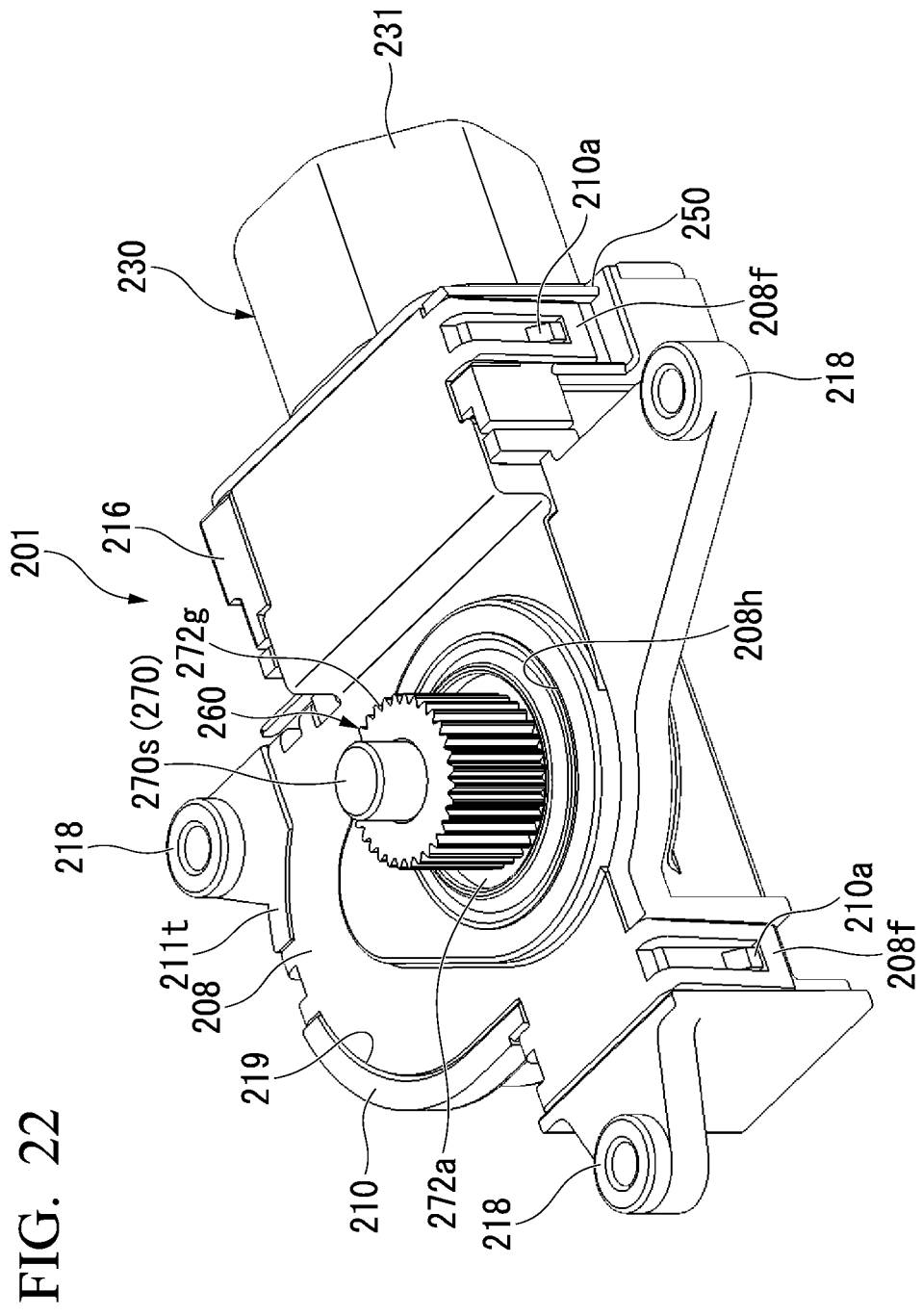
FIG. 22 is a perspective view showing an appearance of a speed reducer-attached motor according to a second embodiment of the present invention.
Figure 23:
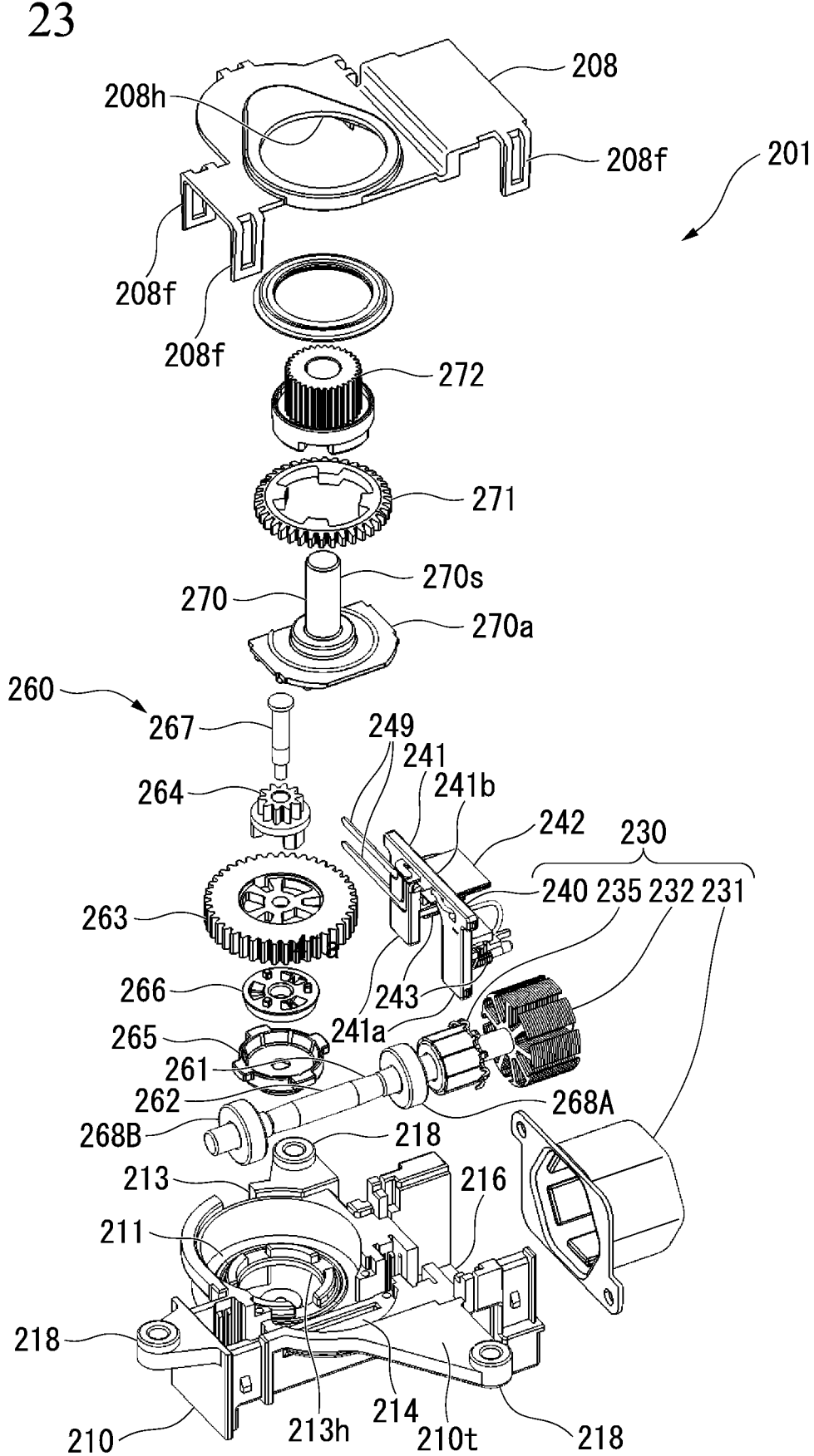
FIG. 23 is a perspective expansion view showing a component configuration of the speed reducer-attached motor according to the second embodiment of the present invention.
Figure 24:
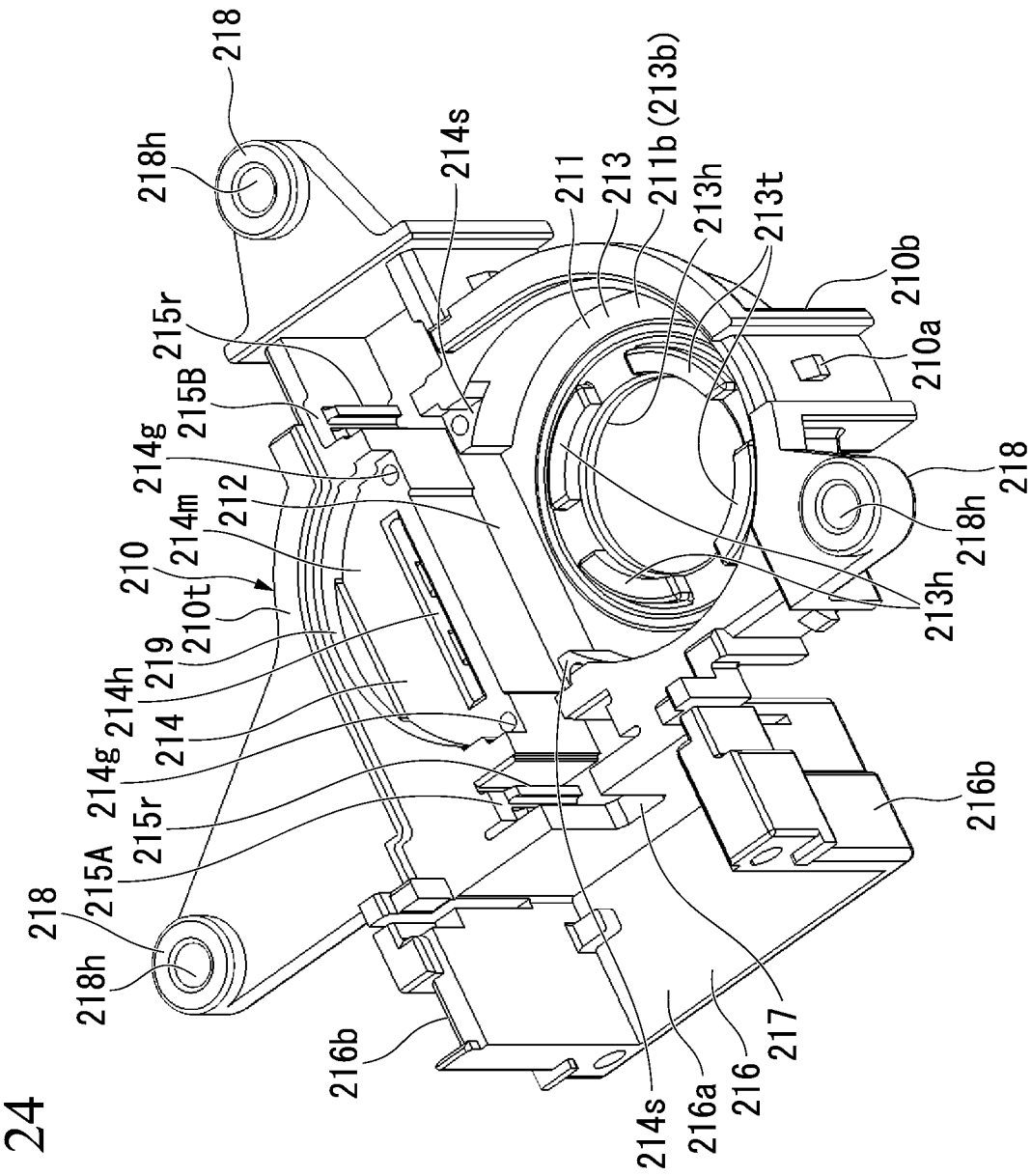
FIG. 24 is a perspective view showing a casing that constitutes the speed reducer-attached motor according to the second embodiment of the present invention.

FIG. 22 is a perspective view showing an appearance of a speed reducer-attached motor 201. FIG. 23 is a perspective expansion view showing a component configuration of the speed reducer-attached motor 201. FIG. 24 is a perspective view showing a casing 210 that constitutes the speed reducer-attached motor 201.

As shown in FIG. 22 and FIG. 23, the speed reducer-attached motor 201 is a motor that is used, for example, for a power window apparatus of a vehicle (fixation target) and the like. The speed reducer-attached motor 201 includes the casing 210, a motor part 230 that is provided on one end side of the casing 210, and a speed reducer part 260 that is connected to the motor part 230 and that is accommodated inside the casing 210.

(Casing)

As shown in FIG. 4, an accommodation recess part 211 that accommodates the speed reducer part 260 is formed on one surface side of the casing 210. The accommodation recess part 211 is recessed from a top surface portion 210t of the casing 210 toward a back surface portion 210b that is opposed to the top surface portion 10t. The accommodation recess part 211 includes a shaft accommodation groove (shaft accommodation recess part) 212 that accommodates a rotation shaft 261 described later, a worm wheel accommodation part 213, and a base part 214 on which a shaft support member 270 described later is provided.

Here, the shaft accommodation groove 212 is formed so as to extend in one direction along the bottom surface 211b of the accommodation recess part 211. Bearing accommodation recess parts 215A, 215B are formed on both end parts in the central axis direction of the shaft accommodation groove 212.

The worm wheel accommodation part 213 is formed on one of sides that interpose the shaft accommodation groove 212. An opening portion 213h that penetrates to the back surface portion 210b of the casing 210 is formed on a bottom surface 213b of the worm wheel accommodation part 213. Further, a claw portion 213t that protrudes toward the top surface portion 210t side is formed on the bottom surface 213b of the worm wheel accommodation part 213 at four positions that are spaced in the circumferential direction of the opening portion 213h.

The base part 214 includes a main base portion 214m that is formed on another of the sides that interpose the shaft accommodation groove 212 and sub base portions 214s, 214s each of which is formed on each of both sides in the central axis direction of the shaft accommodation groove 212 with respect to the worm wheel accommodation part 213 in the one of the sides that interpose the shaft accommodation groove 212. The main base portion 214m and the sub base portions 214s, 214s are formed at a position (height) that is closer to the top surface portion 210t of the casing 210 than the bottom surface 213b of the worm wheel accommodation part 213.

A recess 214h that is recessed to the back surface portion 210b side of the casing 210 is formed on the main base portion 214m at a position along the shaft accommodation groove 212. Further, a positioning hole 214g is formed on each of the main base portion 214m and the sub base portions 214s, 214s at two positions that are spaced in the central axis direction of the shaft accommodation groove 212.

A motor accommodation part 216 that accommodates a portion of the motor part 230 is formed on an outer circumferential part of the casing 210. The motor accommodation part 216 forms a substantially U shape in a cross-section having a bottom plate portion 216a that is formed on the same side as the bottom surface 211b of the accommodation recess part 211 and side wall portions 216b, 216b that stand toward the opening direction (top surface portion 210t side of the casing 210) of the accommodation recess part 211 from both sides of the bottom plate portion 216a.

Further, in the casing 210, an insertion recess part 217 which is recessed toward the back surface portion 210b side from the top surface portion 210t of the casing 210 and through which the rotation shaft 261 is inserted to the inside and the outside of the casing 210 is formed between the accommodation recess part 211 and the motor accommodation part 216. This insertion recess part 217 is formed so as to communicate with the shaft accommodation groove 212.

Figure 25:
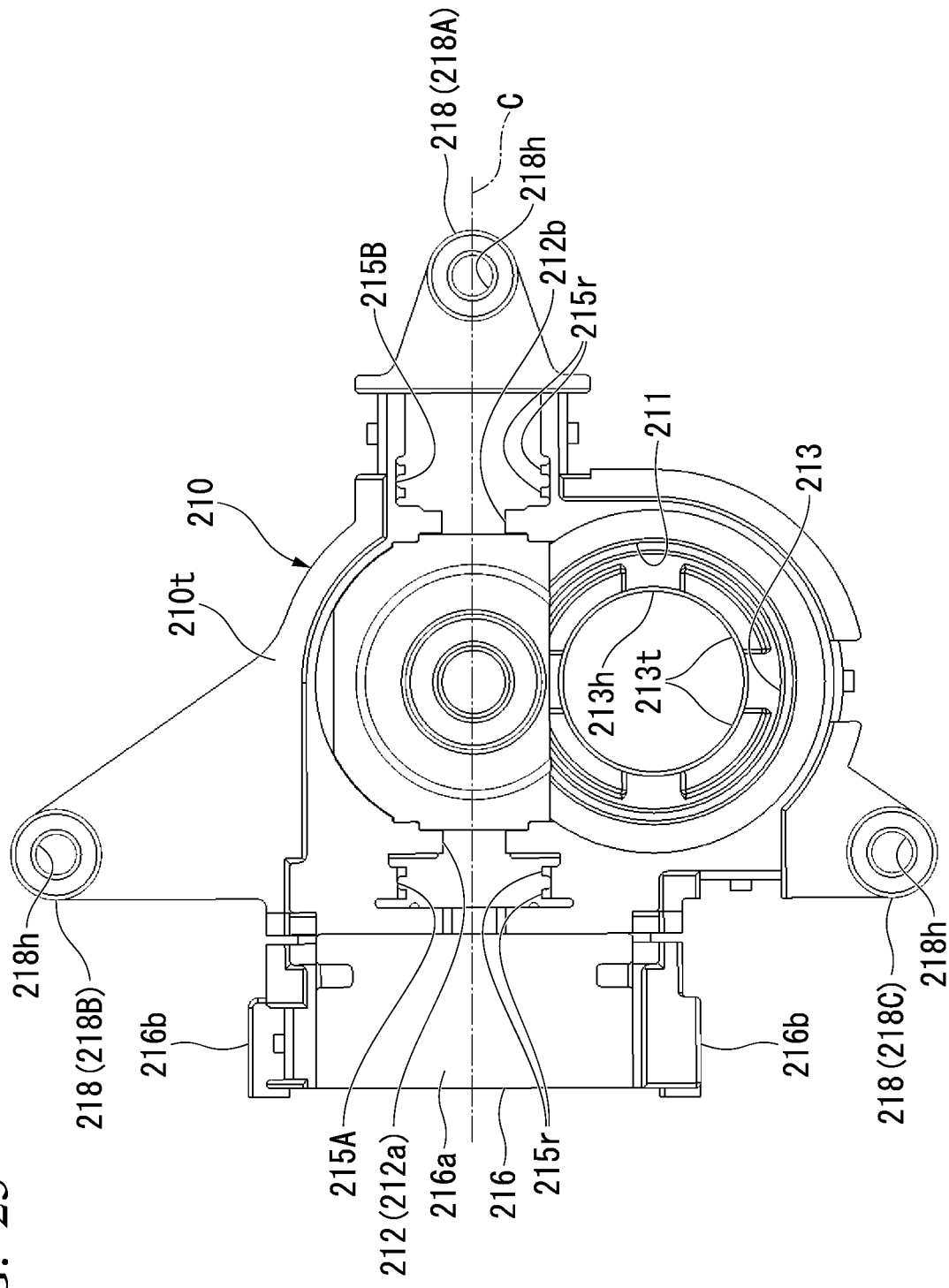
FIG. 25 is a plan view of the casing according to the second embodiment of the present invention.

FIG. 25 is a plan view of the casing 210.

As shown in FIG. 25, a plurality of protrusion parts 218 that protrude toward the outer circumferential side are formed on an outer circumferential part of the casing 210. A bolt insertion hole (fixation part) 218h through which a bolt (not shown) that fixes the casing 210 to a vehicle body is inserted is formed on each of the protrusion parts 218.

Here, each of the protrusion parts 218 is formed at each of a total of three positions, that is, a position close to the other end part 212b of the shaft accommodation groove 212, and the one side and the other side that interpose the shaft accommodation groove 212 on the one end part 212a side of the shaft accommodation groove 212. The bolt insertion hole 218h of a protrusion part 218A that is provided on the position close to the other end part 212b of the shaft accommodation groove 212 is arranged on a central axis C of the rotation shaft 261 that is accommodated in the shaft accommodation groove 212. The bolt insertion hole 218h of a protrusion part 218B that is provided on the one side among the sides that interpose the shaft accommodation groove 212 and the bolt insertion hole 218h of a protrusion part 218C that is provided on the other side among the sides that interpose the shaft accommodation groove 212 are respectively arranged at positions that are symmetric with respect to the central axis C of the rotation shaft 261.

Further, as shown in FIG. 24, a step part 219 that is recessed to the back surface portion 210b side is formed on the top surface portion 210t of the casing 210 at a circumferential edge portion of the accommodation recess part 211 and upper surfaces of the side wall portions 216b, 216b of the motor accommodation part 216. As shown in FIG. 22, a cover 208 having a plate shape is fitted to this step part 219. A plurality of hook parts 208f that extend in one side of the cover 208 are formed on an outer circumferential part of the cover 208. Each of the hook parts 208f is engaged with an engagement protrusion 210a that is formed at each of a plurality of positions of the outer circumferential surface of the casing 210. Thereby, the cover 208 is fixed to the casing 210.

(Motor Part)

As shown in FIG. 23, for example, a brush-attached DC motor or the like is used for the motor part 230. The motor part 230 includes a yoke 231, the armature 232, the commutator 235, and a brush holder 240 that holds a pair of brushes 243, 243 in slidable contact with the commutator 235.

As shown in FIG. 22, the yoke 231 is fixed to an end portion of the motor accommodation part 216 that is provided on the outer circumferential surface of the casing 210 by a screw (not shown) or the like. The yoke 231 has a cylindrical shape having a bottom, and a permanent magnet (not shown) is fitted to an inner circumferential surface of the yoke 231.

Figure 26:
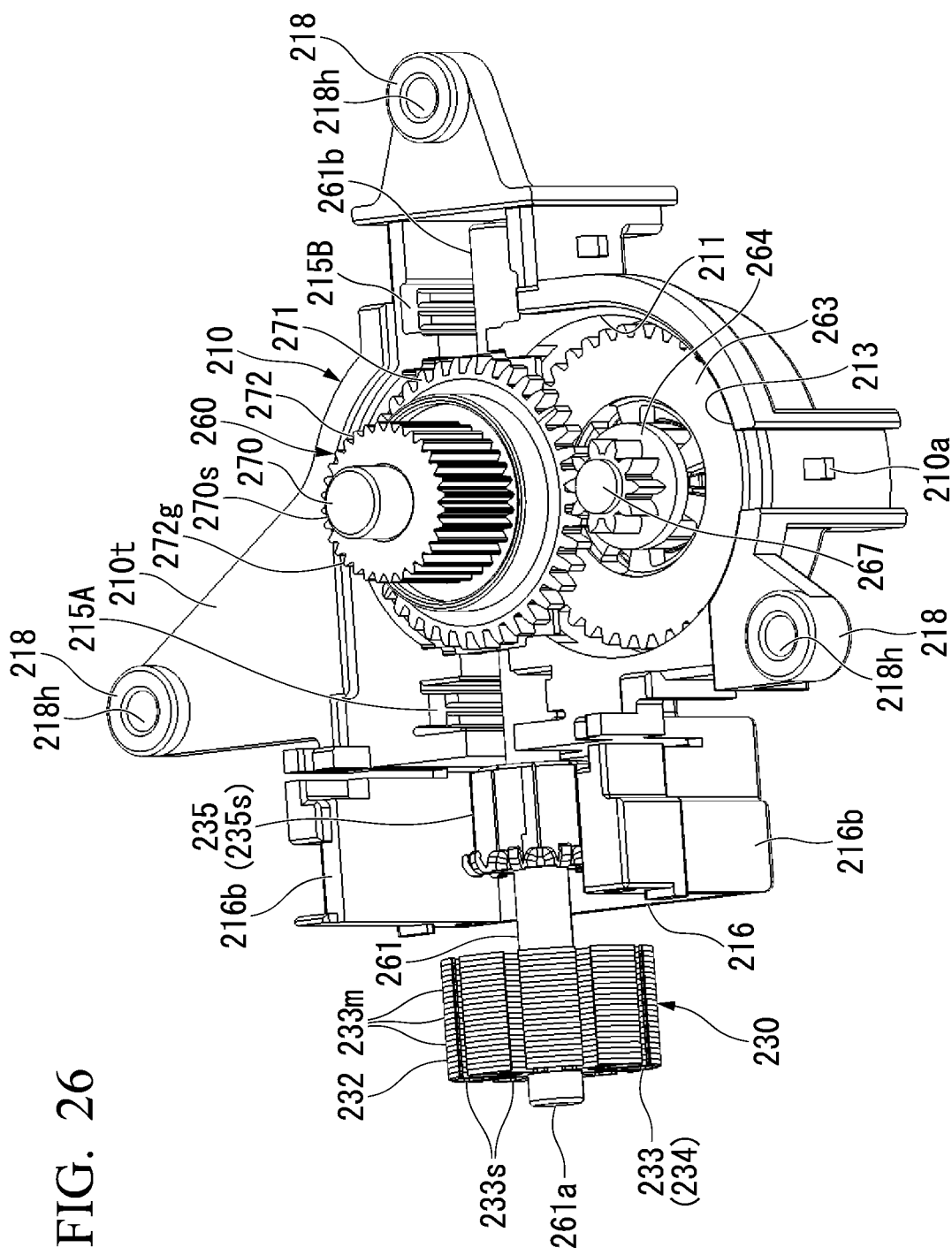
FIG. 26 is a perspective view showing a state in which a cover and a yoke of the speed reducer-attached motor is removed according to the second embodiment of the present invention.

FIG. 26 is a perspective view showing a state in which the cover 208 and the yoke 231 of the speed reducer-attached motor 201 is removed.

As shown in FIG. 26, the armature 232 has an armature core 233 and an armature coil 234.

The armature core 33 is externally fitted and fixed to one end 61a of the rotation shaft 61. The armature core 233 is formed by axially laminating a plurality of metal plates 233m having a ring shape. A plurality of slots 233s around which a winding is wound is formed on the armature core 233.

The enamel-covered winding that is inserted through the slots 233s is wound around, and thereby, a plurality of armature coils 234 are formed on the outer circumference of the armature core 233.

The commutator 235 defines a cylinder shape and is externally fitted and fixed to the rotation shaft 261. The commutator 235 is arranged at a position that is separated by a predetermined length from the armature 232 that is provided on the one end 261a of the rotation shaft 261 to the other end 261b side of the rotation shaft 261. A plurality of segments 235s that are formed of an electrically conductive material are attached in a circumferential direction on the outer circumferential surface of the commutator 235.

As shown in FIG. 23, the brush holder 240 includes a support plate 241 having a plate shape, a thermistor 242, and the pair of brushes 243, 243 in slidable contact with the segment 235s of the commutator 235.

The support plate 241 is constituted of arm parts 241a, 241a that extend in parallel with each other and a connection part 241b that connects one end sides of the arm parts 241a, 241a together. The support plate 241 defines a gate shape.

The thermistor 242 is fixed to the connection part 241b of the support plate 241.

Connection terminals 249, 249 that are electrically connected to the brushes 243, 243 are provided on the support plate 241.

The brush holder 240 is provided inside the motor accommodation part 216 that is provided on the outer circumferential surface of the casing 210. The front end of each arm part 241a is directed to the bottom plate portion 216a, and the brush holder 240 is pressed into the inside of the motor accommodation part 216 from the top surface portion 210t side of the casing 210.

Part of the connection terminal 249 protrudes from the casing 210 in a state where the brush holder 240 is assembled to the casing 210. The part of the connection terminal 249 is provided to be connectable to a connector (not shown) of a harness that is connected to an external electric source (not shown). Thereby, it is possible to supply electric power of the external electric source to the motor part 230.

(Speed Reducer Part)

As shown in FIG. 23, the speed reducer part 260 includes mainly the rotation shaft 261, a worm gear 262, a worm wheel 263, a pinion gear 264, a facing member 265, a lock plate 266, a shaft member 267, the shaft support member (fixation part) 270, a spar gear 271, and an output gear 272.

Figure 27:
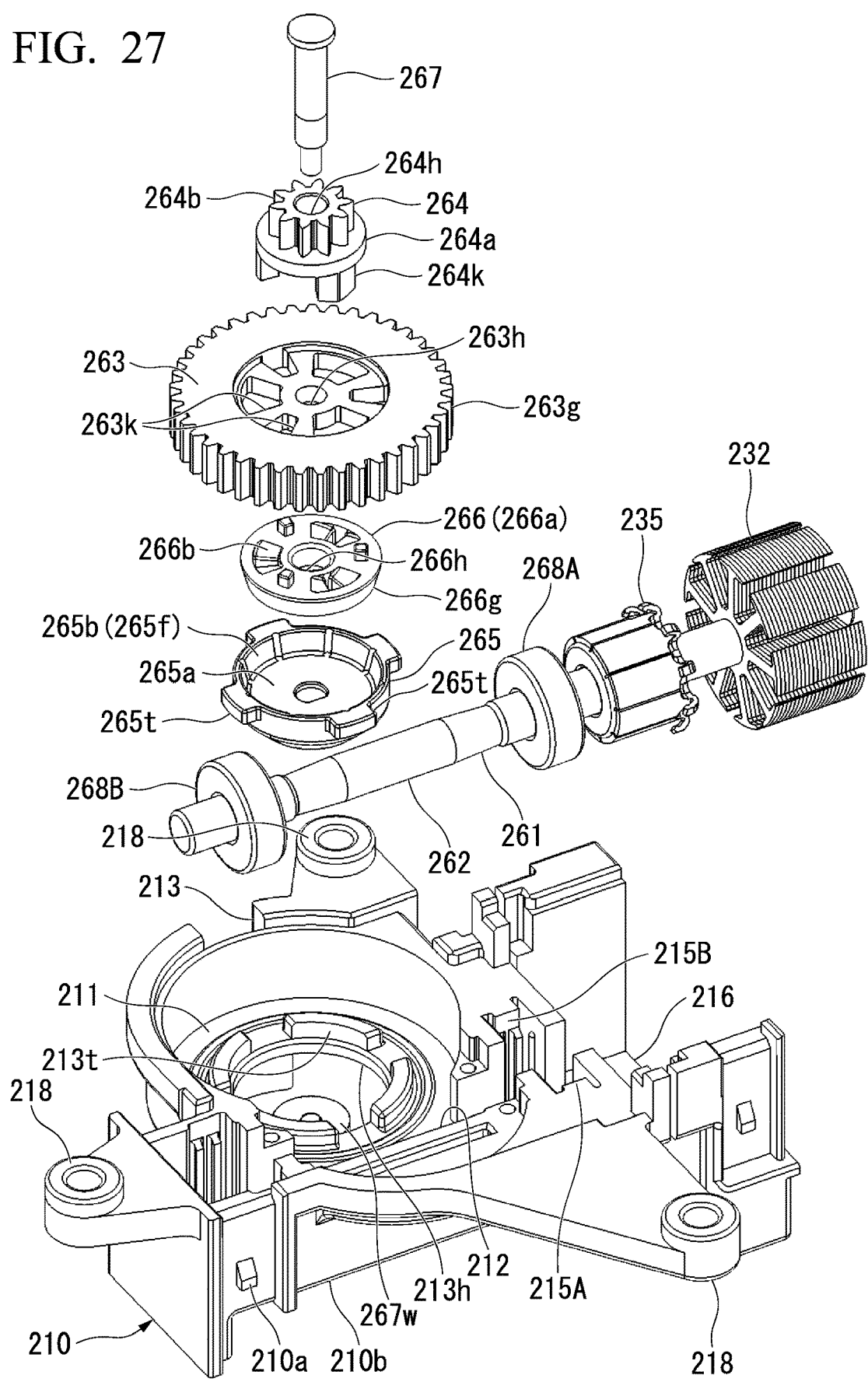
FIG. 27 is a perspective view showing a configuration of a portion of a speed reducer part according to the second embodiment of the present invention.

FIG. 27 is a perspective expansion view showing a configuration of a portion of the speed reducer part 260.

As shown in FIG. 26 and FIG. 27, a portion of the rotation shaft 261 closer to the other end 261b side than the armature 232 and the commutator 235 of the motor part 230 described above that is provided on the one end 261a side is accommodated in the shaft accommodation groove 212 of the casing 210. Each of bearings 268A, 268B having an annular shape is externally fitted to the rotation shaft 261 at each of two positions that are spaced in the central axis direction of the rotation shaft 261.

The bearings 268A, 268B are constituted of a so-called rolling bearing and are fitted to the bearing accommodation recess parts 215A, 215B that are formed on the casing 210.

As shown in FIG. 25, each of a pair of two elastically deformable ribs 215r that extend toward a bottom surface of each of the bearing accommodation recess parts 215A, 215B from the top surface portion 210t side of the casing 210 is provided to protrude on each of the bearing accommodation recess parts 215A, 215B at each of both sides in the radial direction that is orthogonal with respect to the central axis of the shaft accommodation groove 212. By the bearings 268A, 268B being butted against the bottom surface of each of the bearing accommodation recess parts 215A, 215A, and by both sides in the radial direction of the bearings 268A, 268B being sandwiched and held by the ribs 215r, 215r, the bearings 268A, 268B are restricted.

As shown in FIG. 27, the worm gear 262 is externally fitted to the rotation shaft 261 at a middle part of the bearings 268A, 268B.

The worm gear 262 is arranged inside the shaft accommodation groove 212.

The worm wheel 263 is formed in a substantially circular plate shape, and a gear tooth 263g that is engaged with the worm gear 262 is formed on the outer circumferential surface.

An insertion hole 263h through which the shaft member 267 is inserted is formed on the middle part in the radial direction of the worm wheel 263. Further, a plurality of opening parts 263k are formed to be spaced in the circumferential direction around the insertion hole 263h.

The pinion gear 264 includes integrally a plate part 264a having a plate shape and a gear part 264b that has a toothed wheel shape and that is formed so as to protrude in the axial direction from one surface side of the plate part 264a. An insertion hole 264h through which the shaft member 267 is inserted is formed on the pinion gear 264.

A protrusion portion 264k that protrudes in the axial direction of the pinion gear 264 is formed on the other surface side of the plate part 264a, for example, at three positions such that the protrusion portions 264k are spaced in the circumferential direction. Each of the protrusion portions 264k is inserted in the opening part 263k of the worm wheel 263, and thereby, the worm wheel 263 is rotated around the shaft member 267 together with the pinion gear 264.

Here, each of the protrusion portions 264k penetrates through the opening part 263k of the worm wheel 263 and protrudes toward the bottom surface 213b side of the worm wheel accommodation part 213. A wedge section (not shown) of which the length in the circumferential direction becomes smaller at a farther position from the plate part 264a is formed on a front end surface of each protrusion portion 264k.

The worm wheel 263 and the pinion gear 264 are rotated around the shaft member 267 when the rotation shaft 261 is driven to be rotated around the central axis of the rotation shaft 261 by the motor part 230.

The facing member 265 includes a plate part 265a having a substantially circular plate shape and a circumferential wall part 265b that has a ring shape and that is integrally formed integrally on the outer circumferential part of the plate part 265a.

An insertion hole 265h through which the shaft member 267 is inserted is formed on the middle portion of the plate part 265a.

Further, the circumferential wall part 265b has a taper surface 265f that is formed such that the inner diameter is gradually larger at a farther position from the plate part 265a.

A rotation stop protrusion 265t that protrudes outward in the radial direction is formed on the circumferential wall part 265b at a plurality of (four) positions that are spaced in the circumferential direction.

The facing member 265 is arranged at the opening portion 213h that is formed on the worm wheel accommodation part 213, and each rotation stop protrusion 265t is arranged between claw parts 213t, 213t that are adjacent to each other in the circumferential direction at a circumferential edge of the opening portion 213h. Thereby, it is possible to prevent the facing member 265 from being displaced in the circumferential direction.

The facing member 265 functions as a friction material that generates a friction force between the facing member 265 and the lock plate 266 and is preferably formed of an iron-based or copper-based metal, a hard rubber, or the like.

The lock plate 266 includes integrally a plate main body 266a having a substantially circular plate shape and a recess part 266b that is formed at a plurality of positions (for example, three positions) that are spaced in the circumferential direction at one surface side of the plate main body 266a.

The plate main body 266a has an insertion hole 266h through which the shaft member 267 is inserted at the middle portion of the plate main body 266a. Further, the plate main body 266a includes a taper surface 266g that is in slidable contact with the taper surface 265f of the facing member 265 at the outer circumferential surface of the plate main body 266a. The lock plate 266 is arranged such that the plate main body 266a is accommodated inside the circumferential wall part 265b of the facing member 265.

The recess part 266b is recessed in a V shape, and each of the protrusion portions 264k that are provided on the pinion gear 264 are arranged to face the recess part 266b.

The pinion gear 264, the worm wheel 263, the lock plate 266, and the facing member 265 are accommodated inside the worm wheel accommodation part 213 in a laminated state. The shaft member 267 is inserted through the pinion gear 264, the worm wheel 263, the lock plate 266, and the facing member 265 from the pinion gear 264 side. The shaft member 267 protrudes toward the back surface portion 210b side of the casing 210 from the facing member 265. Further, a nut (not shown) is fastened to the shaft member 267 via a washer 267w that is arranged on the back surface portion 210b side with respect to the facing member 265. Thereby, the pinion gear 264, the worm wheel 263, the lock plate 266, and the facing member 265 are supported rotatably around the shaft member 267.

Figure 28:
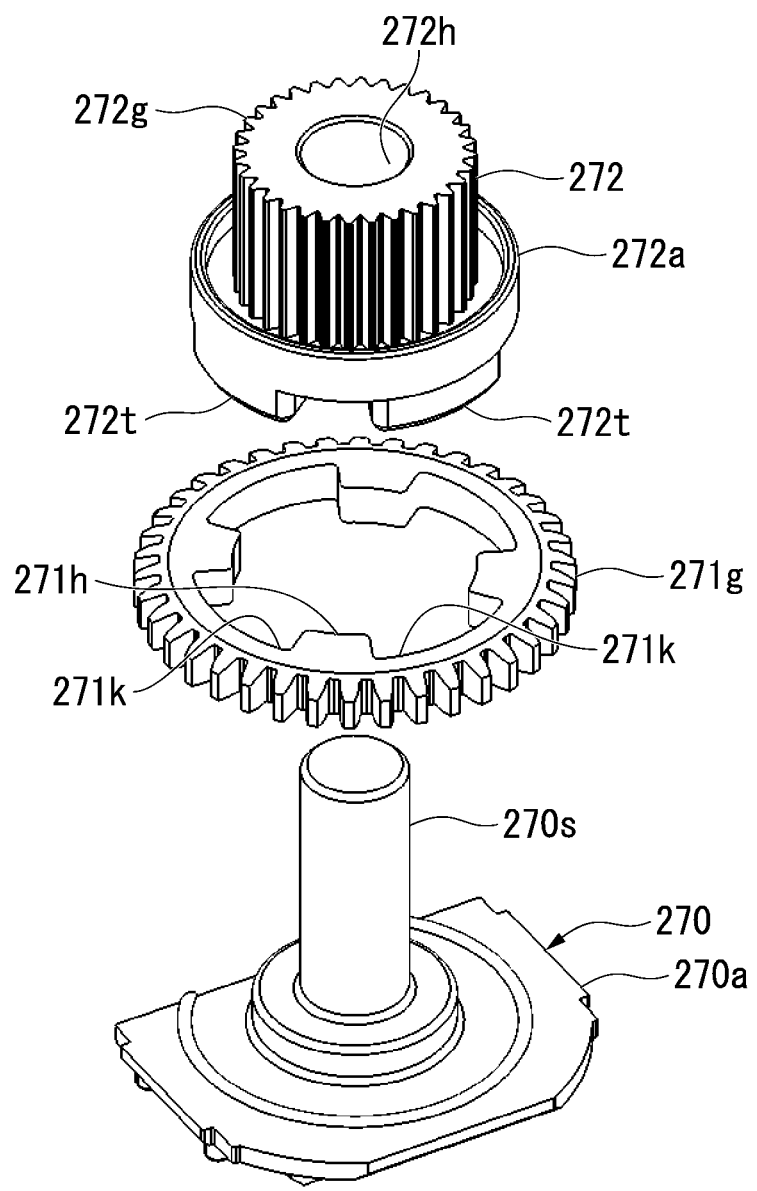
FIG. 28 is a perspective view showing a configuration of another portion of the speed reducer part according to the second embodiment of the present invention.
Figure 29:
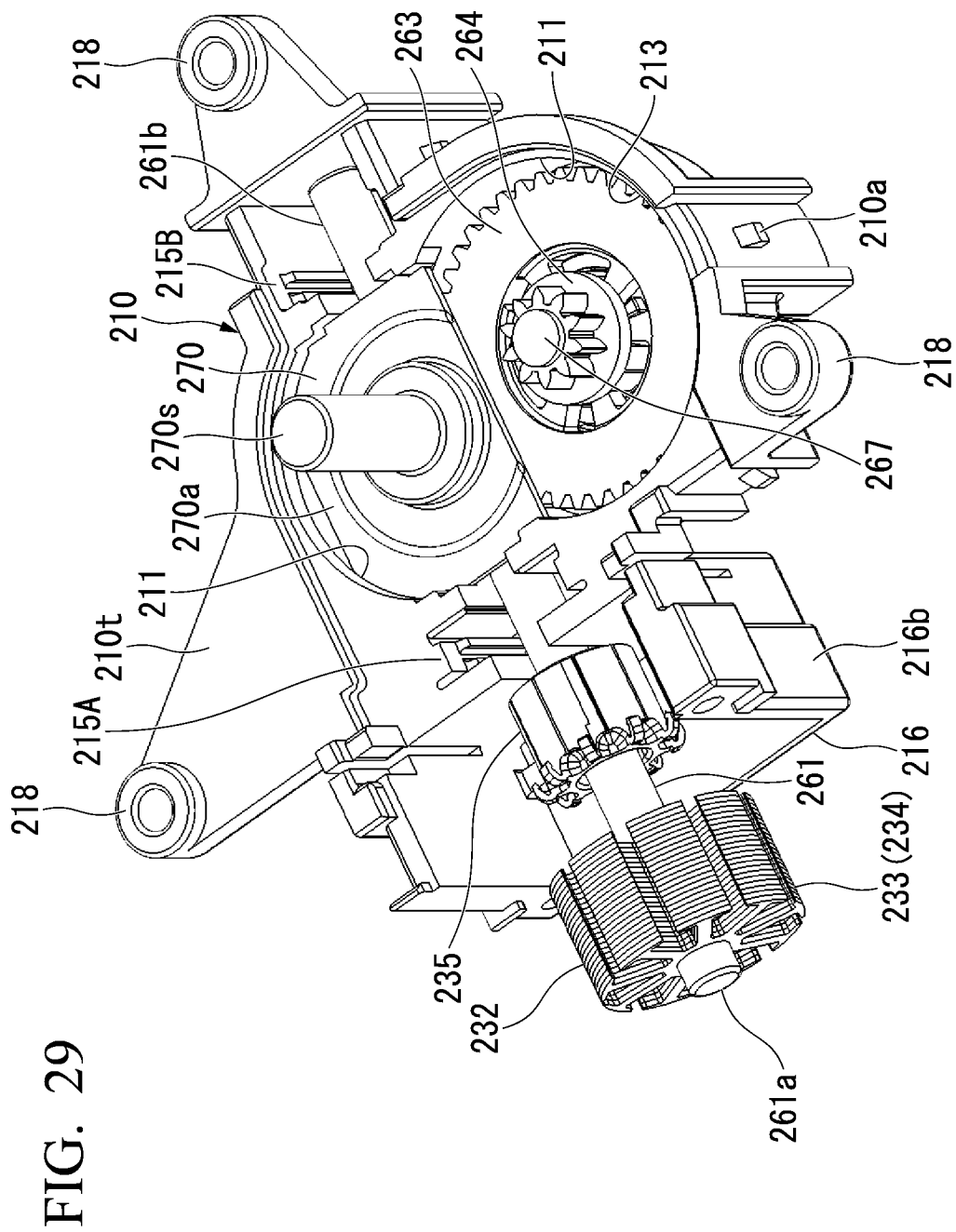
FIG. 29 is a perspective view showing a state in which a shaft support member is assembled to the casing according to the second embodiment of the present invention.
Figure 30:
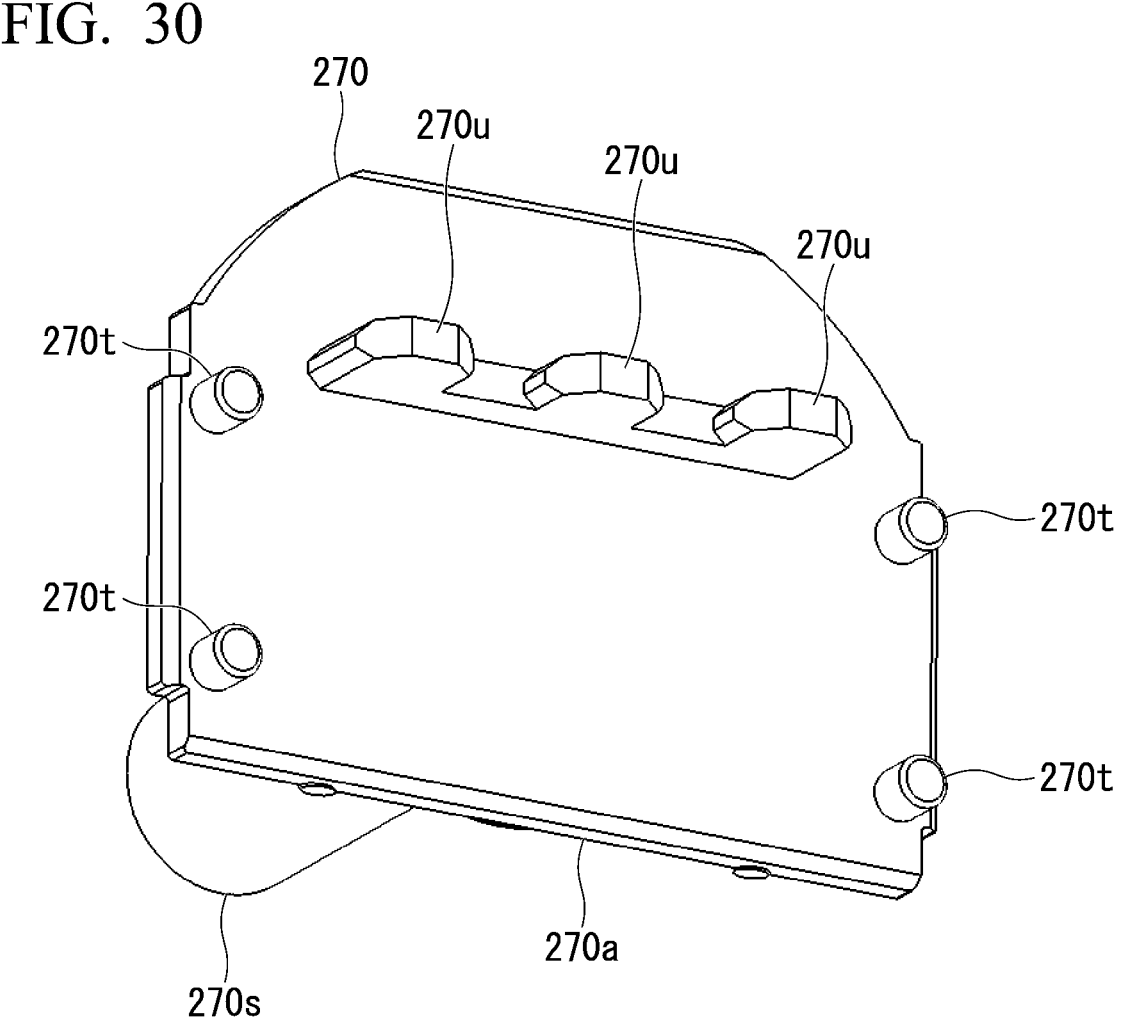
FIG. 30 is a perspective view showing the shaft support member according to the second embodiment of the present invention.

FIG. 28 is a perspective view showing a configuration of another portion of the speed reducer part 260. FIG. 29 is a perspective view showing a state in which the shaft support member 270 is assembled to the casing 210. FIG. 30 is a perspective view showing the shaft support member.

As shown in FIG. 28, the shaft support member 270 includes integrally a plate part (base unit) 270a having a plate shape and a shaft 270s that extends orthogonally from one surface side of the plate part 270a.

As shown in FIG. 29, the plate part 270a is provided on the main base portion 214m and the sub base portions 214s, 214s of the base part 214 (refer to FIG. 24) that is formed on the accommodation recess part 211 of the casing 210 so as to straddle the shaft accommodation groove 212.

As shown in FIG. 30, a positioning protrusion portion 270t that is inserted in the positioning hole 214g (refer to FIG. 24) of the base part 214 and a pressed protrusion portion 270u that is pressed into the recess 214h (refer to FIG. 24) are formed to protrude on the plate part 270a at an opposite side of the shaft 270s. By inserting (pressing) the positioning protrusion portion 270t and the pressed protrusion portion 270u in the positioning hole 214g and the recess 214h that are shown in FIG. 24, as shown in FIG. 29, the plate part 270a is fixed on the base part 214.

As shown in FIG. 28, the spar gear 271 is formed in a substantially circular plate shape. A gear tooth 271g that is engaged with the gear part 264b of the pinion gear 264 is formed on the outer circumferential surface of the spar gear 271.

An insertion hole 271h that penetrates in the central axis direction of the spar gear 271 is formed on the middle part in the radial direction of the spar gear 271 similarly to the worm wheel 263. An engagement recess part 271k having a substantially fan shape is formed around the insertion hole 271h of the spar gear 271, for example, at each of three positions such that the engagement recess parts 271k are spaced in the circumferential direction.

The output gear 272 includes integrally a plate part 272a having a substantially circular plate shape and a gear part 272g that has a toothed wheel shape and that is formed on one surface side of the plate part 272a.

In the plate part 272a, an engagement protrusion 272t that is engaged with an engagement recess part 271k of the spar gear 271 is provided to protrude on the opposite side of the gear part 272g.

Further, an insertion hole 272h in which the shaft 270s of the shaft support member 270 is inserted is formed on the output gear 272. Thereby, the spar gear 271 and the output gear 272 are provided rotatably around the shaft 270s of the shaft support member 270.

Such a speed reducer part 260 is accommodated inside the accommodation recess part 211 and is covered by the cover 208 that is mounted on the casing 210 except for part of the output gear 272 as shown in FIG. 22. The plate part 272a and the gear part 272g of the output gear 272 is exposed to the outside of the cover 208 from a substantially circular opening part 208h that is formed on the cover 208, and a power window apparatus and the like are connected to the gear part 272g.

(Operation of Speed Reducer Motor)

When the motor part 230 of the speed reducer-attached motor 201 is driven, the worm wheel 263 is rotated via the rotation shaft 261 and the worm gear 262. Then, the output gear 272 is rotated together with the worm wheel 263. Further, it is possible to externally output a drive force that operates the window glass to be opened and closed from the gear part 272g of the output gear 272.

Here, the speed of the speed reducer part 260 is reduced in two steps by the engagement between the worm gear 262 and the worm wheel 263 and the engagement between the pinion gear 264 and the spar gear 271.

Further, when the window glass is opened by an external force such as the self-weight of the window glass and vibration at the time of traveling of the vehicle, a rotation force acts on the output gear 272 from the power window apparatus side. In a case where the rotation force acts on the output gear 272 when the motor part 230 is in a stop state, the output gear 272 starts to be rotated in a state where the worm wheel 263 and the lock plate 266 remain being stopped. Then, the rotation of the output gear 272 is transmitted to the pinion gear 264 via the spar gear 271, and the pinion gear 264 starts to be rotated.

However, since the lock plate 266 remains being stopped, each protrusion portion 264k of the output gear 272 is displaced in the circumferential direction relative to the recess part 266b of the lock plate 266. Then, the wedge section that is formed on the front end of the protrusion portion 264k is butted against the slant surface of the groove having a V shape of the recess part 266b. Thereby, when the pinion gear 264 continues the rotation, a force that presses the lock plate 266 to the facing member 265 side acts on the slant surface of each recess part 266b of the lock plate 266 from each protrusion portion 265k of the pinion gear 264.

When the lock plate 266 is pressed to the facing member 265 side, a friction force is generated between the taper surface 266g that is formed on the lock plate 266 and the taper surface 265f of the facing member 265. Then, the rotation of the pinion gear 264, the spar gear 271, and the output gear 272 is prevented.

(Assembly Method of Speed Reducer-Attached Motor)

Next, an assembly method of the above speed reducer-attached motor is described.

When assembling the speed reducer-attached motor 201, first, the armature 232, the commutator 235, and the bearings 268A, 268B are assembled to the rotation shaft 261.

Next, the rotation shaft 261 is assembled with respect to the shaft accommodation groove 212 of the casing 210 along the central axis direction of the shaft 270s of the shaft support member 270 and the shaft member 267 from the opening side of the accommodation recess part 211. At this time, the bearings 268A, 268B are pressed into the bearing accommodation recess parts 215A, 215B that are formed on the casing 210. The ribs 215r, 215r are formed on the bearing accommodation recess parts 215A, 215B. Therefore, the positioning of the radial direction position of the rotation shaft 261 is easily and reliably performed.

In this way, by assembling the rotation shaft 261, as shown in FIG. 29, the commutator 235 that is provided on the rotation shaft 261 is accommodated into the motor accommodation part 216.

Next, the facing member 265, the lock plate 266, the worm wheel 263, and the pinion gear 264 are sequentially assembled into the accommodation recess part 211 of the casing 210 from the opening side of the accommodation recess part 211.

Subsequently, the shaft member 267 is inserted through the facing member 265, the lock plate 266, the worm wheel 263, and the pinion gear 264. Then, the washer 267w (refer to FIG. 27) and the nut (not shown) are mounted on the front end part of the shaft member 267 at the back surface portion 210b side of the casing 210.

Next, the shaft support member 270 is attached onto the main base portion 214m and the sub base portions 214s, 214s of the base part 214 from the top surface portion 210t side of the casing 210 so as to straddle the shaft accommodation groove 212. At this time, it is sufficient to insert (press) the positioning protrusion portion 270t and the pressed protrusion portion 270u that are formed on the plate part 270a in the positioning hole 214g and the recess 214h.

Next, as shown in FIG. 26, the spar gear 271 and the output gear 272 are inserted to the shaft 270s of the shaft support member 270.

Further, the brush holder 240 is pressed in and assembled to the motor accommodation part 216 from the opening side of the accommodation recess part 211.

Then, as shown in FIG. 22, the cover 208 is attached so as to cover the top surface portion 210t of the casing 210. Here, a motor cover part 208m that covers the motor accommodation part 216 is integrally formed on the cover 208, and it is possible to cover the motor accommodation part 216 simultaneously. Then, the yoke 231 is mounted on an end portion of the motor accommodation part 216.

In this way, the speed reducer-attached motor 201 described above includes the rotation shaft 261 on which the worm gear 262 is provided, the motor part 230 that is driven to be rotated around the rotation shaft 261 as the central axis, the speed reducer part 260 that includes the worm wheel 263 which is engaged with the worm gear 262 and the output gear 272 to which the rotation of the worm wheel 263 is transmitted and which externally outputs a rotation force, and the casing 210 that accommodates the rotation shaft 261 and the speed reducer part 260. Further, the rotation center of the output gear 272 is arranged at a position which is crossed with the rotation shaft 261 and which is orthogonal to the rotation shaft 261. Further, the plurality of bolt insertion holes 218h that are formed on the casing 210 and that are used for fixing the casing 210 to a fixation target are arranged symmetrically with respect to the rotation center of the output gear 272.

In this way, the rotation shaft 261 of the speed reducer-attached motor 201 and the output gear 272 are concentrically arranged, and further, the plurality of bolt insertion holes 218h for fixing the casing 210 are provided symmetrically around the output gear 272. Therefore, even when the speed reducer-attached motor 201 is inverted around the rotation shaft 261, no problems arise. Further, the motor part 230 that drives and rotates the rotation shaft 261 is provided concentrically with the rotation shaft 261. Therefore, the weight balance of the speed reducer-attached motor 201 around the rotation shaft 261 is also preferable. Thereby, for example, it becomes possible for the driver seat side and the passenger seat side of the vehicle to share such a speed reducer-attached motor 201. Accordingly, it is not necessary to manufacture a plurality of types of casings 210 in accordance with the arrangement direction of the speed reducer-attached motor 201, and it is possible to reduce the mold cost.

Further, the speed reducer-attached motor 201 further includes the shaft support member 270 that rotatably supports the output gear 272, and the shaft support member 270 includes the plate part 270a that is provided so as to straddle the rotation shaft 261 and the shaft 270s that extends in a direction which is orthogonal to the rotation shaft 261 from the plate part 270a and that rotatably supports the output gear 272.

According to such a configuration, by providing the shaft 270s on the plate part 270a that is provided so as to straddle the rotation shaft 261, it is possible to arrange the rotation center of the output gear 272 at a position which is crossed with the rotation shaft 261 and which is orthogonal to the rotation shaft 261.

Further, the shaft support member 270 is a separate body from the casing 210 and is fixed to the casing 210. In this way, the shaft support member 270 having the plate part 270a that is provided so as to straddle the rotation shaft 261 is a separate body from the casing 210. Therefore, in a case where the rotation shaft 261 is assembled to the casing 210 before the shaft support member 270 is assembled to the casing 210, the shaft support member 270 is not an obstacle when the rotation shaft 261 is assembled. Accordingly, it is possible to improve the assembly property.

Further, the casing 210 includes the shaft accommodation groove 212 that accommodates the rotation shaft 261 and the worm wheel accommodation part 213 that accommodates the worm wheel 263. The shaft accommodation groove 212 and the worm wheel accommodation part 213 are opened at one surface side of the casing 210. Further, the shaft 270s is provided so as to extend to the one surface side of the casing 210 with respect to the plate part 270a.

In this way, the shaft accommodation groove 212 and the worm wheel accommodation part 213 open at one surface side of the casing 210, and the shaft 270s also extends to the one surface side of the casing 210. Therefore, it becomes possible to assemble the rotation shaft 261, the worm wheel 263, and the output gear 272 from the same direction of the one surface side with respect to the casing 210. Accordingly, when assembling the speed reducer-attached motor 201, it is possible to avoid changing of the direction of the casing 210 in accordance with a component to be assembled, and it is possible to improve the assembly property.

Further, the motor accommodation part 216 that accommodates the commutator 235 is opened at the top surface portion 210t side of the casing 210 similarly to the shaft accommodation groove 212, the bearing accommodation recess parts 215A, 215B, and the accommodation recess part 211. Therefore, it becomes possible to assemble the commutator 235 that is provided on the rotation shaft 261 to the casing 210 together with the rotation shaft 261.

Further, the brush holder 240 is fixed to the motor accommodation part 216. Thereby, it becomes possible to assemble the brush holder 240 also to the casing 210 part from the same direction similarly to the rotation shaft 261, the bearings 268A, 268B, and the speed reducer part 260.

(Modified Example of Second Embodiment)

Figure 31:
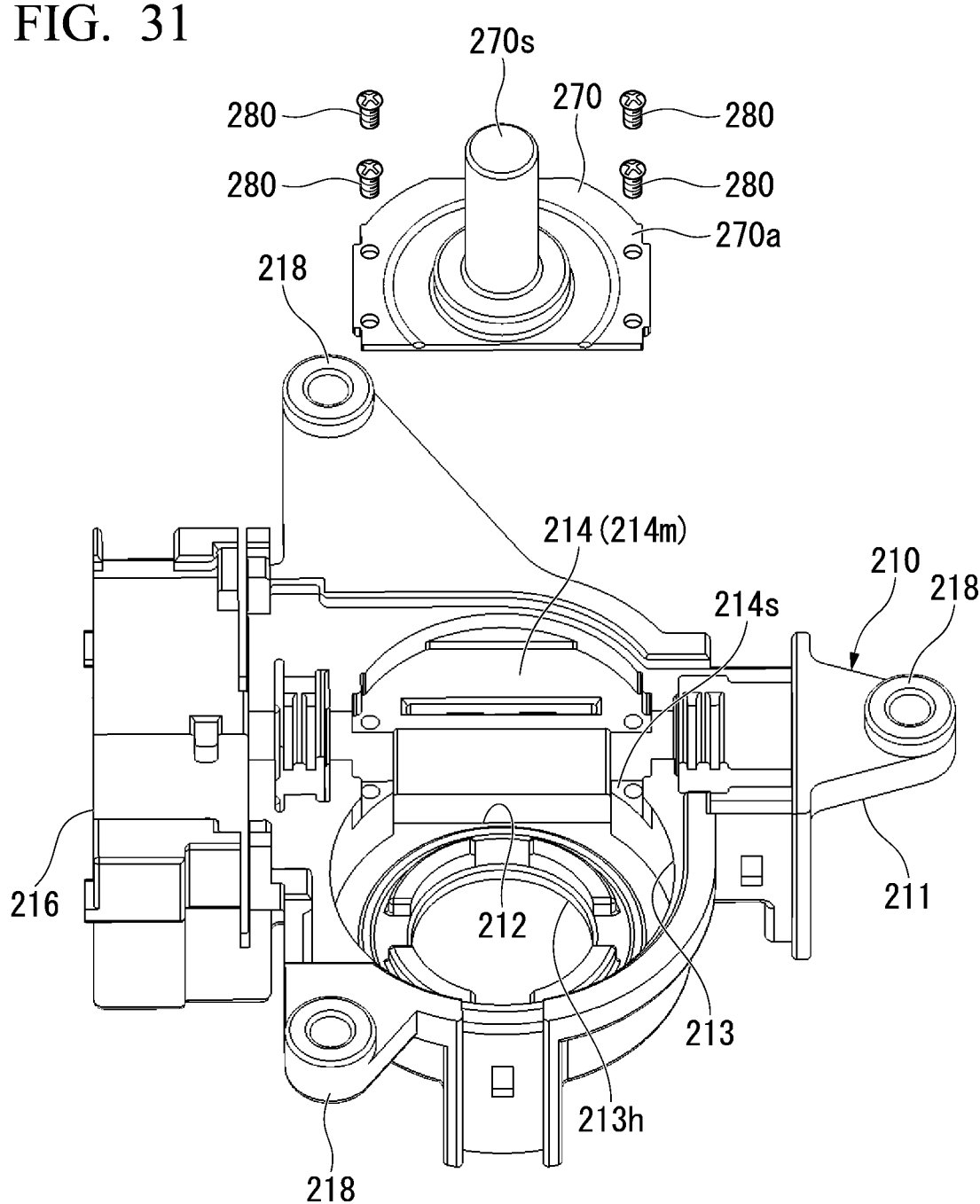
FIG. 31 is a view showing a modified example of the second embodiment of the present invention.

FIG. 31 is a view showing a modified example of the second embodiment described above.

As shown in FIG. 31, the plate part 270a of the shaft support member 270 may be fixed to the base part 214 by a screw 280.

Figure 32:
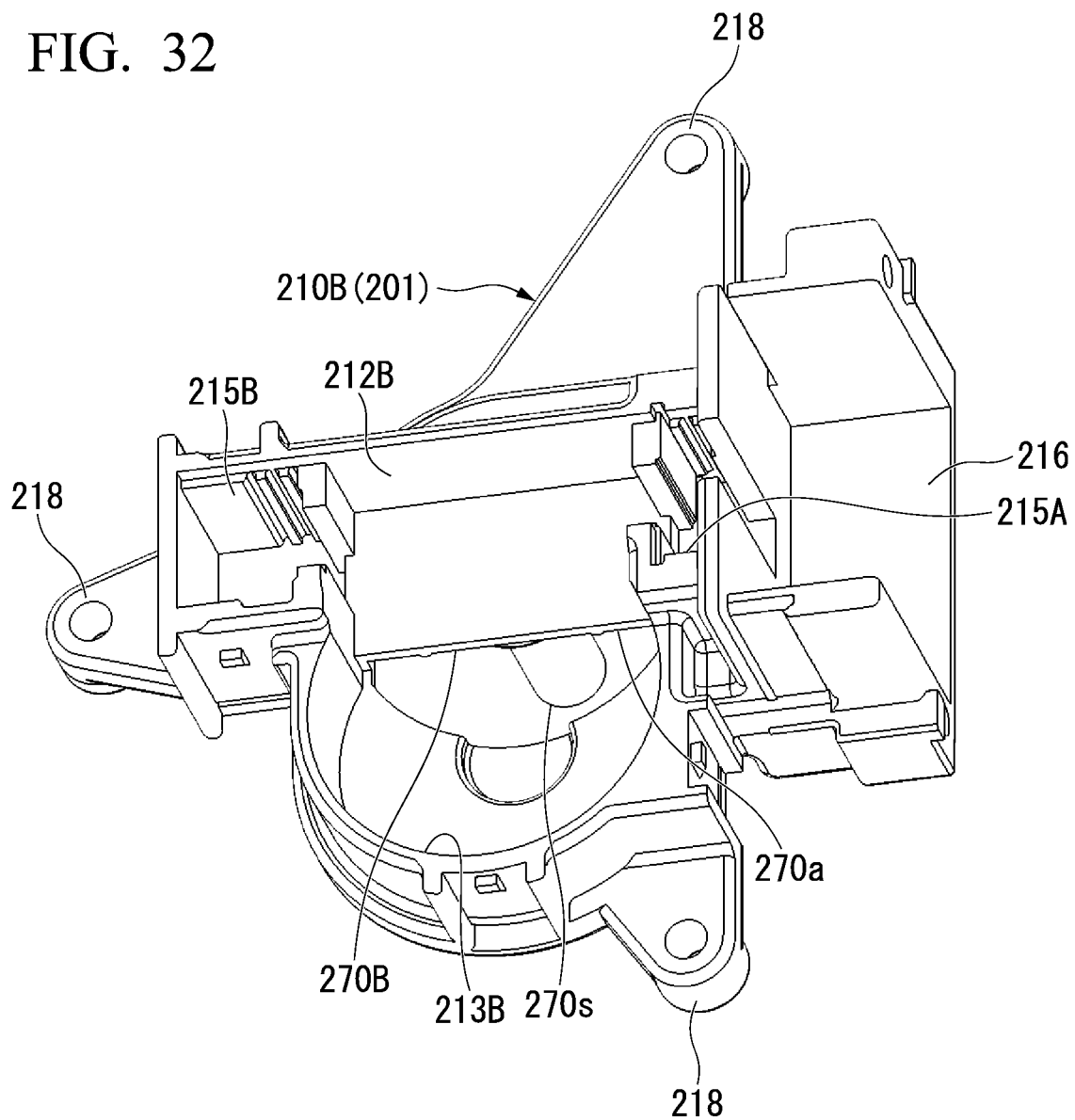
FIG. 32 is a perspective view showing a configuration of a casing in another modified example of the second embodiment of the present invention.
Figure 33:
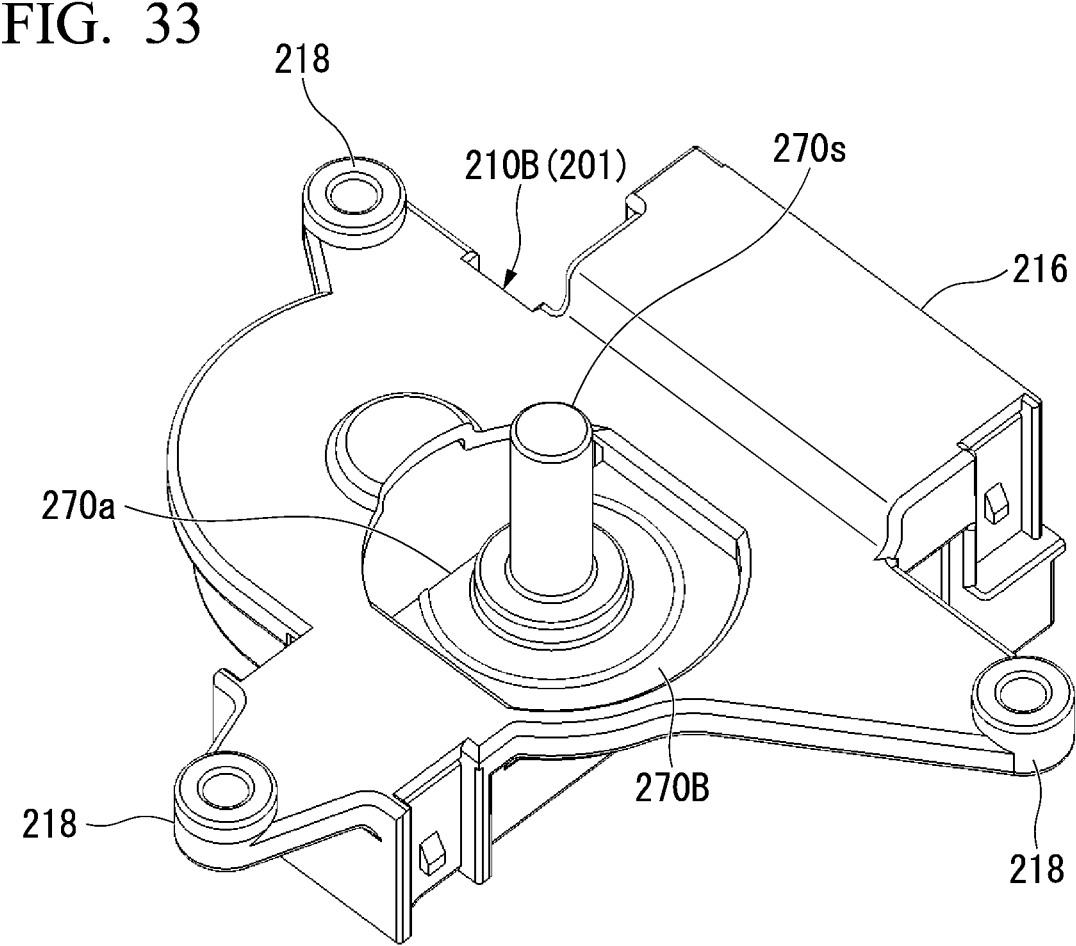
FIG. 33 is a perspective view of the casing shown in FIG. 11 when seen from a different angle.

FIG. 32 is a perspective view showing a configuration of a casing 210B in another modified example of the second embodiment described above. FIG. 33 is a perspective view of the casing 210B shown in FIG. 32 when seen from a different angle.

As shown in FIG. 32, in the casing 210B of the speed reducer-attached motor 201, a shaft accommodation groove (shaft accommodation recess part) 212B that accommodates the rotation shaft 261 including the worm gear 262 and a worm wheel accommodation part 213B that accommodates the worm wheel 263 are opened at one surface side of the casing 210B. Further, as shown in FIG. 32, the shaft 270s of the shaft support member 270B that supports the output gear 272 is provided so as to extend to the other surface side of the casing 210B with respect to the plate part 270a.

According to such a configuration, it becomes possible to assemble the rotation shaft 261 and the worm wheel 263 from the same direction of the one surface side with respect to the casing 210B. Further, it is possible to assemble the output gear 272 that is supported by the shaft 270s from the other surface side of the casing 210B. Accordingly, the shaft 270s is not an obstacle in assembling the rotation shaft 261 and the worm wheel 263 to the casing 210B while arranging the rotation center of the output gear 272 at a position which is crossed with the rotation shaft 261 and which is orthogonal to the rotation shaft 261. Accordingly, it also becomes possible to integrate the shaft 270s to the casing 210B.

In the second embodiment described above, the assembly method of the speed reducer-attached motor 201 is described. However, the embodiment is not limited thereto. For example, the assembly order between the worm wheel 263, the output gear 272, or the like and the brush holder 240 or the like may be appropriately changed.

Further, the above second embodiment is described using an example in which the speed reducer-attached motor 201 is applied to a power window apparatus. However, the embodiment is not limited thereto. The speed reducer-attached motor 201 is applicable to a drive source of a vehicle wiper arm, a drive source of a window regulator, a sunroof, an electrically operated seat, or the like, and further, a variety of apparatuses such as an electric component other than a vehicle.

Third Embodiment (Speed Reducer-Attached Motor)

Figure 34:
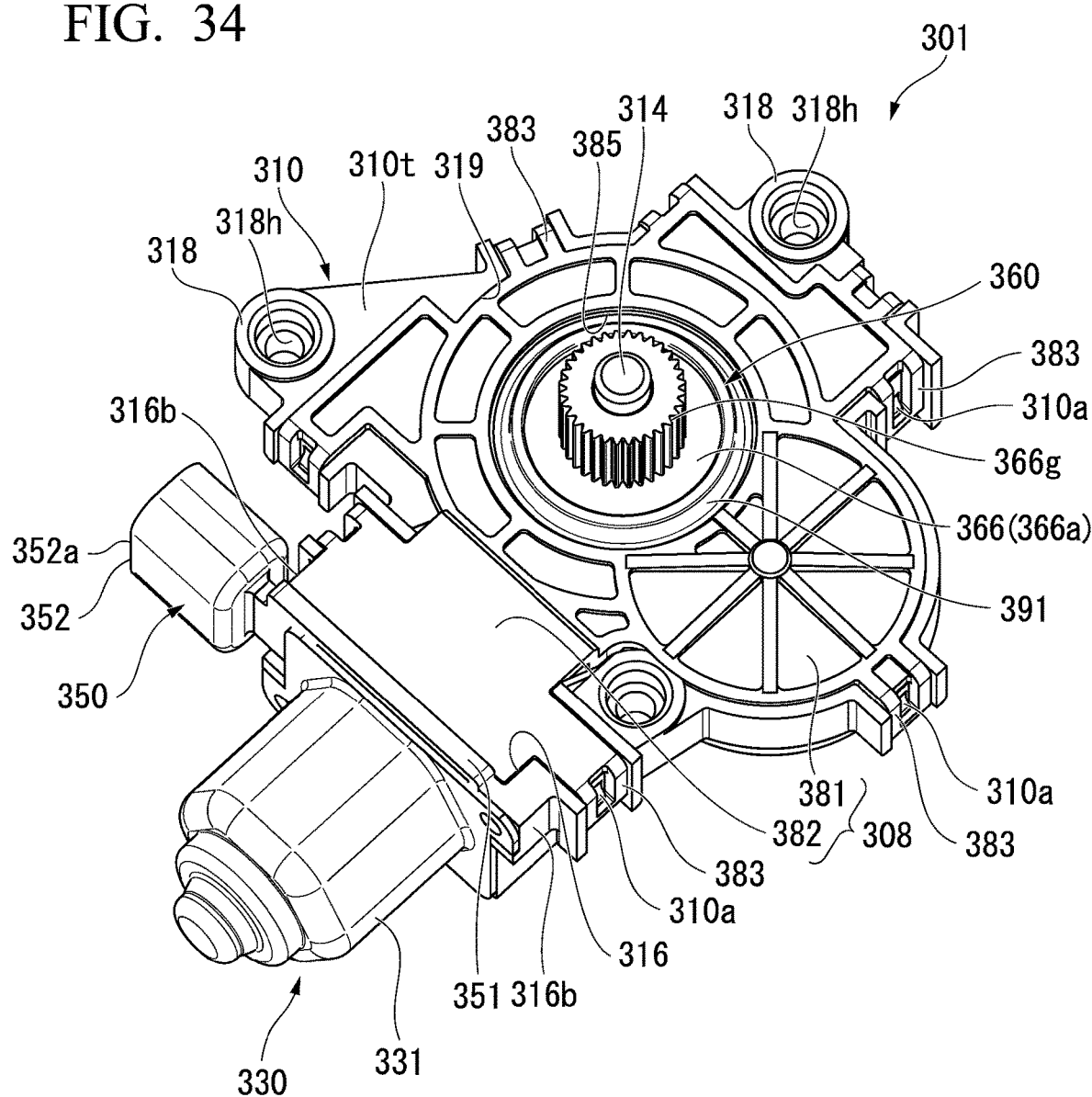
FIG. 34 is a perspective view showing an appearance of a speed reducer-attached motor according to a third embodiment of the present invention.
Figure 35:
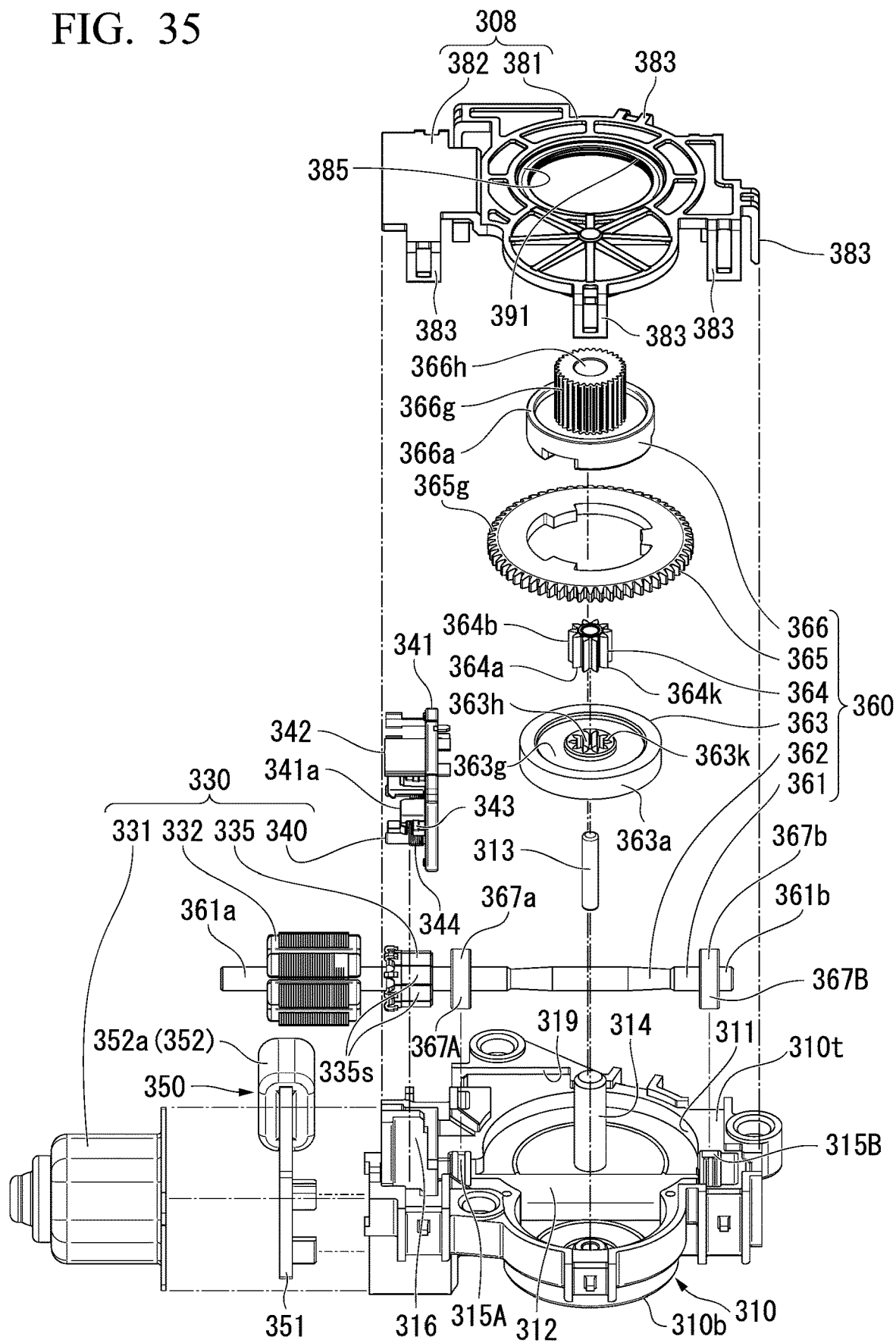
FIG. 35 is a perspective expansion view showing a component configuration of the speed reducer-attached motor according to the third embodiment of the present invention.
Figure 36:
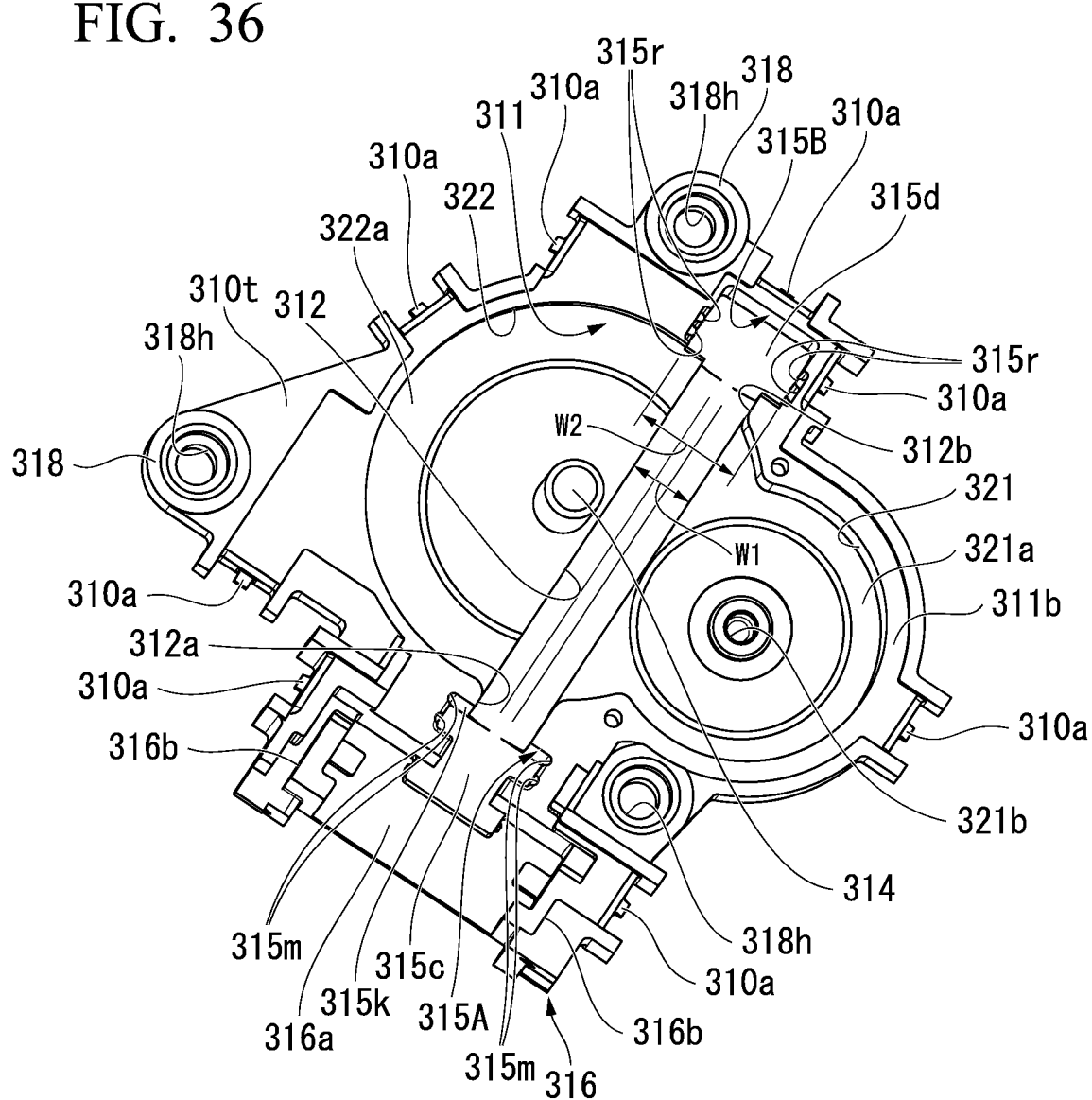
FIG. 36 is a perspective view showing a casing according to the third embodiment of the present invention.
Figure 37:
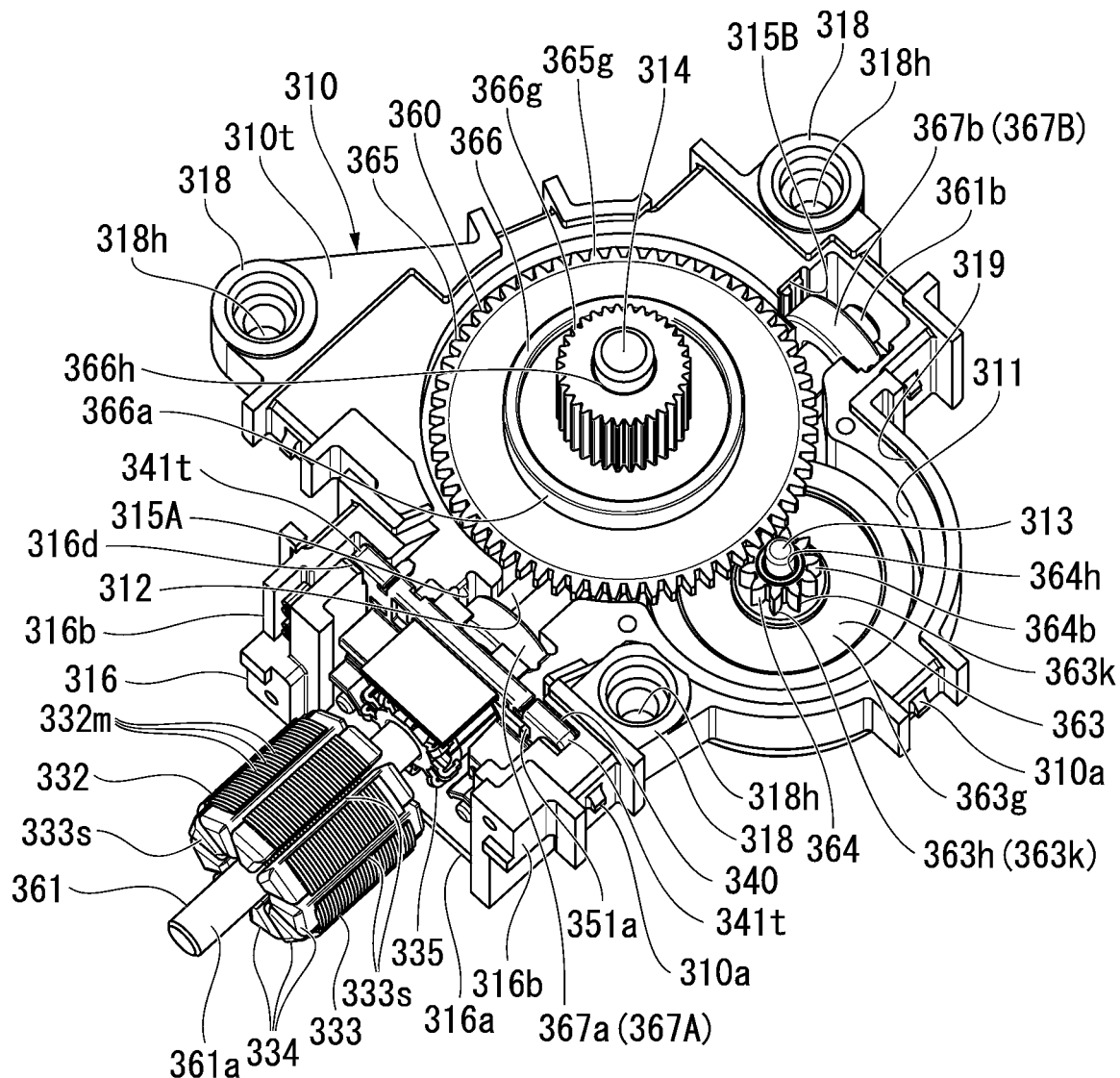
FIG. 37 is a perspective view showing a state in which a cover of the speed reducer-attached motor is removed according to the third embodiment of the present invention.

FIG. 34 is a perspective view showing an appearance of a speed reducer-attached motor 301. FIG. 35 is a perspective expansion view showing a component configuration of the speed reducer-attached motor 301. FIG. 36 is a perspective view showing a casing 310 that constitutes the speed reducer-attached motor 301. FIG. 37 is a perspective view showing a state in which a cover 308 of the speed reducer-attached motor 301 is removed.

As shown in FIG. 34 to FIG. 37, the speed reducer-attached motor 301 is a motor that is used, for example, for a power window apparatus of a vehicle and the like. The speed reducer-attached motor 301 includes a casing 310 of which one surface is opened and which has a substantially box shape, a cover 308 that is provided so as to cover an opening of the casing 310, a motor part 330 that is provided on one end side of the casing 310, and a speed reducer part 360 that is connected to the motor part 330 and that is accommodated inside the casing 310.

(Casing)

As shown in FIG. 35 and FIG. 36, an accommodation recess part 311 that accommodates the speed reducer part 360 is formed on one surface side of the casing 310. The accommodation recess part 311 is recessed from a top surface portion (one surface) 310t of the casing 310 toward a back surface portion 310b that is opposed to the top surface portion 310t. The accommodation recess part 311 is constituted of a shaft accommodation groove (shaft accommodation recess part) 312 that accommodates a rotation shaft 361 described later, a worm wheel accommodation recess part 321 that stores a worm wheel 363 (refer to FIG. 35), and a drive gear accommodation recess part 322 that accommodates a drive gear 366 (refer to FIG. 35) at a bottom surface 311b of the accommodation recess part 311.

The shaft accommodation groove 312 is formed so as to extend in one direction along the bottom surface 311b of the accommodation recess part 311. The shaft accommodation groove 312 is formed such that each of one end part 312a and the other end part 312b of the shaft accommodation groove 312 extends to the outside of the accommodation recess part 311. Bearing accommodation recess parts (bearing accommodation recess parts) 315A, 315B (a first bearing accommodation recess part 315A, a second bearing accommodation recess part 315B) are formed on the shaft accommodation groove 312 at a further outside position of the accommodation recess part 311.

Bearings 367A, 367B that rotatably support the rotation shaft 361 described later are pressed into and accommodated in the bearing accommodation recess parts (bearing accommodation recess parts) 315A, 315B (the first bearing accommodation recess part 315A, the second bearing accommodation recess part 315B). Two groove parts 315m as a pair are formed on the first bearing accommodation recess part 315A that is formed on the one end part 312a side of the shaft accommodation groove 312 among the two bearing accommodation recess parts 315A, 315B. Further, the groove parts 315m extend toward a bottom surface 315c of the first bearing accommodation recess part 315A from the top surface portion 310t side of the casing 310 at both sides of a radial direction that is orthogonal with respect to the central axis of the shaft accommodation groove 312.

On the other hand, two ribs 315r as a pair are formed on the second bearing accommodation recess part 315B that is formed on the other end part 312b side of the shaft accommodation groove 312 at both sides of a radial direction that is orthogonal with respect to the central axis of the shaft accommodation groove 312. The ribs 315r extend toward a bottom surface 315d of the second bearing accommodation recess part 315B from the top surface portion 310t side of the casing 310.

By forming the groove part 315m, it is possible for the first bearing accommodation recess part 315A to accept slight elastic deformation with respect to the pressing of the bearing 367A into the first bearing accommodation recess part 315A. Further, the rib 315r of the second bearing accommodation recess part 315B is formed to be elastically deformable. Thereby, the pressing of the bearing 367A into the second bearing accommodation recess part 315B is accepted.

In this way, the bearings 367A, 367B are pressed while outer circumferential surfaces 367a, 367b are butted to the bottom surfaces 315c, 315d of the bearing accommodation recess parts 315A, 315B, and thereby, the movement in the radial direction is restricted.

Further, a recess section 321b in which a first shaft 313 is capable of being inserted is formed on a bottom portion 321a of the worm wheel accommodation recess part 321 at a position that corresponds to a rotation axis line of the worm wheel 363. A base end of the first shaft 313 is inserted in the recess section 321*b*. The first shaft 313 is provided so as to be orthogonal with respect to the bottom portion 321*a* and to protrude toward an opening direction (top surface portion 310*t* side) of the accommodation recess part 311. The worm wheel 363 is rotatably supported at a position that protrudes from the bottom portion 321*a* of the first shaft 313.

On the other hand, a second shaft 314 is provided on a bottom portion 322*a* of the drive gear accommodation recess part 322 to stand at a position that corresponds to a rotation axis line of the drive gear 366. The second shaft 314 is also provided so as to be orthogonal with respect to the bottom portion 322*a* and to protrude toward an opening direction (top surface portion 310*t* side) of the accommodation recess part 311 similarly to the first shaft 313. The drive gear 366 is rotatably supported by such a second shaft 314.

Further, the first shaft 313 and the second shaft 314 are provided respectively at one side and the other side that interpose the shaft accommodation groove 312.

A motor accommodation part 316 that accommodates a portion of the motor part 330 is formed on an outer circumferential part of the casing 310. The motor accommodation part 316 is formed in a substantially U shape in a cross-section. That is, the motor accommodation part 316 has a bottom plate portion 316*a* that is formed on the same side as the bottom surface 311*b* of the accommodation recess part 311 and a pair of side wall portions 316*b* that stand toward the opening direction (top surface portion 310*t* side of the casing 310) of the accommodation recess part 311 from both sides of the bottom plate portion 316*a*.

Further, in the casing 310, an insertion recess part 317 is formed between the accommodation recess part 311 and the motor accommodation part 316. The insertion recess part 317 is recessed toward the back surface portion 310*b* side from the top surface portion 310*t* of the casing 310, and the rotation shaft 361 is inserted through the insertion recess part 317 to the inside and the outside of the casing 310. This insertion recess part 317 is formed so as to continue to the one end part 312*a* of the shaft accommodation groove 312.

A protrusion part 318 is formed on the outer circumferential part of the casing 310 at each of a position close to the other end part 312*b* of the shaft accommodation groove 312 and a position on the one end part 312*a* side of the shaft accommodation groove 312 and on the drive gear accommodation recess part 322 side. A bolt insertion hole 318*h* through which a bolt (not shown) that fixes the casing 310 to a vehicle body is inserted is formed on each of the protrusion parts 318.

Further, the bolt insertion hole 318*h* is formed on the outer circumferential part of the casing 310 at a position on the one end part 312*a* side of the shaft accommodation groove 312 and on the worm wheel accommodation recess part 321 side. That is, three bolt insertion holes 318*h* in total are formed and are arranged at substantially an equal interval in the circumferential direction.

Further, a latch protrusion 310*a* is formed on the outer circumferential part of the casing 310 at each of the pair of side wall portions 316*b* that constitute the motor accommodation part 316. Further, a latch protrusion 310*a* is formed on the outer circumferential part of the casing 310 at a position on the one end part 312*a* side of the shaft accommodation groove 312 and between the protrusion part 318 and the motor accommodation part 316. Further, a latch protrusion 310*a* is formed on the outer circumferential part of the casing 310 at each of the worm wheel accommodation recess part 321 side and the drive gear accommodation recess part 322 side that interpose the shaft accommodation groove 312. Further, three latch protrusions 310*a* are formed on the outer circumferential part of the casing 310 around the second bearing accommodation recess part 315B that is formed on the other end part 312*b* side of the shaft accommodation groove 312. Each of two of the three latch protrusions 310*a* is arranged on each of both sides that interpose the second bearing accommodation recess part 315B (the rotation shaft 361, a worm gear 362). In this way, eight latch protrusions 310*a* in total are formed on the outer circumferential part of the casing 310.

The latch protrusions 310*a* are members for fixing the cover 308 to the casing 310 by snap fitting. A step part 319 that is recessed to the back surface portion 310*b* side from the top surface portion 310*t* is formed on the top surface portion 310*t* of the casing 310 at a circumferential edge portion of the accommodation recess part 311, and the cover 308 having a substantially plate shape is fitted to this step part 319.

(Motor Part)

As shown in FIG. 35 and FIG. 37 in detail, for example, a brush-attached DC motor or the like is used for the motor part 330. The motor part 330 includes a yoke 331, an armature 332 of which one end is rotatably supported by the yoke 331, a brush holder 340 that holds a pair of brushes 343 for supplying electric power to the armature 332, and a connector member 350 that electrically connects the brush 343 and an external electric source (not shown) together.

The yoke 331 is formed in a substantially cylindrical shape having a bottom. An opening part of the yoke 331 is arranged to be directed toward the motor accommodation part 316 side of the casing 310. The yoke 331 is fastened and fixed to one end portion of the motor accommodation part 316 by a screw (not shown) or the like. A permanent magnet (not shown) is provided on an inner circumferential surface of the yoke 331.

The armature 332 is constituted of the rotation shaft 361, an armature core 333 that is externally fitted and fixed to one end 361*a* of the rotation shaft 361, an armature coil 334 that is wound around the armature core 333, and a commutator 335 that is externally fitted and fixed to a position closer to the motor accommodation part 316 than the armature core 333 of the rotation shaft 361.

The armature core 333 is formed by axially laminating a plurality of metal plates 333*m* having a substantially ring shape. A plurality of slots 333*s* and teeth 333*t* around which an armature coil 334 is wound is formed on the armature core 333. The armature coil 334 is wound around the teeth 333*t* via a slot 333*s*.

The commutator 335 is formed in a substantially cylinder shape. A plurality of segments 335*s* that are formed of an electrically conductive material are attached in a circumferential direction on the outer circumferential surface of the commutator 335. The armature coil 334 is electrically connected to the segments 335*s*.

The brush holder 340 is accommodated in the motor accommodation part 316 of the casing 310. The brush holder 340 has a support plate 341. The support plate 341 is formed in a substantially U shape so as to avoid contact with the rotation shaft 361. An opening of the support plate 341 is directed toward the bottom plate portion 316*a* (refer to FIG. 36) side of the motor accommodation part 316 and is inserted in the motor accommodation part 316 from an opening (top surface portion 310*t* side of the casing 310) of the motor accommodation part 316. Thereby, the brush holder 340 is accommodated in the motor accommodation part 316.

A brush-holding part 341*a* having a substantially angular tube shape and an electronic component such as a thermistor 342 are provided on such a support plate 341. A pair of brushes 343 is held by the brush-holding part 341*a* so as to be capable of appearing and disappearing toward the commutator 335. Further, the brush 343 is biased toward the commutator 335 side by a spring 344. Thereby, a front end of the brush 343 is continuously in slidable contact with the segment 335*s* of the commutator 335.

The connector member 350 includes a frame part 351 that is sandwiched and held by one end portion of the motor accommodation part 316 and the yoke 331 and a connector reception part 352 that is integrally provided on the frame part 351. The frame part 351 is formed in a substantially rectangle and architrave shape, and an opening portion 351*a* of the frame part 351 allows the motor accommodation part 316 side and the yoke 331 side to communicate with each other. That is, part of the armature 332 is inserted in the opening portion 351*a*. The yoke 331 is mounted on the frame part 351, and thereby, the opening portion 351*a* is covered.

The connector reception part 352 has a hood 352*a* which has a substantially tube shape having a bottom and in which a connector (not shown) that is provided on a front end of a harness which is connected to the vehicle body side is inserted. One end part of a terminal member (not shown) that is electrically connected to a harness-side terminal (not shown) which is provided on the connector is held inside the hood 352*a*. The connector (not shown) of the harness that is connected to an external electric source (not shown) is connected to such a connector reception part 352 of the connector member 350, and thereby, it is possible to supply electric power of the external electric source to the motor part 330 (the armature 332).

(Speed Reducer Part)

As shown in FIG. 35 and FIG. 37, the speed reducer part 360 includes the rotation shaft 361 that is shared with the armature 332, a worm gear 362 that is integrally molded on the rotation shaft 361, a worm wheel 363 that is engaged with the worm gear 362, a pinion gear 364 that is integrated with the worm wheel 363, a spar gear 365 that is engaged with the pinion gear 364, and a drive gear 366 that is integrated with the spar gear 365.

A portion of the rotation shaft 361 closer to the other end 361*b* side than the armature 332 and the commutator 335 of the motor part 330 that is provided on the one end 361*a* side is accommodated in the shaft accommodation groove 312 of the casing 310. The portion that is accommodated in the shaft accommodation groove 312 is constituted as the speed reducer part 360.

Each of bearings 367A, 367B each of which is stored in each of the bearing accommodation recess parts 315A, 315B of the casing 310 is externally fitted to the rotation shaft 361 at each of two positions that are spaced in the central axis direction of the rotation shaft 361. For example, a rolling bearing is used as the bearings 367A, 367B.

Figure 38:
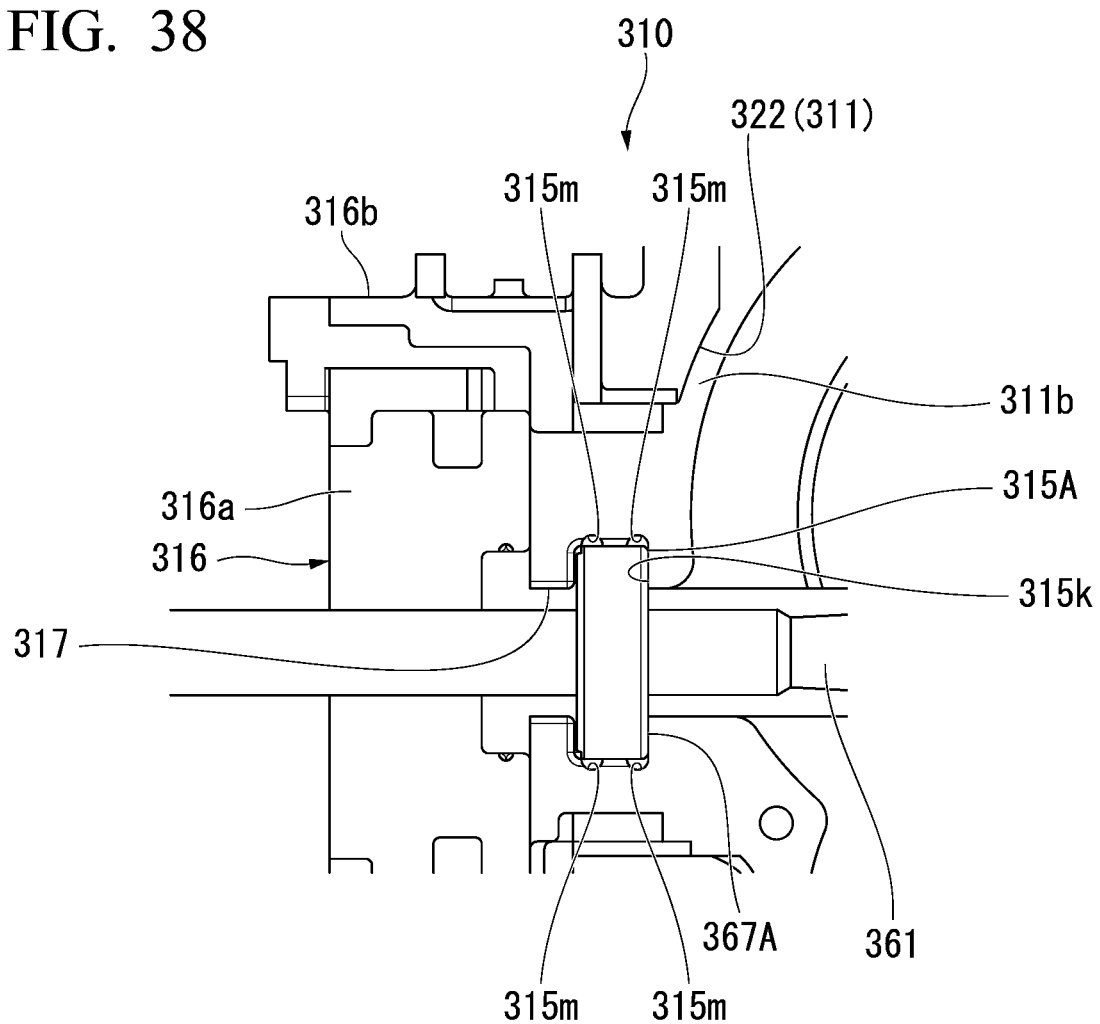
FIG. 38 is a plan view showing a state in which a bearing that is provided on one side of a rotation shaft is fitted to a bearing accommodation recess part according to the third embodiment of the present invention.

FIG. 38 is a plan view showing a state in which the bearing 367A that is provided on one side of the rotation shaft 361 is fitted to the first bearing accommodation recess part 315A.

As shown in FIG. 36 and FIG. 38, a positioning surface 315*k* that is orthogonal to the central axis direction of the shaft accommodation groove 312 is formed at a side close to the accommodation recess part 311 on the first bearing accommodation recess part 315A of the motor accommodation part 316 side. The bearing 367A that is provided on one side of the rotation shaft 361 is butted against the positioning surface 315*k*, and thereby, positioning of the bearing 367A in the central axis direction of the rotation shaft 361 is performed.

As shown in FIG. 37, the second bearing accommodation recess part 315B on a side that is separated from the motor accommodation part 316 has an opening size that is larger than a thickness in the axial direction of the bearing 367B. The bearing 367B and the other end 361*b* of the rotation shaft 361 are accommodated in the bearing accommodation recess part 315B. Only the movement in the radial direction of the bearing 367B is restricted by the bottom surface 315*d* and the ribs 315*r* at both sides of the radial direction.

With reference back to FIG. 35 to FIG. 37, the worm gear 362 is formed integrally with the rotation shaft 361 at a middle part of the bearings 367A, 367B. The rotation shaft 361 on which the worm gear 362 is provided is arranged inside the shaft accommodation groove 312.

Here, a width size W1 in a direction that is orthogonal to the rotation shaft 361 in the shaft accommodation groove 312 is set to be smaller than a width size W2 in the bearing accommodation recess parts 315A, 315B.

The pinion gear 364 is formed in a cylinder shape. A gear part 364*b* that has a toothed wheel shape and that is formed so as to protrude in the axial direction from the outer circumferential surface of the pinion gear 364 is formed on the pinion gear 364, and a shaft insertion hole 364*h* in which the first shaft 313 that is formed on the casing 310 is inserted is formed on the center part of the gear part 364*b*. The first shaft 313 is inserted in the shaft insertion hole 364*h*, and thereby, the pinion gear 364 is supported rotatably around the first shaft 313.

The worm wheel 363 is formed in a substantially circular plate shape. The worm wheel 363 is accommodated in the worm wheel accommodation recess part 321 of the casing 310. A gear tooth 363*a* that is engaged with the worm gear 362 is formed on the outer circumferential surface of the worm wheel 363. Further, a guide recess part 363*g* having a substantially annular shape when seen from the rotation axis direction of the worm wheel 363 is formed on a surface of the worm wheel 363 at a side close to the top surface portion 310*t* of the casing 310. The guide recess part 363*g* together with a guide wall 384 described later that is provided on the cover 308 has a role of restricting the movement in the radial direction of the worm wheel 363.

Further, an insertion hole 363*h* that penetrates in the central axis direction of the worm wheel 363 is formed on the middle part in the radial direction of the worm wheel 363 and at an inner side of the guide recess part 363*g* of the worm wheel 363. Further, an engagement recess part 363*k* with which the gear part 364*b* of the pinion gear 364 is engaged and which is recessed outward in the radial direction is formed around the insertion hole 363*h*.

In the worm wheel 363, the pinion gear 364 is inserted in the insertion hole 363*h*. Thereby, the worm wheel 363 is supported rotatably around the first shaft 313 integrally with the pinion gear 364.

The worm wheel 363 and the pinion gear 364 are rotated around the first shaft 313 when the rotation shaft 361 is driven to be rotated around the central axis of the rotation shaft 361 by the motor part 330.

The spar gear 365 is formed in a substantially circular plate shape and is accommodated in the drive gear accommodation recess part 322 of the casing 310. A gear tooth 365g that is engaged with the gear part 364b of the pinion gear 364 is formed on the outer circumferential surface of the spar gear 365.

An insertion hole (not shown) that penetrates in the central axis direction of the spar gear 365 is formed on the middle part in the radial direction of the spar gear 365 similarly to the worm wheel 363. An engagement recess part (not shown) having a substantially fan shape is formed around the insertion hole of the spar gear 365, for example, at each of three positions such that the engagement recess parts are spaced in the circumferential direction.

The drive gear 366 includes integrally a plate part 366a having a substantially circular plate shape and a gear part 366g that has a toothed wheel shape and that is formed on one surface side of the plate part 366a.

In the plate part 366a, an engagement protrusion (not shown) that is engaged with an engagement recess part (not shown) of the spar gear 365 is provided to protrude on the opposite side of the gear part 366g. Thereby, the drive gear 366 together with the spar gear 365 is accommodated in the drive gear accommodation recess part 322.

Further, a shaft insertion hole 366h in which the second shaft 314 that is formed on the casing 310 is inserted is formed on the drive gear 366. Thereby, the spar gear 365 and the drive gear 366 are provided rotatably around the second shaft 314.

Here, as shown in FIG. 36, the bottom portion 322a of the drive gear accommodation recess part 322 is formed at a position that is closer to the top surface portion 310t of the casing 310 than a bottom portion 321a of the worm wheel accommodation recess part 321. Thereby, as shown in FIG. 37, the outer circumferential part of the spar gear 365 is arranged above the rotation shaft 361 so as to straddle the rotation shaft 361, and the spar gear 365 is arranged at a higher position than the worm wheel 363 that is engaged with the worm gear 362. As shown in FIG. 34, the speed reducer part 360 is covered by the cover 308 that is mounted on the casing 310 except for part of the drive gear 366.

(Cover)

Figure 39:
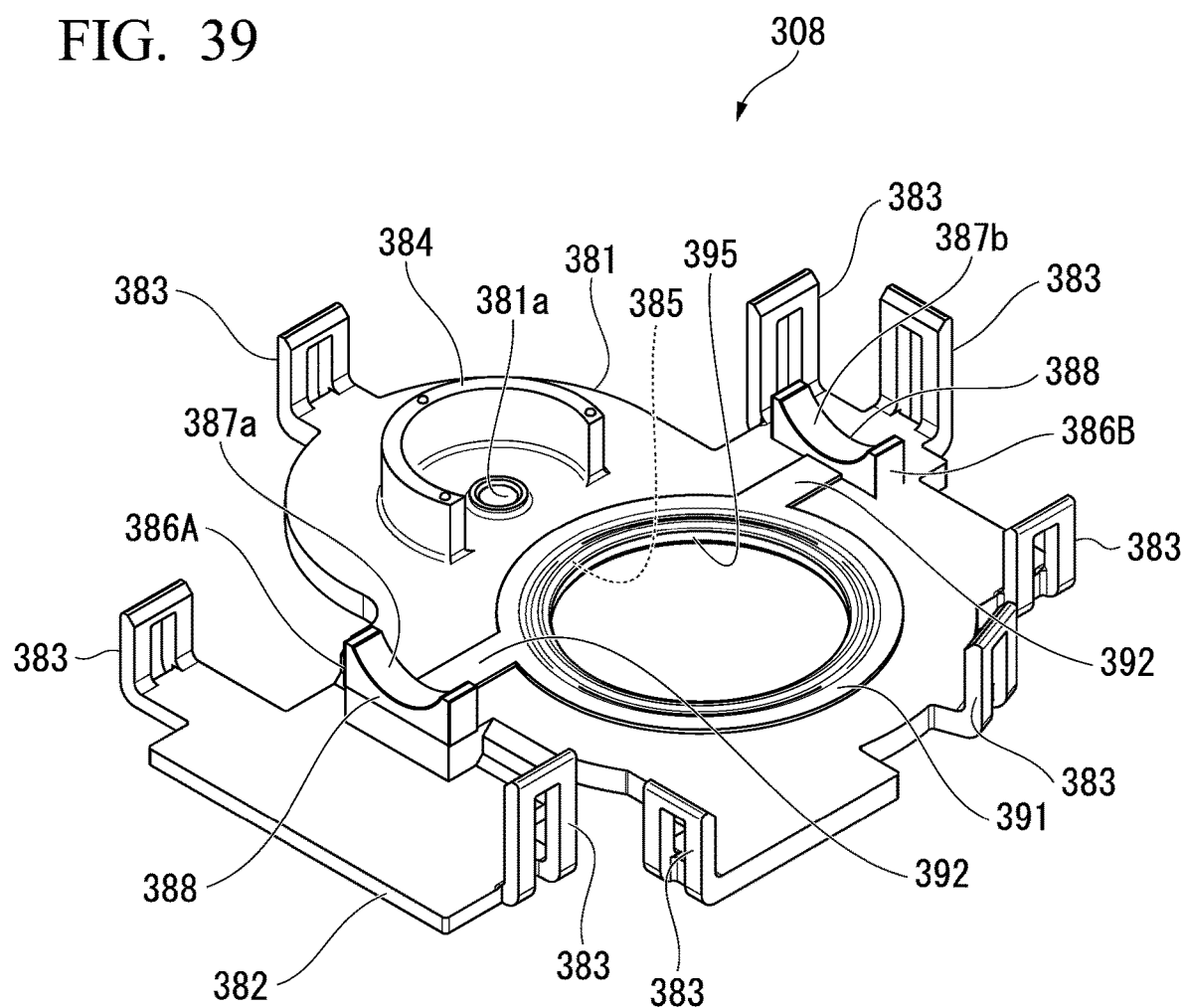
FIG. 39 is a perspective view of the cover when seen from the casing side according to the third embodiment of the present invention.

FIG. 39 is a perspective view of the cover 308 when seen from the casing 310 side.

As shown in FIG. 35 and FIG. 39, the cover 308 is arranged on the top surface portion 310t side of the casing 310. The cover 308 is formed of a plastic material in a substantially plate shape. In the cover 308, a cover main body 381 that closes the accommodation recess part 311 of the casing 310 and a motor-side cover 382 that closes an opening on the top surface portion 310t side of the casing 310 in the motor accommodation part 316 are integrally molded.

Further, a latch tongue piece 383 is integrally molded on the outer circumferential part of the cover 308 at each position that corresponds to each of the latch protrusions 310a of the casing 310. That is, eight latch tongue pieces 383 in total are integrally molded on the outer circumferential part of the cover 308.

The latch tongue piece 383 extends toward the outer circumferential part of the casing 310 and is formed to be capable of being latched to the corresponding latch protrusion 310a. The latch tongue piece 383 is latched to each latch protrusion 310a, and thereby, the cover 308 is fixed to the casing 310 by snap fitting.

Further, the guide wall 384 that protrudes toward the worm wheel accommodation recess part 321 and that has a substantially C shape in a cross-section is integrally molded on the cover main body 381 of the cover 308 at a position that corresponds to the worm wheel accommodation recess part 321. A front end of the guide wall 384 is inserted in the guide recess part 363g (refer to FIG. 37) that is formed on the worm wheel 363. Thereby, the movement in the radial direction of the worm wheel 363 is restricted.

Further, a recess part 381a in which the first shaft 313 that is provided to protrude on the casing 310 is capable of being inserted is formed on an inner side in the radial direction of the guide wall 384 in the cover main body 381. The front end of the first shaft 313 is inserted in the recess part 381a. In this way, both ends of the first shaft 313 are supported by the casing 310 and the cover 308.

Further, an opening part 385 through which the plate part 366a and the gear part 366g of the drive gear 366 are capable of being inserted is formed on the cover main body 381. The plate part 366a and the gear part 366g are externally exposed via the opening part 385. A window regulator that opens and closes a vehicle window or the like is engaged with the gear part 366g.

Further, a seal part 391 for sealing a space between the opening part 385 and the plate part 366a is provided on the cover main body 381 at a circumferential edge of the opening part 385. The seal part 391 is formed of, for example, a rubber or the like.

Further, bearing stoppers 386A, 386B (first bearing stopper 386A, second bearing stopper 386B) that protrude toward the bearing accommodation recess parts 315A, 315B are integrally molded on the cover 308 respectively at positions that correspond to the bearing accommodation recess parts 315A, 315B. The bearing stoppers 386A, 386B are members for preventing separation of the bearings 367A, 367B that are accommodated in the bearing accommodation recess parts 315A, 315B from the bearing accommodation recess parts 315A, 315B. The bearing stoppers 386A, 386B are formed in a substantially cuboid shape that is capable of being inserted in the bearing accommodation recess parts 315A, 315B. Each of recess parts 387a, 387b having an arc shape is formed on a front end surface of each of the bearing stoppers 386A, 386B so as to correspond to each of the outer circumferential surfaces 367a, 367b of the bearings 367A, 367B. The recess parts 387a, 387b push the bearings 367A, 367B from the top surface portion 310t side of the casing 310.

Further, surfaces of the bearing stoppers 386A, 386B are covered by an elastic part 388. The elastic part 388 is formed of a material (for example, a rubber or the like) having elasticity similarly to the seal part 391. The elastic part 388 is formed to have a thickness that is capable of absorbing a manufacturing error to some extent such that the bearings 367A, 367B are not forcedly pushed by the bearing stoppers 386A, 386B.

Here, the seal part 391 and the elastic part 388 are connected together by two connection parts 392 that are formed on a surface at the casing 310 side of the cover 308. The connection part 392 is also formed of the same material as that of the seal part 391 and the elastic part 388. The seal part 391 and the elastic part 388 are integrated by the connection part 392. The seal part 391, the elastic part 388, and the connection part 392 that are integrated are simultaneously molded. That is, the cover 308, the seal part 391, the elastic part 388, and the connection part 392 are formed, for example, by two-color molding.

(Assembly Method of Speed Reducer-Attached Motor)

Next, an assembly method of the speed reducer-attached motor 301 is described.

First, the armature 332, the commutator 335, and the bearings 367A, 367B are assembled to the rotation shaft 361.

Next, the rotation shaft 361 is assembled with respect to the shaft accommodation groove 312 of the casing 310 along the central axis direction of the first shaft 313 and the second shaft 314 from the opening side (the top surface portion 310*t* side of the casing 310) of the accommodation recess part 311. At this time, the bearings 367A, 367B are pressed into the bearing accommodation recess parts 315A, 315B that are formed on the casing 310.

As shown in FIG. 36 in detail, since the groove part 315*m* is formed on the first bearing accommodation recess part 315A, and the rib 315*r* is formed on the second bearing accommodation recess parts 315B, the positioning of the radial direction position of the rotation shaft 361 is easily and reliably performed. Further, as shown in FIG. 38 in detail, the positioning surface 315*k* is formed on the first bearing accommodation recess part 315A. Therefore, the positioning of the axial direction position of the rotation shaft 361 is easily and reliably performed with reference to the bearing 367A and the positioning surface 315*k*.

In this way, by assembling the rotation shaft 361, the commutator 335 that is provided on the rotation shaft 361 is accommodated into the motor accommodation part 316.

Next, each of the worm wheel 363, the pinion gear 364, the spar gear 365, and the drive gear 366 is sequentially assembled into the accommodation recess part 311 of the casing 310 from the opening side of the accommodation recess part 311 along the central axis direction of the first shaft 313 and the second shaft 314.

Further, the brush holder 340 is assembled from the opening side of the accommodation recess part 311 along the central axis direction of the first shaft 313 and the second shaft 314.

Next, the cover 308 is attached so as to cover the top surface portion 310*t* of the casing 310.

Here, the motor-side cover 382 that covers the motor accommodation part 316 is integrally molded on the cover 308. Therefore, by attaching the cover 308 to the casing 310, at the same time, the motor accommodation part 316 is covered by the motor-side cover 382.

Further, by attaching the cover 308 to the casing 310, the outer circumferential surfaces 367*a*, 367*b* of the bearings 367A, 367B are pushed from the opening side of the casing 310 by the bearing stoppers 386A, 386B of the cover 308.

Here, part of the cover main body 381 of the cover 308 is fixed by snap fitting by the latch tongue piece 383 that is formed on the cover main body 381 and the three latch protrusions 310*a* that are formed around the second bearing accommodation recess part 315B of the casing 310. Further, each of two of the three latch protrusions 310*a* around the second bearing accommodation recess part 315B is arranged on each of both sides that interpose the second bearing accommodation recess part 315B (the rotation shaft 361, the worm gear 362). Therefore, floating of a part of the cover main body 381, particularly, a part that covers the second bearing accommodation recess part 315B is reliably prevented.

Further, the motor-side cover 382 of the cover 308 is fixed by snap fitting by the latch tongue piece 383 that is formed on the motor-side cover 382 and the latch protrusion 310*a* that is formed on the pair of side wall portions 316*b* that constitute the motor accommodation part 316. In other words, the motor-side cover 382 is fixed by snap fitting to the motor accommodation part 316 by each of the latch protrusions 310*a* that is arranged on each of both sides that interpose the motor accommodation part 316 (the rotation shaft 361, the worm gear 362) and the latch tongue piece 383 that is latched by the latch protrusion 310*a*. Therefore, floating of the motor-side cover 382 is reliably prevented.

Next, the connector member 350 is assembled along the central axis direction of the rotation shaft 361 with respect to the motor accommodation part 316. When the connector member 350 is assembled, the connector member 350 and the brush holder 340 are electrically connected together. Then, the yoke 331 is mounted on an end part of the motor accommodation part 316. Thereby, the assembly of the speed reducer-attached motor 301 is completed.

(Operation of Speed Reducer-Attached Motor)

Next, an operation of the speed reducer-attached motor 301 is described.

First, when the motor part 330 is driven, the worm wheel 363 is rotated via the rotation shaft 361 and the worm gear 362. The rotation shaft 361 and the worm gear 362 are rotatably supported by the bearings 367A, 367B. The outer circumferential surfaces 367*a*, 367*b* of the bearings 367A, 367B are reliably pressed by the bearing stoppers 386A, 386B that are provided on the cover 308, and therefore, the bearings 367A, 367B are not floated from the bearing accommodation recess parts 315A, 315B.

Here, the surfaces of the bearing stoppers 386A, 386B are covered by the elastic part 388. Therefore, transmission of the vibration of the bearings 367A, 367B to the cover 308 is prevented. Further, by interposing the elastic part 388, the outer circumferential surfaces 367*a*, 367*b* of the bearings 367A, 367B are in close contact with the bearing stoppers 386A, 386B.

Subsequently, when the rotation shaft 361 and the worm gear 362 are rotated, the drive gear 366 is rotated together with the worm wheel 363. Then, it is possible to output, for example, a drive force that operates the vehicle window to be moved upward and downward from the gear part 366*g* of the drive gear 366.

Here, the speed of the speed reducer part 360 is reduced in two steps by the engagement between the worm gear 362 and the worm wheel 363 and the engagement between the pinion gear 364 and the spar gear 365.

In this way, the speed reducer-attached motor 301 described above includes the casing 310 on which the shaft accommodation groove 312 that accommodates the rotation shaft 361, the bearing accommodation recess parts 315A, 315B that accommodate the bearings 367A, 367B, and the accommodation recess part 311 that accommodates the speed reducer part 360 are formed and the motor accommodation part 316 that accommodates the commutator 335. The shaft accommodation groove 312, the bearing accommodation recess parts 315A, 315B, the accommodation recess part 311, and the motor accommodation part 316 open at the top surface portion 310*t* side of the casing 310. Therefore, it becomes possible to assemble the rotation shaft 361, the bearings 367A, 367B, and the worm wheel 363, the pinion gear 364, the spar gear 365, and the drive gear 366 which constitute the speed reducer part 360 from the same direction of the top surface portion 310*t* side with respect to the casing 310. Accordingly, when assembling the speed reducer-attached motor 301, it is possible to avoid the necessity of changing the direction of the casing 310 in accordance with a component to be assembled, and it is possible to facilitate the assembly work.

Further, the bearing stoppers 386A, 386B are integrally molded on the cover 308 that closes the opening of the casing 310. Therefore, it is not necessary to separately provide a structure that prevents the floating of the bearings 367A, 367B. It is possible to reduce the number of components of the speed reducer-attached motor 301, and it is possible to reduce the product cost of the speed reducer-attached motor 301. Further, it is possible to prevent the floating of the bearings 367A, 367B from the bearing accommodation recess parts 315A, 315B by the bearing stoppers 386A, 386B. Accordingly, it is possible to prevent the operation failure of the speed reducer-attached motor 301 while facilitating the assembly work of the speed reducer-attached motor 301.

The surfaces of the bearing stoppers 386A, 386B are covered by the elastic part 388. Therefore, transmission of the vibration of the bearings 367A, 367B to the cover 308 is prevented. Further, by interposing the elastic part 388, the outer circumferential surfaces 367a, 367b of the bearings 367A, 367B and the bearing stoppers 386A, 386B are in close contact with each other. Therefore, it is possible to transmit heat that is generated at the bearings 367A, 367B and the like to the bearing stoppers 386A, 386B and the cover 308 via the elastic member 388. Accordingly, it is possible to enhance the cooling efficiency of the speed reducer-attached motor 301.

Further, the latch protrusion 310a for fixing the cover 308 is provided in proximity to the bearing accommodation recess parts 315A, 315B of the casing 310. Specifically, the latch protrusions 310a is arranged on both sides that interpose the second bearing accommodation recess part 315B (the rotation shaft 361, the worm gear 362). Further, the latch protrusion 310a is arranged on both sides that interpose the motor accommodation part 316 (the rotation shaft 361, the worm gear 362).

Therefore, floating of a part of the cover main body 381, particularly, a part that covers the second bearing accommodation recess part 315B is reliably prevented. Further, floating of the motor-side cover 382 is reliably prevented. Accordingly, it is possible to reliably press the bearing 367B that is accommodated in the second bearing accommodation recess part 315B by the second bearing stopper 386B. Further, it is possible to reliably press the bearing 367A that is accommodated in the first bearing accommodation recess part 315A by the first bearing stopper 386A.

Further, the elastic part 388 and the seal part 391 that is formed on the cover 308 are integrated via the connection part 392. Therefore, it is possible to form the seal part 391 and the elastic part 388 at one time. For example, it is possible to form the cover 308, the seal part 391, the elastic part 388, and the connection part 392, for example, by two-color molding. Accordingly, it is possible to simplify the manufacturing process of the speed reducer-attached motor 301.

Further, the bearing accommodation recess parts 315A, 315B include an elastically deformable rib 315r that protrudes toward the bearings 367A, 367B side at a position which faces an outside in the radial direction of the bearings 367A, 367B and which is orthogonal to the top surface portion 310 side. Therefore, when the bearings 367A, 367B that support the rotation shaft 361 are pressed into the bearing accommodation recess parts 315A, 315B, it is possible to restrict the bearings 367A, 367B in the radial direction by the ribs 315r, 315r.

Further, the position in the axis direction of the rotation shaft 361 of the one bearing 367A that is provided on the rotation shaft 361 is defined by the positioning surface 315k of the first bearing accommodation recess part 315A. Thereby, it is possible to assemble the rotation shaft 361 to the casing 310 with good accuracy.

Further, the width size W1 in the shaft accommodation groove 312 is smaller than the width size W2 in a direction that is orthogonal to the rotation shaft 361 in the bearing accommodation recess parts 315A, 315B. Therefore, even when a lubricant agent such as a grease that is filled in the bearings 367A, 367B flows out from the bearings 367A, 367B, since the width size W1 of the shaft accommodation groove 312 is smaller than the bearing accommodation recess parts 315A, 315B, it is possible to prevent the lubricant agent from being spattered by the rotation of the rotation shaft 361 and prevent a lubrication shortage from occurring.

In the third embodiment described above, a speed reducer-attached motor assembly method is described. However, the embodiment is not limited thereto. For example, the assembly order between the assembly of the worm wheel 363, the drive gear 366, and the like and the assembly of the brush holder 340, the connector member 350, and the like may be appropriately changed.

Further, a case is described in which the above speed reducer-attached motor of the third embodiment is applied to a drive source of a vehicle window regulator and the like. However, the embodiment is not limited thereto. The speed reducer-attached motor is applicable to a drive source of a wiper motor, a sunroof, an electrically operated seat, and the like, and further, a variety of apparatuses such as an electric component other than a vehicle.

Further, a case is described in which the motor-side cover 382 that covers the motor accommodation part 316 is integrally molded on the cover 308, and by attaching the cover 308 to the casing 310, the motor accommodation part 316 and the accommodation recess part 311 are covered at the same time. Here, it is also possible to attach the brush holder 340 integrally with the cover 308 and assemble the cover 308 and the brush holder 340 at the same time.

Further, the above third embodiment is described using a case in which the bearing stoppers 386A, 386B are integrally molded on the cover 308 that closes the opening of the casing 310. However, the embodiment is not limited thereto. The bearing stoppers 386A, 386B may be constituted as a separate body.

Further, a case is described in which the entire surface of the bearing stoppers 386A, 386B is covered by the elastic part 388. However, the embodiment is not limited thereto. The elastic part 388 may be formed at least on a surface (front end surface) that comes into contact with the bearings 367A, 367B of the bearing stoppers 386A, 386B. Further, in accordance with specifications, it is also possible to provide no elastic part 388 and no seal part 391.

Further, the above third embodiment is described using a case in which the elastic part 388 and the seal part 391 that is formed on the cover 308 are integrated via the connection part 392. However, the embodiment is not limited thereto. The elastic part 388 and the seal part 391 may be separate.

Further, the above third embodiment is described using a case in which the cover main body 381 and the motor-side cover 382 are integrally molded on the cover 308. However, the embodiment is not limited thereto. The cover main body 381 and the motor-side cover 382 may be separately provided.

Further, the above third embodiment is described using a case in which the latch protrusion 310a is provided on the outer circumferential part of the casing 310, and the latch tongue piece 383 that is capable of being latched to the latch protrusion 310a is provided on the cover 308. However, the embodiment is not limited thereto. The latch tongue piece 383 may be provided on the outer circumferential part of the casing 310, and the latch protrusion 310a may be provided on the cover 308. Further, it is possible to arbitrarily set the arrangement position of the latch protrusion 310a or the latch tongue piece 383 that is provided on the casing 310 or the cover 308 and the number of latch tongue pieces 383.

Further, the embodiment is not limited to a case in which the casing 310 and the cover 308 are fixed by snap fitting by the latch protrusion 310a and the latch tongue piece 383. That is, the configuration may be a configuration in which the casing 310 and the cover 308 are capable of being fixed. For example, the cover 308 may be fastened and fixed to the casing 310 using a bolt.

Further, the above third embodiment is described using a case in which the bearings 367A, 367B that rotatably support the rotation shaft 361 (the worm gear 362) which constitutes the speed reducer part 360 of the speed reducer-attached motor 301 are pressed by the bearing stoppers 386A, 386B. However, the embodiment is not limited thereto. Even in a case in which the speed reducer part 360 is not provided, it is possible to employ the configuration of the bearing accommodation recess parts 315A, 315B and the bearing stoppers 386A, 386B.

The present invention is not limited to the above embodiments, and a variety of changes can be made without departing from the scope of the present invention.

INDUSTRIAL APPLICABILITY

According to the speed reducer-attached motor described above, it becomes possible to improve an assembly property of a member such as the worm shaft and the worm wheel.

Further, according to the speed reducer-attached motor described above, even when the speed reducer-attached motor is inverted around the rotation shaft, no problems arise. Therefore, it is not necessary to manufacture a plurality of types of casings in accordance with the arrangement direction of the speed reducer-attached motor, and it becomes possible to reduce the mold cost.

Further, according to the speed reducer-attached motor described above, it is possible to prevent the bearing that is accommodated in a case of which one surface is opened from floating from the case by the bearing stopper. Therefore, it is possible to prevent an operation failure of the speed reducer-attached motor while facilitating an assembly work of the speed reducer-attached motor.

DESCRIPTION OF THE REFERENCE SYMBOLS 1, 201, 301: SPEED REDUCER-ATTACHED MOTOR
8, 308: COVER
10, 210: CASING
10t: TOP SURFACE PORTION (ONE SURFACE)
11: ACCOMMODATION RECESS PART
12, 212, 212B: SHAFT ACCOMMODATION GROOVE (SHAFT ACCOMMODATION RECESS PART)
13: FIRST SHAFT
14: SECOND SHAFT
15A, 15B: BEARING ACCOMMODATION RECESS PART (BEARING ACCOMMODATION RECESS PART)
15k: POSITIONING SURFACE
15r: RIB
15s: POSITIONING RIB (PRESS PART)
16: MOTOR ACCOMMODATION PART
30, 230, 330: MOTOR PART
32: ARMATURE
35: COMMUTATOR
40: BRUSH HOLDER
43: BRUSH
50: CONNECTOR MEMBER
60, 260: SPEED REDUCER PART
61, 261: ROTATION SHAFT, ROTATION SHAFT
61a: ONE END
61b: THE OTHER END
62, 262: WORM GEAR
63: WORM WHEEL (GEAR)
64: PINION GEAR (GEAR)
65: SPAR GEAR (GEAR)
66: DRIVE GEAR (GEAR)
67A, 67B: BEARING
213, 213B: WORM WHEEL ACCOMMODATION PART
218h: BOLT INSERTION HOLE (FIXATION PART)
263: WORM WHEEL
270: SHAFT SUPPORT MEMBER (SHAFT SUPPORT PART)
270a: PLATE PART (BASE UNIT)
270s: SHAFT PART
272: OUTPUT GEAR
310: CASING (CASE)
310a: LATCH PROTRUSION
310t: TOP SURFACE PORTION (ONE SURFACE)
311: ACCOMMODATION RECESS PART
312: SHAFT ACCOMMODATION GROOVE
315A, 315B: BEARING ACCOMMODATION RECESS PART (BEARING ACCOMMODATION PART)
316: MOTOR ACCOMMODATION PART (HOLDER ACCOMMODATION PART)
332: ARMATURE
335: COMMUTATOR
340: BRUSH HOLDER
343: BRUSH
361: ROTATION SHAFT (DRIVE SHAFT)
362: WORM GEAR (WORM SHAFT)
363: WORM WHEEL
366: DRIVE GEAR (OUTPUT SHAFT)
367A, 67B: BEARING
367a, 67b: OUTER CIRCUMFERENTIAL SURFACE
381: COVER MAIN BODY
382: MOTOR-SIDE COVER (HOLDER COVER)
383: LATCH TONGUE PIECE (LATCH CLAW)
385: OPENING PART
386A, 386B: BEARING STOPPER
388: ELASTIC PART (ELASTIC MEMBER)
391: SEAL PART (SEAL MEMBER)
392: CONNECTION PART

The invention claimed is:

1. A speed reducer-attached motor, comprising:
a rotation shaft on which a worm gear is provided and which is supported rotatably around a central axis via a plurality of bearings,
a motor part that is driven to be rotated around the rotation shaft as a central axis,
a speed reducer part that comprises at least two or more gears which include a worm wheel that is engaged with the worm gear and an output gear to which a rotation of the worm wheel is transmitted and which externally outputs a rotation force,
a casing on which a shaft accommodation recess part that accommodates the rotation shaft, a bearing accommodation recess part that accommodates the bearing, and a speed reducer accommodation recess part that accommodates the speed reducer part are formed, wherein the shaft accommodation recess part, the bearing accommodation recess part, and the speed reducer accommodation recess part open at one surface side of the casing, and wherein an outer circumferential part of the output gear is arranged above the rotation shaft so as to extend past the rotation shaft, and the output gear is arranged at a higher position than the worm wheel, wherein a commutator that constitutes the motor part is provided on the rotation shaft, and a motor accommodation part that accommodates the commutator of the motor part is formed on the casing so as to open on the one surface side, wherein the speed reducer-attached motor further comprises a brush holder that holds a brush which is in slidable contact with an outer circumferential surface of the commutator, wherein the brush holder is fixed to the motor accommodation part, and wherein a cover that covers the shaft accommodation recess part, the bearing accommodation recess part, the speed reducer accommodation recess part, and the motor accommodation part is provided on the one surface side of the casing, and the brush holder is provided integrally on the cover.

2. The speed reducer-attached motor according to claim 1, wherein the outer circumferential part of the output gear is arranged so as to extend past and above an engagement point between the worm gear and the worm wheel.

3. The speed reducer-attached motor according to claim 1, wherein a width size in the shaft accommodation recess part is smaller than a width size in a direction that is orthogonal to the rotation shaft in the bearing accommodation recess part.

4. A speed reducer-attached motor assembly method which is an assembly method of the speed reducer-attached motor according to claim 1, wherein the gears that constitute the rotation shaft, the bearing, and the speed reducer part are assembled from the one surface side with respect to the shaft accommodation recess part, the bearing accommodation recess part, and the speed reducer accommodation recess part that open at the one surface side of the casing.

5. A speed reducer-attached motor, comprising:

a rotation shaft on which a worm gear is provided and which is supported rotatably around a central axis via a plurality of bearings, a motor part that is driven to be rotated around the rotation shaft as a central axis, a speed reducer part that comprises at least two or more gears which include a worm wheel that is engaged with the worm gear and an output gear to which a rotation of the worm wheel is transmitted and which externally outputs a rotation force, and a casing on which a shaft accommodation recess part that accommodates the rotation shaft, a bearing accommodation recess part that accommodates the bearing, and a speed reducer accommodation recess part that accommodates the speed reducer part are formed, wherein the shaft accommodation recess part, the bearing accommodation recess part, and the speed reducer accommodation recess part open at one surface side of the casing, and wherein an outer circumferential part of the output gear is arranged above the rotation shaft so as to extend past the rotation shaft, and the output gear is arranged at a higher position than the worm wheel, wherein the bearing accommodation recess part comprises an elastically deformable rib that protrudes toward the bearing side at a position which faces an outside in a radial direction of the bearing and which is orthogonal to the one surface side.

6. A speed reducer-attached motor, comprising:

a rotation shaft on which a worm gear is provided and which is supported rotatably around a central axis via a plurality of bearings, a motor part that is driven to be rotated around the rotation shaft as a central axis, a speed reducer part that comprises at least two or more gears which include a worm wheel that is engaged with the worm gear and an output gear to which a rotation of the worm wheel is transmitted and which externally outputs a rotation force, and a casing on which a shaft accommodation recess part that accommodates the rotation shaft, a bearing accommodation recess part that accommodates the bearing, and a speed reducer accommodation recess part that accommodates the speed reducer part are formed, wherein the shaft accommodation recess part, the bearing accommodation recess part, and the speed reducer accommodation recess part open at one surface side of the casing, and wherein an outer circumferential part of the output gear is arranged above the rotation shaft so as to extend past the rotation shaft, and the output gear is arranged at a higher position than the worm wheel, wherein at least two bearings are provided to be spaced in a central axis direction of the rotation shaft, and the bearing accommodation recess part that accommodates one of the bearings comprises a positioning surface which is formed on one side in the rotation shaft direction and against which one surface of the bearing is butted and a press part which is formed on the other side in the rotation shaft direction and which presses the bearing to the positioning surface side.

* * * * *